US012572111B2

(12) United States Patent
Suzuki et al.

(10) Patent No.: US 12,572,111 B2
(45) Date of Patent: Mar. 10, 2026

(54) IMAGE FORMING APPARATUS HAVING A FILTER THAT COVERS AN OPENING PORTION

(71) Applicant: CANON KABUSHIKI KAISHA, Tokyo (JP)

(72) Inventors: Ai Suzuki, Tokyo (JP); Shingo Ito, Tokyo (JP); Osamu Sasaoka, Kanagawa (JP); Toshiyuki Watanabe, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/882,167

(22) Filed: Sep. 11, 2024

(65) Prior Publication Data

US 2025/0093814 A1 Mar. 20, 2025

(30) Foreign Application Priority Data

Sep. 15, 2023 (JP) ............................ JP2023-149816

(51) Int. Cl.
*G03G 21/00* (2006.01)
*G03G 15/00* (2006.01)
(Continued)

(52) U.S. Cl.
CPC ....... *G03G 21/206* (2013.01); *G03G 15/6552* (2013.01); *G03G 15/6573* (2013.01);
(Continued)

(58) Field of Classification Search
CPC ........... G03G 15/6552; G03G 15/6573; G03G 21/206; G03G 21/1633; G03G 21/1638;
(Continued)

(56) References Cited

U.S. PATENT DOCUMENTS 10,175,648 B1 * 1/2019 Ju ........................ G03G 21/206
10,401,790 B2 9/2019 Wakimoto
(Continued)

FOREIGN PATENT DOCUMENTS

JP H09281825 A 10/1997
JP 2003162165 A 6/2003
(Continued)

*Primary Examiner* — Robert B Beatty
(74) *Attorney, Agent, or Firm* — ROSSI, KIMMS & McDOWELL LLP

(57) ABSTRACT

An image forming apparatus includes an image forming portion, a fixing portion configured to fix a toner image to a recording material, a housing which accommodates the image forming portion and the fixing portion and in which a conveyance path that the recording material passes through is formed, and a discharge portion configured to discharge the recording material. The housing includes a first exterior surface and a second exterior surface. The second exterior surface is provided with an opening portion through which an outside of the housing and an inside of the housing communicate with each other. The image forming apparatus further includes a filter disposed to cover the opening portion. In a width direction orthogonal to both the vertical
(Continued)

direction and the discharge direction, a center of the conveyance path is positioned between one end and an other end of a range where the opening portion is provided.

16 Claims, 19 Drawing Sheets

(51) Int. Cl.
*G03G 21/16* (2006.01)
*G03G 21/20* (2006.01)

(52) U.S. Cl.
CPC ..... *G03G 21/1633* (2013.01); *G03G 21/1695* (2013.01); *G03G 2221/1645* (2013.01); *G03G 2221/1672* (2013.01); *G03G 2221/1687* (2013.01)

(58) Field of Classification Search
CPC ....... G03G 21/1695; G03G 2215/0043; G03G 2215/00438; G03G 2215/00586; G03G 2221/1645; G03G 2221/1672; G03G 2221/1687
USPC ..................................... 399/92, 93, 124, 401
See application file for complete search history.

(56) References Cited

U.S. PATENT DOCUMENTS

| | | | | | |
|---|---|---|---|---|---|
| 10,875,731 | B1 * | 12/2020 | Kamano | G03G 21/206 | |
| 2005/0074255 | A1 * | 4/2005 | Awaya | G03G 21/206 | 399/92 |
| 2007/0280721 | A1 * | 12/2007 | Kanai | G03G 15/6573 | 399/92 |
| 2010/0054791 | A1 * | 3/2010 | Shimizu | G03G 21/206 | 399/92 |
| 2012/0213564 | A1 * | 8/2012 | Tashiro | G03G 21/1633 | 399/335 |
| 2017/0088373 | A1 * | 3/2017 | Tahara | B65H 3/0684 | |
| 2019/0086862 | A1 * | 3/2019 | Komatsuzaki | B65H 1/00 | |
| 2019/0155214 | A1 * | 5/2019 | Wakimoto | G03G 15/6573 | |
| 2024/0288812 | A1 * | 8/2024 | Takayama | G03G 15/757 | |
| 2024/0427279 | A1 * | 12/2024 | Katagiri | G03G 15/6529 | |
| 2025/0093813 | A1 * | 3/2025 | Ito | B01D 39/1676 | |

FOREIGN PATENT DOCUMENTS

| | | | | | |
|---|---|---|---|---|---|
| JP | 2017173491 | A | * | 9/2017 | G03G 21/206 |
| JP | 2017198870 | A | | 11/2017 | |
| JP | 2019095589 | A | | 6/2019 | |

* cited by examiner

IMAGE FORMING APPARATUS HAVING A FILTER THAT COVERS AN OPENING PORTION

BACKGROUND OF THE INVENTION

Field of the Invention

The present invention relates to an image forming apparatus that forms an image on a recording material.

Description of the Related Art

Japanese Patent Application Laid-Open No. H09-281825 discloses providing an opening portion (discharge port) for discharging water vapor generated in a fixing portion to the outside of the apparatus in a top cover of the image forming apparatus.

There is a possibility that dust enters the inside of the apparatus through the opening portion provided in the housing of the image forming apparatus.

SUMMARY OF THE INVENTION

The present invention provides an image forming apparatus that can reduce entrance of dust.

According to an aspect of the invention, an image forming apparatus includes an image forming portion configured to form a toner image on a recording material, a fixing portion configured to form a nip portion to nip the recording material, and configured to fix the toner image to the recording material by heating the toner image while conveying the recording material with the nip portion, a housing which accommodates the image forming portion and the fixing portion and in which a conveyance path that the recording material passes through is formed, and a discharge portion configured to discharge the recording material in a discharge direction intersecting with a vertical direction to an outside of the housing, wherein the housing includes a first exterior surface and a second exterior surface, the first exterior surface facing in the discharge direction and being provided with a discharge port that the recording material discharged by the discharge portion passes through, the second exterior surface facing in a direction opposite to the discharge direction and being provided with an opening portion through which the outside of the housing and an inside of the housing communicate with each other, wherein at least part of the discharge port and at least part of the opening portion are positioned above an upper end position of the nip portion in the vertical direction, wherein the image forming apparatus further includes a filter disposed to cover the opening portion, and wherein in a width direction orthogonal to both the vertical direction and the discharge direction, a center of the conveyance path is positioned between one end and an other end of a range where the opening portion is provided.

According to another aspect of the invention, an image forming apparatus includes an image forming portion configured to form a toner image on a recording material, a fixing portion configured to form a nip portion in which the recording material is nipped and heat the toner image at the nip portion while conveying the recording material so as to fix the toner image to the recording material, a housing which accommodates the image forming portion and the fixing portion and in which a conveyance path that the recording material passes through is formed, and a discharge portion configured to discharge the recording material in a discharge direction intersecting with a vertical direction to an outside of the housing, wherein the housing includes a first exterior surface and a second exterior surface, the first exterior surface facing in the discharge direction and being provided with a discharge port that the recording material discharged by the discharge portion passes through, the second exterior surface facing in a direction opposite to the discharge direction and being provided with an opening portion through which the outside of the housing and the conveyance path in the housing communicate with each other, wherein at least part of the discharge port and at least part of the opening portion are positioned above an upper end position of the nip portion in the vertical direction, and wherein the image forming apparatus further includes a filter disposed to cover the opening portion.

Further features of the present invention will become apparent from the following description of exemplary embodiments with reference to the attached drawings.

DESCRIPTION OF THE EMBODIMENTS

Embodiments of the present disclosure will be described below with reference to drawings.

Example 1

In the present example, a configuration example of an image forming apparatus will be described by taking an image forming apparatus 100 illustrated in FIG. 1A as an example. The image forming apparatus 100 is a monochromatic laser printer that forms a monochromatic image by an electrophotographic system, and forms an image (toner image) on a recording material P by using toner as a developer in accordance with image information transmitted thereto from an external device such as a personal computer. As the recording material P (recording medium), various sheet materials of different materials can be used. Examples of the various sheet materials include paper sheets such as plain paper sheets and cardboards, sheets of irregular shapes such as envelopes and index paper sheets, and cloths.

In the description below, an up-down direction (vertical direction, direction following the gravity direction) of the image forming apparatus 100 in the case where the image forming apparatus 100 is disposed on a horizontal surface will be referred to as a Z-axis direction. The direction of a rotational axis of a photosensitive drum 1 will be referred to as an X-axis direction. A direction intersecting with both the X-axis direction and the Z-axis direction will be referred to as a Y-axis direction. The X-axis direction, the Y-axis direction, and the Z-axis direction are preferably orthogonal to each other. In the X-axis direction, the positive side (+X side) will be referred to as the right side, and the negative side (−X side) will be referred to as the left side. In the Y-axis direction, the positive side (+Y side) will be referred to as the front side or front surface side, and the negative side (−Y side) will be referred to as the rear side or rear surface side. In the Z-axis direction, the positive side (+Z side) will be referred to as the upper side, and the negative side (−Z side) will be referred to as the lower side.

In the present example, the X-axis direction is the width direction of the recording material P orthogonal to both the vertical direction and a discharge direction Dc of the recording material P.

Image Forming Apparatus

Figure 1A:
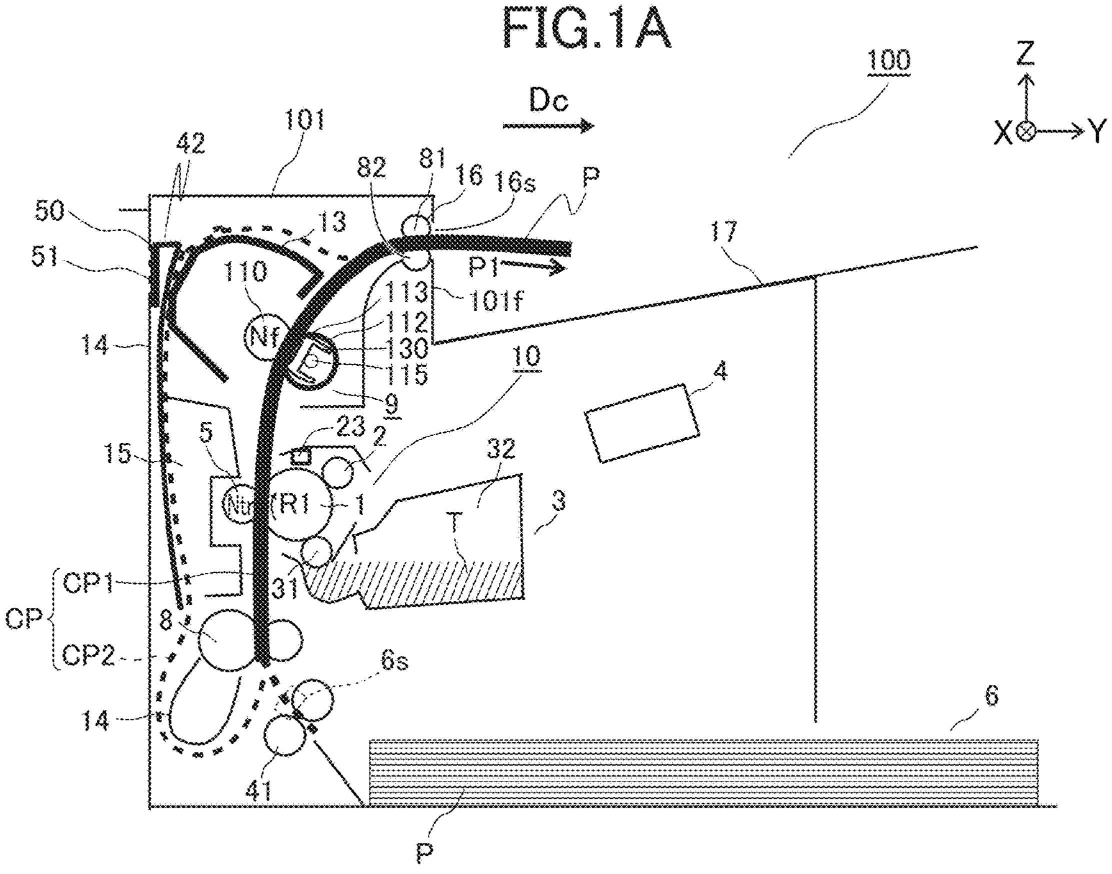
FIG. 1A is a schematic view of an image forming apparatus according to Example 1.
Figure 1B:
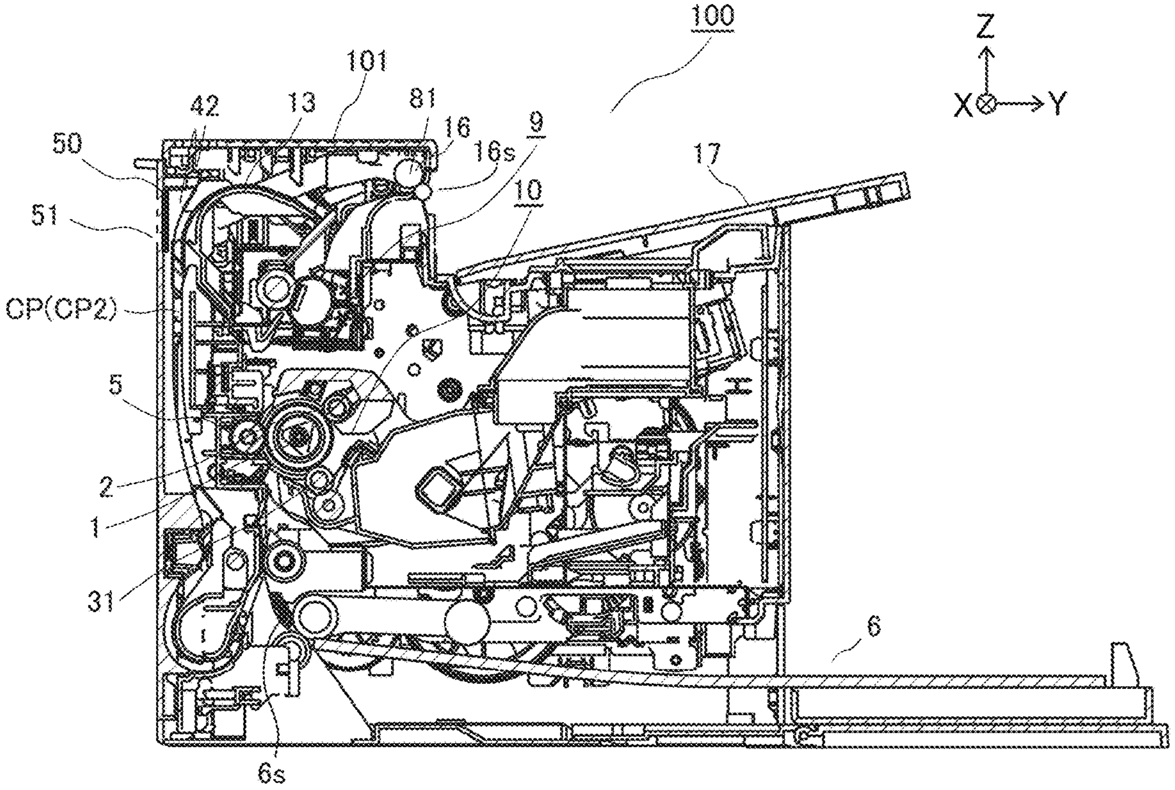
FIG. 1B is a detailed view of the image forming apparatus according to Example 1.
Figure 2:
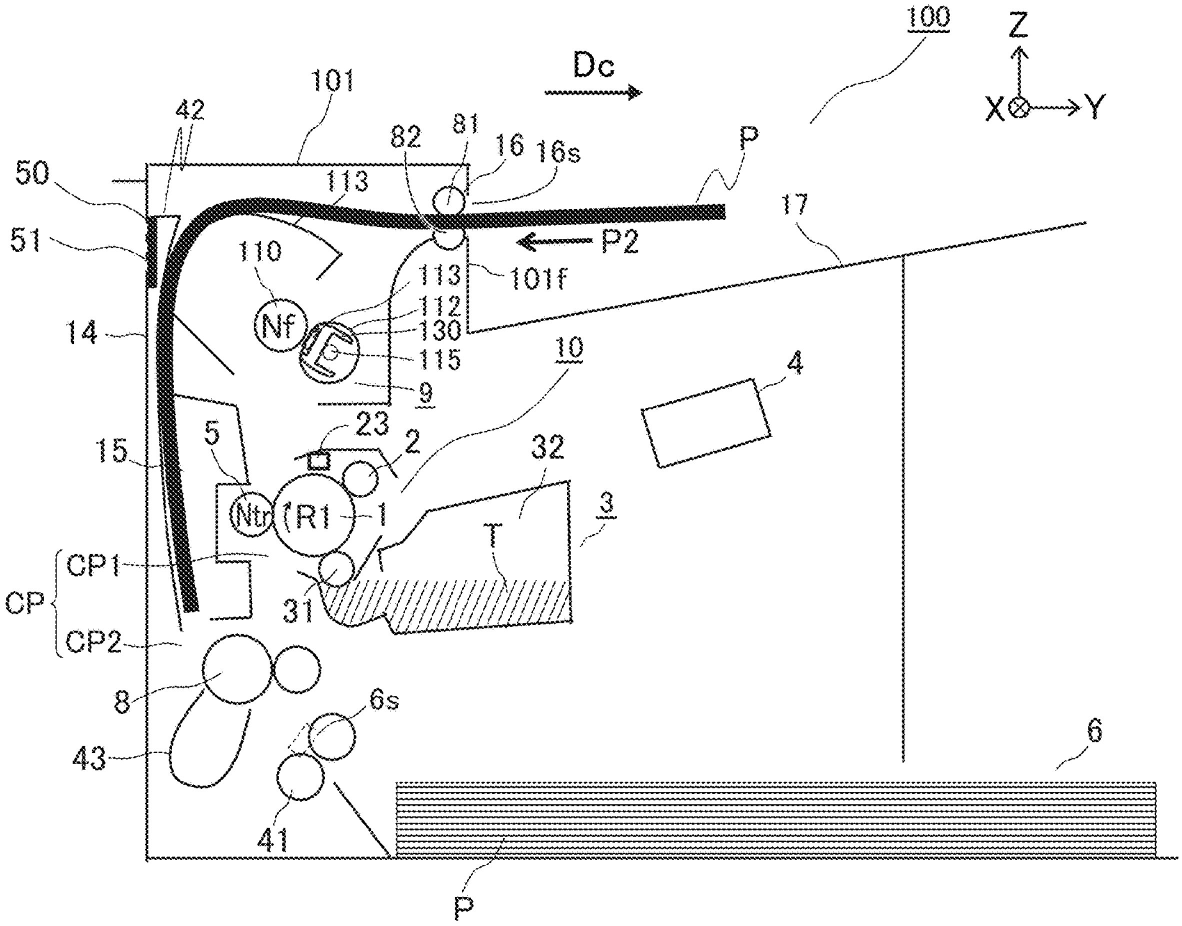
FIG. 2 is a schematic view of the image forming apparatus according to Example 1.

FIGS. 1A and 2 are schematic views illustrating a cross-section of the image forming apparatus 100 according to Example 1. FIG. 1B is a detailed view of FIG. 1A.

As illustrated in FIGS. A, 11B, and 2, the image forming apparatus 100 includes a feeding portion 6, a registration roller pair 8, an image forming portion 10, a fixing portion 9, and a discharge portion 16. In addition, the image forming apparatus 100 includes a housing 101 that accommodates the feeding portion 6, the registration roller pair 8, the image forming portion 10, the fixing portion 9, and the discharge portion 16.

The feeding portion 6 includes a stacking portion (cassette, tray) which is attachable to and detachable from the housing 101 and on which recording materials P are stacked, and a roller pair 41 that feeds the recording materials Pone by one from the stacking portion. The registration roller pair 8 conveys the recording material P fed by the feeding portion 6 to a transfer nip Ntr at a timing matching toner image formation in the image forming portion 10. The image forming portion 10 forms a toner image by executing an electrophotographic process, transfers the toner image onto the recording material P in the transfer nip Ntr, and thus forms an image on the recording material P. The fixing portion 9 forms a fixing nip Nf serving as a nip portion to nip the recording material P, and fixes the toner image to the recording material P by heating the toner image in the fixing nip Nf while conveying the recording material P. The discharge portion 16 discharges the recording material P on which an image has been formed to the outside of the image forming apparatus 100 (outside of the housing 101, outside the housing) in a discharge direction Dc intersecting with the vertical direction (Z-axis direction).

An arrow P1 of FIG. 1A indicates a conveyance path of the recording material P in the case of performing simplex printing (one-side image formation) in which the image forming apparatus 100 forms an image on only one surface (first surface) of the recording material P. To be noted, the recording material P is also conveyed along the path of the arrow P1 when forming an image on the first surface in the case where the image forming apparatus 100 performs duplex printing (two-side image formation) of forming an image on each of the first surface and a second surface opposite thereto of the recording material P. An arrow P2 of FIG. 2 indicates a conveyance path in which the recording material P on the first surface of which image formation has been completed is conveyed toward the image forming portion 10 again in the case where the image forming apparatus 100 performs duplex printing.

A series of operations in which the image forming apparatus 100 performs simplex printing or duplex printing while conveying one recording material P and discharges the recording material P to the outside of the image forming apparatus 100 will be referred to as an image forming operation or a sheet passing operation. An operation in which the image forming apparatus 100 successively performs the image forming operation (sheet passing operation) on a plurality of recording materials P will be referred to as successive sheet-passing. The accumulated sheet number of the recording material P representing the number of the recording materials P on which the image forming apparatus 100 has performed the image forming operation since the image forming apparatus 100 has been shipped from the factory or since the image forming apparatus 100 has been initialized after being shipped will be referred to as an accumulated sheet-passing number.

A recording material (recording material of a maximum size) having the largest width in the X-axis direction (width direction) among recording materials on which the image forming apparatus 100 can form an image in the present example is a recording material of an LTR (letter) size (width: 215.9 mm). In addition, a maximum printing width that is the width of a region (effective printing region) in which the image forming portion 10 can form an image on the recording material of the LTR size is 206 mm. A recording material (recording material of a minimum size) having the smallest width in the X-axis direction (width direction) among recording materials on which the image forming apparatus 100 can form an image in the present example is a recording material of a width of 98.4 mm. In other words, in the present example, the maximum sheet passing width of the image forming apparatus 100 is 215.9 mm, and the minimum sheet passing width is 98.4 mm.

That is, in the present example, a passing region of the recording material of the maximum size having the largest length in the X-axis direction (width direction) among the recording materials on which the image forming apparatus can form an image, in the width direction orthogonal to both the vertical direction and the discharge direction, is a region of a width of 215.9 mm. In addition, in the present example, a passing region of the recording material of the minimum size in the width direction is a region of a width of 98.4 mm. In the present example, the passing region of the recording material extends symmetrically with respect to the center of a conveyance path CP in the X-axis direction (width direction). The center of the conveyance path CP refers to the center of a space that the recording material P can pass through, and may be a center position in the X-axis direction between two rubber roller portions 81a positioned at two ends of the discharge driving roller 81 illustrated in FIG. 4A. In addition, in the case where positioning portions that position the two end portions of the recording material P in the X-axis direction are provided on the stacking portion of the feeding portion 6, the center of the conveyance path CP may be a center position between the positioning portions of the two ends in the X-axis direction.

In addition, the lifetime sheet number of the image forming apparatus 100 (accumulated sheet-passing number defining the lifetime of the image forming apparatus 100) is, for example, 50,000 assuming that images are formed on paper sheets of an A4 size at an image coverage of 4%.

The housing 101 includes a frame body of the image forming apparatus 100 and an exterior member (cover member or a door member) serving as an exterior surface of the image forming apparatus 100. Aback door 14 and a discharge tray 17 that will be described later are each an example of the exterior member. A space that is on the outside with respect to the outer surface of the housing 101 will be referred to as the outside of the image forming apparatus 100 or the outside of the apparatus, and a space that is on the inside with respect to the outer surface of the housing 101 will be referred to as the inside of the image forming apparatus 100 or the inside of the apparatus. On the inside of the image forming apparatus 100, the conveyance path CP serving as a passage space that the recording material P passes through is provided.

The housing 101 of the present example is provided with an inlet port 6s, a discharge port 16s, and a ventilating portion 51. The inlet port 6s, the discharge port 16s, and the ventilating portion 51 are each an opening portion including an opening through which the inside of the image forming apparatus 100 communicates with the outside of the image forming apparatus 100. More specifically, the inlet port 6s, the discharge port 16s, and the ventilating portion 51 are each an opening portion through which the conveyance path CP communicates with the outside of the image forming apparatus 100. The inlet port 6s is an opening portion (feeding port) through which the recording material P fed by the feeding portion 6 is received. The discharge port 16s is an opening portion through which the recording material P discharged by the discharge portion 16 passes. The ventilating portion 51 will be described later.

In the present example, the inlet port 6s and the discharge port 16s are each one opening, and the ventilating portion 51 includes a plurality of openings (plurality of vent holes 51a that will be described later). A plurality of inlet ports 6s and/or a plurality of discharge ports 16s may be provided. The ventilating portion 51 may be configured to include only one opening. In addition, the housing 101 may have an opening different from those described above.

The conveyance path Cp includes a main conveyance path CP1 and a duplex conveyance path CP2. The main conveyance path CP1 is a conveyance path extending from the inlet port 6s to the discharge port 16s via the transfer nip Ntr and the fixing nip Nf. The duplex conveyance path CP2 is a conveyance path branching from the main conveyance path CP1 at a position between the fixing portion 9 and the discharge portion 16 in a recording material conveyance direction in the main conveyance path CP1 and merging with the main conveyance path CP1 at a position between the roller pair 41 of the feeding portion 6 and the registration roller pair 8.

In other words, the conveyance path CP includes the main conveyance path CP1 serving as a first conveyance path that the recording material P passes through when the image forming portion 10 forms an image thereon. In addition, the conveyance path CP includes the duplex conveyance path CP2 serving as a second conveyance path which branches from the first conveyance path and through which the recording material on a first surface of which a toner image has been formed by the image forming portion 10 is conveyed toward the image forming portion 10 again in the case of forming an image on a second surface of the recording material opposite to the first surface.

The image forming portion 10 includes a photosensitive drum 1 serving as an image bearing member, a charging roller 2 serving as a charging portion, a scanner unit 4 serving as an exposing portion, a developing unit 3 serving as a developing portion, a transfer roller 5 serving as a transfer unit, and a pre-exposing unit 23. The developing unit 3 includes a toner container 32 accommodating toner T serving as a developer, and a developing roller 31 that bears the toner in the toner container 32 and thus supplies the toner to the photosensitive drum 1. The transfer nip Ntr serving as a transfer portion where transfer of the image is performed is formed between the photosensitive drum 1 and the transfer roller 5.

Part or the entirety of the image forming portion 10 may be a cartridge attachable to and detachable from the housing 101. In this case, for example, the housing 101 may include a cover member openably and closably provided on the front surface or the upper surface thereof, and the attachment and detachment of the cartridge may be allowed by opening the cover member.

The photosensitive drum 1 is a photosensitive member formed in a cylindrical shape (drum shape). The photosensitive drum 1 of the present example includes a photosensitive layer formed from a negatively-chargeable organic photosensitive material on a drum-shaped base body formed from aluminum or the like. More specifically, the photosensitive drum 1 is formed by sequentially applying, by a dipping coating method, a resistor layer, an undercoat layer, and a photosensitive layer on the outer peripheral surface of an aluminum cylinder of a diameter of 24 mm serving as a base body. The photosensitive drum 1 is a member basically having high stiffness. The photosensitive layer includes a charge generation layer that generates electrical charges in response to incidence of light, and a charge transport layer that transports the generated electrical charges. The film thickness of the charge transport layer is, for example, 22 μm.

The photosensitive drum 1 is rotationally driven at a predetermined peripheral speed in an arrow R1 direction about the rotational axis thereof by an unillustrated drive source. The peripheral speed of the photosensitive drum 1 defines the speed of the image formation by the image forming apparatus 100, and is also referred to as a process speed. The process speed of the present example is, for example, 140 mm/sec.

The charging roller 2 comes into contact with the photosensitive drum 1 at a predetermined contact pressure and thus forms a charging portion. In the present example, the contact portion (nip portion) between the charging roller 2 and the photosensitive drum 1 in the rotational direction of the photosensitive drum 1 is about 1 mm. The charging roller 2 includes a conductive base body. The charging roller 2 uniformly charges the surface of the photosensitive drum 1 to a predetermined potential as a result of a predetermined charging voltage being applied to the conductive base body by a charging power source. In the present example, the photosensitive drum 1 is negatively charged by the charging roller 2.

The charging roller 2 used in the present example includes a core metal having a diameter of 5 mm serving as a conductive base body, a base layer formed from hydrin rubber, and a surface layer formed from urethane, and is formed to have an outer diameter of 9.7 mm. In addition, the resistance of the charging roller 2 is $1\times10^{6}\Omega$ or less, and the hardness thereof is 70° as measured by an MD-1 rubber hardness meter. To be noted, although a direct current voltage is used as the charging voltage in the present example, the configuration is not limited to this, and the charging voltage may be a voltage in which an alternate current voltage is superimposed on a direct current voltage.

The core metal is provided with a gear, and as a result of the gear engaging with a gear of the photosensitive drum 1, the charging roller 2 rotates at a constant speed with respect to the photosensitive drum 1. In the present example, the gear ratio and the like are set such that the peripheral speed ratio between the charging roller 2 and the photosensitive drum 1 in image formation is about 107%. The peripheral speed ratio between the charging roller 2 and the photosensitive drum 1 is, the ratio of the surface speed of the charging roller 2 to the surface speed of the photosensitive drum 1. In the charging portion, as a result of the speed difference between the charging roller 2 and the photosensitive drum 1, the toner attached to the charging roller 2 is likely to return to the photosensitive drum 1 by frictional charging.

In the present example, pressurizing springs that pressurize the charging roller 2 against the photosensitive drum 1 are used. The pressurizing spring press bearings supporting core metal portions at two ends of the charging roller 2 in a direction perpendicular to the surface of the photosensitive drum 1 in the charging portion. In the direction of the rotational axis of the photosensitive drum 1 (X-axis direction), the pressing force on the side on which a gear of the charging roller 2 is disposed, that is, the pressing force on the driving side is 7.5 N, and the pressing force on the opposite side to the gear, that is, the pressing force on the non-driving side is 5.6 N.

To cause stable electrical discharge at the charging portion, the pre-exposing unit 23 irradiates a region after passing the transfer nip Ntr and before reaching the charging portion with light in the surface of the photosensitive drum 1 to remove remaining charges.

The scanner unit 4 irradiates the photosensitive drum 1 with laser light corresponding to the image information input from the external device by using a polygonal mirror, and thus exposes the surface of the photosensitive drum 1 in a scanning manner. An electrostatic latent image corresponding to the image information is formed on the exposed surface of the photosensitive drum 1.

The developing unit 3 supplies the toner T to the photosensitive drum 1, and thus develops the electrostatic latent image into a toner image. In the present example, a contact development method is employed as the development method, and the toner layer borne on the developing roller 31 comes into contact with the photosensitive drum 1 at a developing portion where the photosensitive drum 1 and the developing roller 31 oppose each other. A developing voltage is applied to the developing roller 31 by a developing power source. As a result of an electric field formed at the developing roller 31 by the developing voltage, the toner borne on the developing roller 31 transfers from the developing roller 31 to the drum surface in accordance with the potential distribution on the surface of the photosensitive drum 1. As a result of this, the electrostatic latent image on the photosensitive drum 1 is visualized as a toner image.

Polymer toner formed by a polymerization method can be used as the toner T of the present example. The normal charging polarity (standard polarity) of the toner T is negative. In addition, the toner particle diameter is 6 μm.

The transfer roller 5 abuts the photosensitive drum 1 by a predetermined pressurizing force, and thus the transfer nip Ntr is formed. The transfer roller 5 is rotated by following the rotating photosensitive drum 1 or following the recording material P passing through the transfer nip Ntr. A voltage of a positive polarity is applied to the core metal of the transfer roller 5 from an unillustrated transfer power source. The toner image borne on the photosensitive drum 1 is transferred onto the recording material P at the transfer nip Ntr in accordance with the electric field generated by the voltage application.

The transfer roller 5 used in the present example includes a core metal of a steel rod plated with nickel, and a foam sponge layer mainly formed from nitrile butadiene rubber (NBR) and epichlorohydrin rubber on the outer peripheral surface of the core metal. The diameter of the core metal is 8 mm, and the thickness of the foam sponge layer is 3 mm. In addition, as a result of the bearings holding the two ends of the core metal being urged by the spring members, the transfer roller 5 is in pressure contact with the photosensitive drum 1 by a pressurizing force of 1 kgf (9.8 N).

In the present example, a cleanerless system (drum cleanerless system, simultaneous developing-cleaning system) in which toner (transfer residual toner) remaining on the photosensitive drum 1 without being transferred onto the recording material P at the transfer nip Ntr is collected by the developing unit 3 is employed. The transfer residual toner is charged to the negative polarity at the charging portion by the charging roller 2. The developing voltage is set such that the developing roller 31 is at the positive polarity with respect to the surface potential of a non-image portion of the photosensitive drum 1. Therefore, the transfer residual toner attached to the non-image portion is transferred from the photosensitive drum 1 to the developing roller 31 at the developing portion, and is collected by the developing unit 3. The collected transfer residual toner is agitated with the toner T accommodated in the toner container 32, and is used again for development.

In the drum cleanerless system, a cleaning member that removes transfer residual toner from the photosensitive drum 1 and a waste toner container that accommodates the removed transfer residual toner can be omitted. Therefore, the image forming apparatus can be miniaturized. To be noted, the image forming apparatus 100 may include a cleaning member and a waste toner container in addition to the configuration of the present example instead of the drum cleanerless system.

The fixing portion 9 is a unit (image heating unit) of a thermal fixation system that fixes the toner image to the recording material P by heating the toner image. More specifically, the fixing portion 9 heats and pressurizes the toner image on the recording material P while nipping and conveying, in the fixing nip Nf, the recording material P onto which the toner image has been transferred in the transfer nip Ntr. As a result of this, toner particles melt and then adhere, and thus the toner image is fixed to the recording material P.

The fixing portion 9 of the present example is a unit of a film heating system that is excellent in shortening the time for activation and reducing the power consumption. The fixing portion 9 includes a fixing film 112 serving as a heating member (fixing member), a heater 113 serving as a heating portion, a heater holder 130 that holds the heater 113, and a pressurizing roller 110 serving as a pressurizing member. The fixing film 112 is a tubular (endless) film having flexibility. The heater 113 is held by the heater holder 130, and is disposed in an inner space of the fixing film 112 together with the heater holder 130. The pressurizing roller 110 is disposed such that the fixing film 112 is interposed between the pressurizing roller 110 and the heater 113. A fixing nip Nf is formed as a contact portion (nip portion) between the fixing film 112 and the pressurizing roller 110.

The pressurizing roller 110 is an elastic roller (rubber roller) including a core metal and an elastic layer. As a result of the bearings provided at two ends of the core metal being urged by the pressurizing springs, the pressurizing roller 110 is in pressure contact with the heater 113 with the fixing film 112 therebetween. To be noted, a configuration in which the heater holder 130 (or a support member such as a metal stay that supports the heater holder 130) is urged toward the pressurizing roller 110 by pressurizing springs may be employed.

A driving force is input from a drive source to a drive gear provided at an end portion of the core metal, and thus the pressurizing roller 110 rotates. The fixing film 112 is rotated by following the rotation of the pressurizing roller 110 or following the recording material P passing through the fixing nip Nf.

A typical heater used in a heating unit of a film heating system can be used as the heater 113. For example, the heater 113 is a ceramic heater including a ceramic substrate and a heat generating resistor disposed on a serial circuit on the substrate. Specifically, the heater 113 includes an alumina substrate having a width of 6 mm and a thickness of 1 mm, a Ag/Pd (silver palladium) heat generating resistor having a height of 10 μm applied on the surface of the substrate by screen printing, and a glass layer having a thickness of 50 μm serving as a protective layer formed to cover the heat generating resistor.

As the fixing film 112, a film having a multilayer structure in which different material layers are laminated in the thickness direction can be used. The multilayer structure includes, for example, a base layer that slides on the heater 113, a surface layer that comes into contact with the recording material P, and a conductive primer layer bonding the base layer and the surface layer together. A layer in the surface layer that is on the outermost side is a releasing layer for suppressing surface soiling. The fixing film 112 of the present example has such a peripheral length that the fixing film 112 has an outer diameter of 20 mm when formed into a cylindrical shape.

The base layer requires heat resistance for receiving the heat of the heater 113, and further requires strength for sliding on the heater 113. As the material of the base layer, metal such as stainless used steel (SUS) or nickel, or a heat-resistant resin such as polyimide may be used. The metal is stronger than the resin and thus can be made thinner, and in addition, has higher thermal conductivity and is thus more likely to transmit the heat of the heater 113 to the surface layer. In contrast, the resin has a smaller specific gravity than the metal, and thus has a smaller heat capacity and is more easily heated up. Further, a thin film of resin can be formed by coating, and thus can be formed at a lower cost. In the present example, polyimide resin is used as the material of the base layer of the fixing film 112. In addition, a carbon-based filler is added to the polyimide resin to improve the thermal conductivity and strength. The thinner the base layer is, the higher the heat transmission efficiency of the fixing film 112 is, but sufficient strength may not be obtained if the base layer is too thin. The thickness of the base layer is preferably about 15 μm to about 100 μm, and is set to 60 μm in the present example.

The conductive primer layer is formed from polyimide resin, fluorine resin, or the like, and the resistance thereof is lowered by addition of carbon or the like. It is preferable that the potential of the fixing film 112 during image formation is stabilized by electrically connecting (grounding) an exposed portion of the conductive layer to the ground potential.

As the material of the outermost layer (releasing layer), fluorine resin such as perfluoroalkoxy resin (PFA), polytetrafluoroethylene resin (PTFE), or tetrafluoroethylene-hexafluoropropylene resin (FEP) is preferably used. In the present example, PFA excellent in releasability and heat resistance among the fluorine resins is used, and the resistance value of the PFA is adjusted (to a medium resistance) by dispersing a conductive agent in the substrate of PFA. The releasing layer may be formed by covering the outer peripheral surface of the base layer and the conductive primer layer by a tube, or may be formed by coating the surface of the conductive primer layer by a paint. In the present example, the releasing layer is formed by a coating method with which the releasing layer can be formed thin. The thinner the releasing layer is, the higher the heat transmission efficiency of the fixing film 112 is, but durability of the fixing film 112 can be low if the releasing layer is too thin. The thickness of the releasing layer is preferably about 5 μm to about 30 μm, and is set to 10 μm in the present example.

The pressurizing roller 110 of the present example includes, for example, a core metal having an outer diameter of 9 mm and formed from iron, and an elastic layer having a thickness of 2.5 mm and formed from silicone rubber on the outer peripheral side of the core metal. The elastic layer is formed from silicone rubber or fluorine rubber that has heat resistance. The outer diameter of the pressurizing roller 110 is preferably about 10 mm to about 50 mm. The smaller the outer diameter of the pressurizing roller 110 is, the smaller the heat capacity is, but if the outer diameter is too small, the width of the fixing nip Nf is small, thus there is a possibility that the toner image is not sufficiently heated and fixation of the toner image is degraded. In the present example, the outer diameter of the pressurizing roller 110 is set to 14 mm. The heat capacity can be also suppressed when the elastic layer is thinner, but if the elastic layer is too thin, the heat is likely to dissipate to the core metal formed from metal to degrade the total heat efficiency of the fixing portion 9, and therefore an appropriate thickness is required.

A releasing layer that enhances the releasability for toner may be provided on the outer peripheral surface of the elastic layer of the pressurizing roller 110. In the present example, a releasing layer formed from perfluoroalkoxy resin (PFA) is provided. The releasing layer may be formed by covering the surface with a tube or coating the surface with a paint similarly to the releasing layer of the fixing film 112, and in the present example, a releasing layer having a thickness of 20 μm and formed from a tube excellent in durability is used. As the material of the releasing layer, fluorine resin such as PTFE or FEP, a fluorine rubber having high releasability, silicone rubber, or the like may be used instead of PFA. When the surface hardness of the pressurizing roller 110 is lower, a larger width of the fixing nip Nf can be obtained at a lower pressure, but if the surface hardness is too low, the durability is degraded. The surface hardness of the pressurizing roller 110 of the present example is set to 400 in terms of Asker-C hardness (load: 600 g).

A temperature detection element 115 such as a thermistor for detecting the temperature of the heater 113 is disposed on the back surface of the heater 113. The controller of the image forming apparatus 100 controls power supply to the heat generating resistor in accordance with the output signal of the temperature detection element 115, and thus the heat generation amount of the heater 113 is controlled such that the heater 113 is at a predetermined target temperature (adjusted temperature). The controller controls the heat generation amount of the heater 113 such that the surface temperature of the fixing film 112 at the fixing nip Nf is maintained at a temperature suitable for fixation of the toner image. The adjusted temperature of the fixing portion 9 in the case of using a plain paper sheet as the recording material P is, for example, 180° C.

The discharge portion 16 is a conveyance unit (discharge unit) that discharges the recording material P on which image formation has been completed to the outside of the housing 101. The discharge portion 16 includes a discharge roller pair constituted by a discharge driving roller 81 and a discharge driven roller 82. The discharge driving roller 81 is a driving roller that rotates by receiving a driving force of a drive source, and the discharge driven roller 82 is a driven roller that forms a nip portion together with the discharge driving roller 81 and rotates by following the discharge driving roller 81.

The discharge portion 16 is disposed on the inside or in the vicinity of the discharge port 16*s* of the housing 101. The discharge portion 16 nipping and conveying the recording material P by the discharge driving roller 81 and the discharge driven roller 82 in the discharge direction Dc, and thus discharges the recording material P from the inside to the outside of the housing 101 through the discharge port 16*s*. A discharge tray 17 on which the recording material P discharged by the discharge portion 16 is stacked is provided on the upper surface of the housing 101.

In the case of simplex printing, the recording material P having passed through the fixing nip Nf is discharged as it is by the discharge portion 16 through the discharge port 16*s* as illustrated in FIG. 1A. In the case of duplex printing, as illustrated in FIG. 2, after the trailing end of the recording material P in the discharge direction Dc has passed through the fixing nip Nf, the discharge driving roller 81 is rotationally driven in a direction opposite to the rotational direction following the discharge direction Dc, and the conveyance direction of the recording material P is reversed. That is, the recording material P on the first surface of which an image has been formed while being conveyed in the main conveyance path CP1 is switched back at the discharge portion 16, and is conveyed to the duplex conveyance path CP2. In other words, in the present example, the discharge portion 16 functions as a reverse conveyance portion that reverses the recording material P in the case of duplex printing. To be noted, a reverse conveyance roller pair serving as a reverse conveyance portion that reverses the recording material P may be provided in addition to the discharge portion 16. The recording material P conveyed along the duplex conveyance path CP2 is conveyed to the main conveyance path CP1 again in a state in which the first surface and the second surface thereof are switched. Then, an image is formed on the second surface of the recording material P while the recording material P is conveyed in the main conveyance path CP1 again, and the recording material P is discharged through the discharge port 16*s* by the discharge portion 16.

Duplex Conveyance Path

The duplex conveyance path CP2 will be described. As illustrated in FIG. 2, the duplex conveyance path CP2 is defined by a duplex guide 13, a duplex rib 42, a U-shaped guide 43, and the like. In other words, the housing 101 includes the duplex guide 13, the duplex rib 42, and the U-shaped guide 43. The duplex guide 13, the duplex rib 42, and the U-shaped guide 43 are each an example of a guide member that defines part of the conveyance path CP (part of the duplex conveyance path CP2).

In the present example, the main conveyance path CP1 extends approximately in the vertical direction toward the discharge portion 16 from the feeding portion 6. The duplex conveyance path CP2 extends in a direction (toward the −Y side) opposite to the discharge direction Dc in the Y-axis direction and extends downward (toward the −Z side) in the vertical direction, from the branching portion from the main conveyance path CP1. The duplex conveyance path CP2 merges with the main conveyance path CP1 via a U-shaped curved portion that is curved such that the duplex conveyance path CP2 is curved upward (toward the +Z side) in the vertical direction while extending toward the same side (+Y side) as the discharge direction Dc in the Y-axis direction.

The duplex guide 13 defines part of the duplex conveyance path CP2 (upstream portion of the duplex conveyance path CP2). The duplex guide 13 is an example of a guide member (second guide portion) defining a second conveyance path. The duplex guide 13 guides the first surface of the recording material P.

The duplex guide 13 has a shape curved to have a convex shape convex upward as viewed in the direction (X-axis direction) of the rotational axis of the photosensitive drum 1. In other words, the upper surface of the duplex guide 13 (second guide portion) is curved to have a convex shape convex upward as viewed in the width direction (X-axis direction) orthogonal to both the vertical direction and the discharge direction Dc. As viewed in the X-axis direction (width direction), the duplex guide 13 (second guide portion) is positioned between the discharge port 16*s* and the ventilating portion 51 (opening portion) of the housing 101 in a direction (Y-axis direction) orthogonal to the vertical direction.

Figure 6:
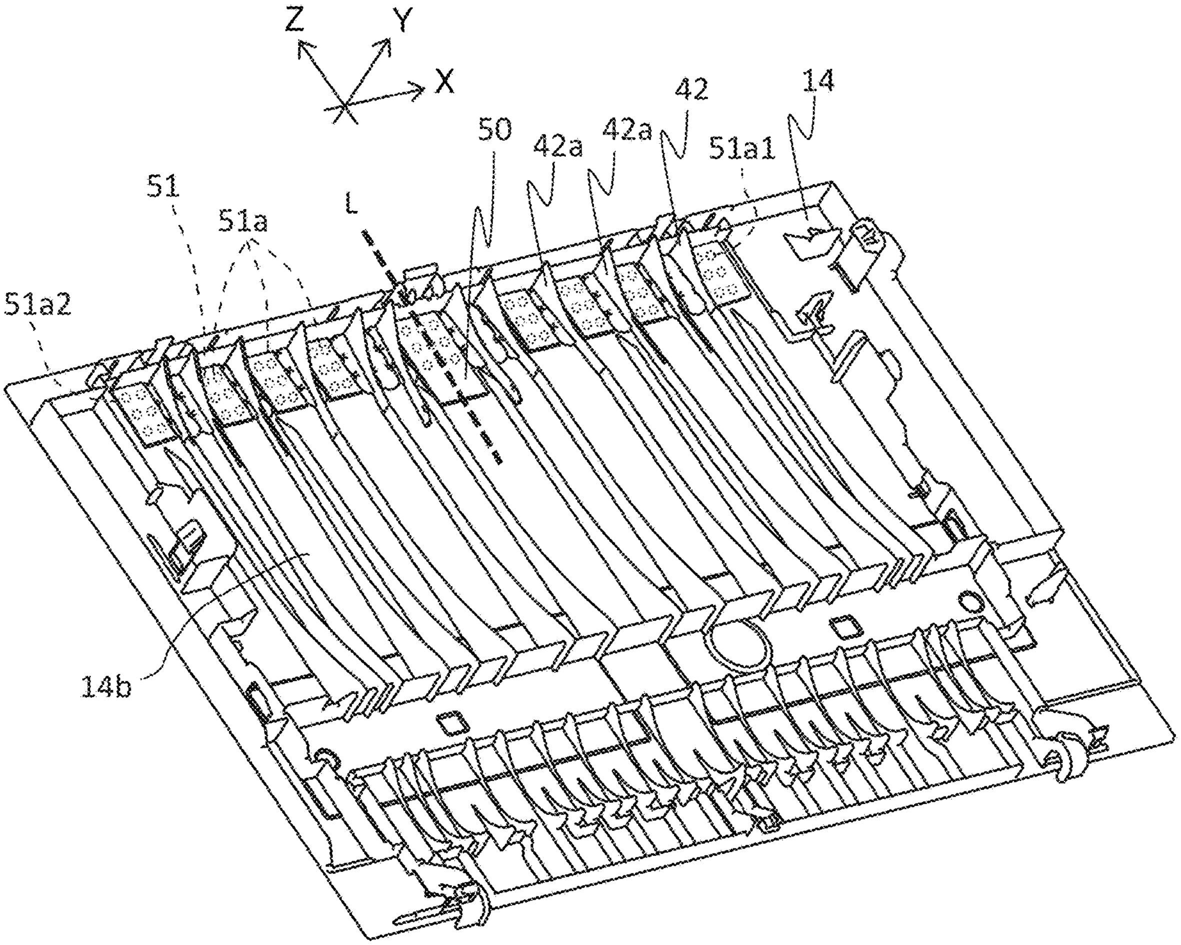
FIG. 6 is a perspective view of a back door according to Example 1.

The duplex rib 42 is part of the back door 14 (FIG. 6). The duplex rib 42 defines part (portion extending downward in the vertical direction) of the duplex conveyance path CP2 together with a guide portion 15*a* (FIG. 3) of a transfer guide unit 15. That is, the guide portion 15*a* of the transfer guide unit 15 is an example of an opposing portion opposing an inner surface 14*b* of the exterior member (back door 14) with a gap therebetween. In addition, the guide portion 15*a* is an example of a first guide portion opposing the inner surface 14*b* of the exterior member (back door 14) and defining part of the conveyance path CP together with the exterior member (back door 14). In other words, the gap (space) provided between the inner surface 14*b* and the guide portion 15*a* is part of the conveyance path CP (part of the duplex conveyance path CP2) that the recording material P passes through. It can be said that a space continuous with the gap provided between the inner surface 14*b* and the guide portion 15*a* communicates with the outside of the housing 101 through the ventilating portion 51. To be noted, the upper end portion of the duplex rib 42 in the present example opposes the duplex guide 13, and is curved in accordance with the curved shape of the duplex guide 13 as viewed in the X-axis direction.

The duplex rib 42 includes a plurality of rib shapes 42*a* (FIG. 6) arranged in the width direction. The rib shapes 42*a* each protrude inward (toward the +Y side) in the housing 101 with respect to the inner surface 14*b* of the back door 14, and extend approximately in the Z-axis direction. That is, the back door 14 has rib shapes protruding in a direction approaching the first guide portion (guide portion 15*a* of the transfer guide unit 15) from the inner surface 14*b* and extending in a recording material conveyance direction in the conveyance path. The duplex rib 42 comes into contact with the recording material P on the ridge line portion (end surface on the +Y side) of the rib shapes 42*a*, and guides the second surface of the recording material P.

The U-shaped guide 43 defines a curved portion of the duplex conveyance path CP2. The U-shaped guide 43 guides the first surface of the recording material P.

Jam Removal

In the case where a jam in which the recording material P stagnates in the image forming apparatus 100 during printing has occurred, the user can perform so-called jam removal of removing the stagnating recording material P from the inside of the image forming apparatus 100.

Figure 3A:
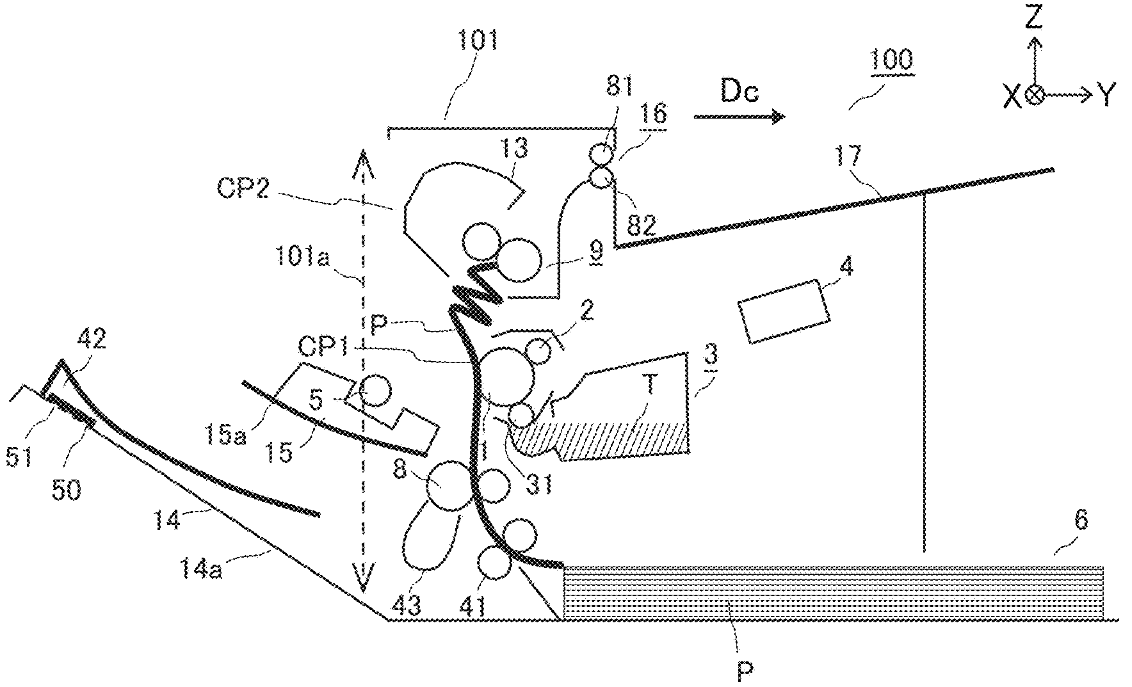
FIG. 3A is a schematic view of the image forming apparatus according to Example 1.
Figure 3B:
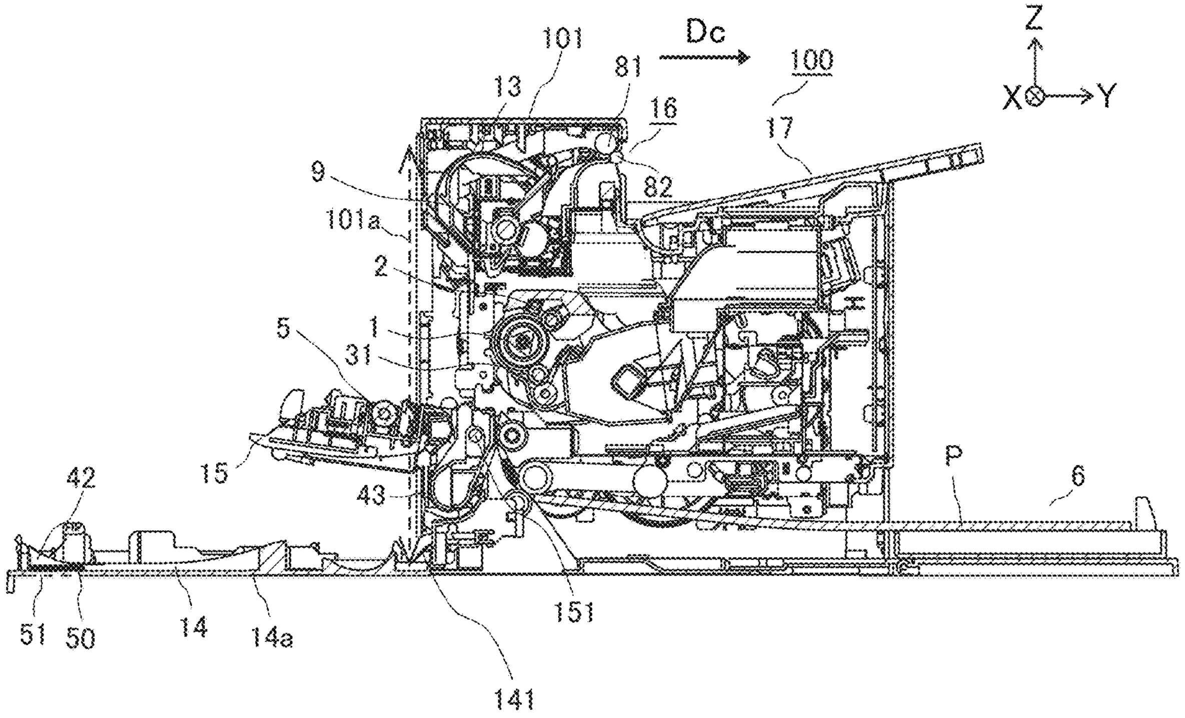
FIG. 3B is a detailed view of the image forming apparatus according to Example 1.

As illustrated in FIGS. 3A and 3B, the housing 101 of the image forming apparatus 100 includes the back door 14 and the transfer guide unit 15. The back door 14 and the transfer guide unit 15 are each an opening/closing member provided to be openable and closeable with respect to the other portions of the housing 101. The back door 14 and the transfer guide unit 15 are opened and closed in the case where the user performs the jam removal.

The housing 101 of the image forming apparatus 100 includes the back door 14 and the transfer guide unit 15. The back door 14 is an exterior member (rear cover) having an outer surface 14*a* serving as an exterior surface (second exterior surface) on the rear side (−Y side) of the housing 101.

The back door 14 is movable to an open position (FIGS. 3A and 3B) where a body opening 101*a* provided on the rear side of the housing 101 is open, and a closed position (FIGS. 1A and 1B) where the body opening 101*a* is closed. The back door 14 of the present example pivots about an axis extending in the X-axis direction about a hinge portion 141 provided at a lower end portion of the back door 14 positioned at the closed position. When the back door 14 is at the closed position, the recording material P can pass through the duplex conveyance path CP2. That is, the closed position of the back door 14 is a position at the time when the image forming apparatus 100 can perform the image forming operation. When the back door 14 is at the open position, at least part of the duplex conveyance path CP2 is opened, and thus the recording material P stagnating in the duplex conveyance path CP2 can be accessed from the outside of the housing 101. In other words, in a state in which the back door 14 serving as an exterior member is positioned at the open position, removal of the recording material P from part of the conveyance path CP (duplex conveyance path CP2) through the body opening 101*a* is allowed.

The transfer guide unit 15 includes the guide portion 15*a* that defines part of the duplex conveyance path CP2 together with the duplex rib 42 of the back door 14, and the transfer roller 5 described above. The transfer guide unit 15 is disposed between the back door 14 and the photosensitive drum 1. More specifically, the transfer guide unit 15 is disposed between the photosensitive drum 1 and the gap (space) provided between the inner surface 14*b* and the guide portion 15*a*. In the vertical direction, the transfer guide unit 15 is positioned below the ventilating portion 51, and the upper end of the transfer guide unit 15 is positioned above the photosensitive drum 1.

The transfer guide unit 15 is movable to a closed position (blocking position, FIGS. 1A and 1B) where the photosensitive drum 1 is covered as viewed from the rear side (−Y side) and an open position (exposing position, FIGS. 3A and 3B) where the photosensitive drum 1 is exposed as viewed from the rear side (−Y side). The transfer guide unit 15 of the present example pivots about an axis extending in the X-axis direction about a hinge portion 151 provided at a lower end portion of the transfer guide unit 15 positioned at the closed position. The position of the hinge portion 151 can be referred to as the position of the rotational axis of the transfer guide unit 15. In the vertical direction, the position of the rotational axis of the transfer guide unit 15 is positioned above the ventilating portion 51 and the photosensitive drum 1.

When the transfer guide unit 15 is at the closed position, the recording material P can pass through the main conveyance path CPL. That is, the closed position of the transfer guide unit 15 is a position at the time when the image forming apparatus 100 can perform the image forming operation. When the back door 14 is at the open position and the transfer guide unit 15 is at the open position, at least part of the main conveyance path CP1 is opened, and thus the recording material P stagnating in the main conveyance path CP1 can be accessed from the outside of the housing 101.

The transfer guide unit 15 of the present example is urged in a direction from the open position toward the closed position by a spring member. By urging the transfer guide unit 15 by the spring member, the contact pressure between the transfer roller 5 and the photosensitive drum 1 can be more stabilized.

In the case where the recording material P stagnates in the main conveyance path CP1, as illustrated in FIGS. 3A and 3B, the user opens both the back door 14 and the transfer guide unit 15. FIGS. 3A and 3B are a schematic diagram and a detailed diagram illustrating the jam removal in the case where the recording material P does not successfully pass through the fixing portion 9 and stagnates in the main conveyance path CP1. By opening both the back door 14 and the transfer guide unit 15, the user can grip and remove the recording material P stagnating in the main conveyance path CP1. Then, the user closes the back door 14 and the transfer guide unit 15 again, and thus the image forming apparatus 100 returns to the state in which the image forming operation can be performed.

As illustrated in FIG. 2, a jam can occur while the recording material P passes through the duplex conveyance path CP2 in duplex printing. In this case, it suffices if the user opens just the back door 14. By opening the back door 14, the user can grip and remove the recording material P stagnating in the duplex conveyance path CP2. Then, the user closes the back door 14 again, and thus the image forming apparatus 100 returns to the state in which the image forming operation can be performed.

Discharge Port

Figure 4A:
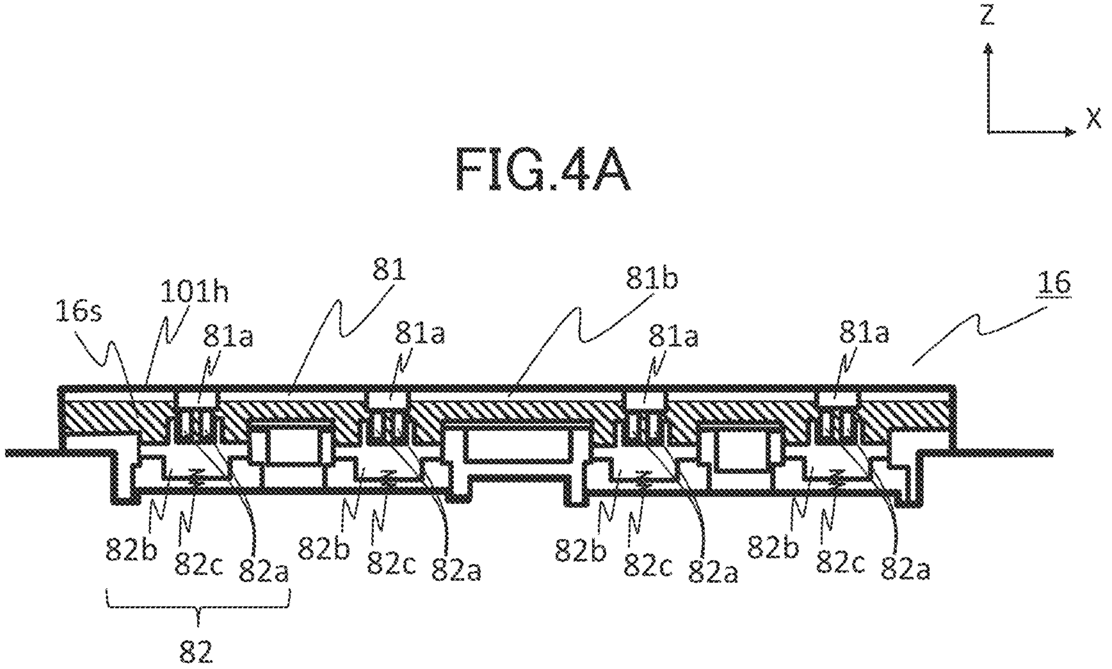
FIGS. 4A and 4B are diagrams illustrating a discharge port according to Example 1.
Figure 4B:
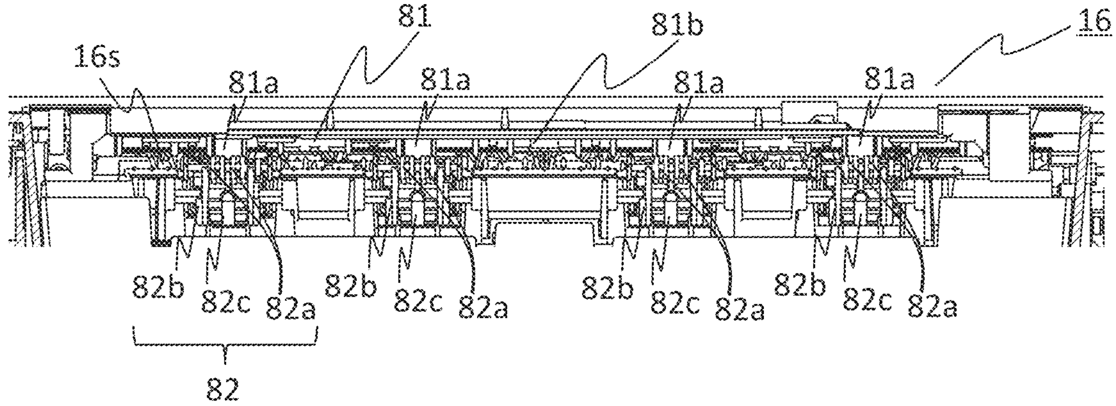

A configuration of the discharge port 16*s* of the present example will be described with reference to FIGS. 4A and 4B. FIG. 4A is a schematic diagram illustrating the discharge portion 16 of the present example as viewed from the front side (+Y side) of the image forming apparatus 100, and FIG. 4B is a detailed diagram of FIG. 4B.

In the present example, the discharge port 16*s* is an opening provided in a wall surface 101*f* (FIGS. 1A and 1B) facing to the front side (+Y side) of the housing 101, and is an opening that the recording material P discharged by the discharge portion 16 passes through. In other words, the housing 101 includes the wall surface 101*f* serving as a first exterior surface that faces in the discharge direction Dc and is provided with the discharge port 16*s* that the recording material P discharged by the discharge portion 16 passes through. To be noted, the wall surface 101*f* extends upward from the upstream end of the discharge tray 17 in the discharge direction Dc, and functions as a standard surface that aligns the recording material P by abutting the trailing end of the recording material P stacked on the discharge tray 17.

More specifically, in the present example, the discharge port 16*s* is an opening defined in the wall surface 101*f* of the housing 101 and extending to the inside of the image forming apparatus 100 when the image forming apparatus 100 is viewed from the front side (+Y side). In the present example, the conveyance path CP that is a space inside the image forming apparatus 100 and the space on the outside of the image forming apparatus 100 communicate with each other through the discharge port 16*s*.

Here, the configuration of the discharge portion 16 will be described. It is preferable that at least one roller of the roller pair for nipping and conveying the sheet material such as the recording material P is a divided roller including a plurality of rotary members (driving and driven roller portions) that each come into contact with the recording material P The divided roller is a roller which includes a plurality of rotary members each having a width smaller than the maximum width of the recording material P serving as a conveyance target in the width direction of the recording material P orthogonal to the discharge direction Dc of the recording material P and in which the plurality of rotary members are arranged in the width direction. As a result of using the divided roller, a situation in which rollers in the roller pair do not come into contact with each other or the contact pressure becomes insufficient in a partial region in the width direction that is caused by warpage of the roller become less likely to occur, and thus the recording material P can be conveyed more stably.

Each of the rollers of the roller pair for nipping and conveying the sheet material may be a divided roller. The discharge portion 16 of the present example is a roller pair including the discharge driving roller 81 and the discharge driven roller 82 that are each a divided roller.

The discharge driving roller 81 includes a shaft 81*b* extending in the width direction and a plurality of rubber roller portions 81*a* serving as a plurality of rotary members. In the present example, four rubber roller portions 81*a* are attached to one shaft 81*b*. A driving gear is provided at an end portion of the shaft 81*b*, and a driving force is input thereto from a drive source via the driving gear. As a result of input of the driving force to the shaft 81*b*, the shaft 81*b* and the four rubber roller portions 81*a* rotate integrally.

The discharge driven roller 82 includes a plurality of roller portions 82*a* serving as a plurality of rotary members, a plurality of roller holders 82*b* that hold the roller portions 82*a*, and a plurality of springs 82*c* that urge the roller holders 82*b*. The discharge driven roller 82 of the present example includes four roller portions 82*a* serving as a plurality of rotary members, four roller holders 82*b* that hold the roller portions 82*a*, and four springs 82*c* in correspondence with the four rubber roller portions 81*a* of the discharge driving roller 81. The roller portions 82*a* are each rotatably supported by corresponding one of the roller holders 82*b*. In addition, as a result of each roller holder 82*b* being urged by corresponding one of the springs 82*c*, the roller portion 82*a* corresponding thereto is in pressure contact with corresponding one of the rubber roller portions 81*a*. Each roller portion 82*a* rotates by following corresponding one of the rubber roller portions 81*a*.

In four regions apart from each other in the width direction, nip portions where the rubber roller portions 81*a* of the discharge driving roller 81 come into contact with the roller portions 82*a* of the discharge driven roller 82 are formed. The discharge portion 16 nips the recording material P in the nip portions described above, and conveys the recording material P in the discharge direction Dc by rotational driving of the discharge driving roller 81.

Since the discharge portion 16 has the configuration described above, the discharge port 16*s* serving as a region (hatched region of FIG. 4A) where the rotary members of the divided roller are not present is defined inside an opening 101*h* defined in the wall surface 101*f* of the housing 101. That is, in the present example, the "discharge port 16*s*" is a region obtained by excluding parts such as the rubber roller portions 81*a* of the discharge driving roller 81 and the roller portions 82*a* of the discharge driven roller 82 (that is, part that the recording material P cannot pass through) from the region inside the opening 101*h* provided in the wall surface 101*f* of the housing 101 when the image forming apparatus 100 is viewed from the front side (+Y side).

Ventilating Portion Near Fixing Portion

Figure 5:
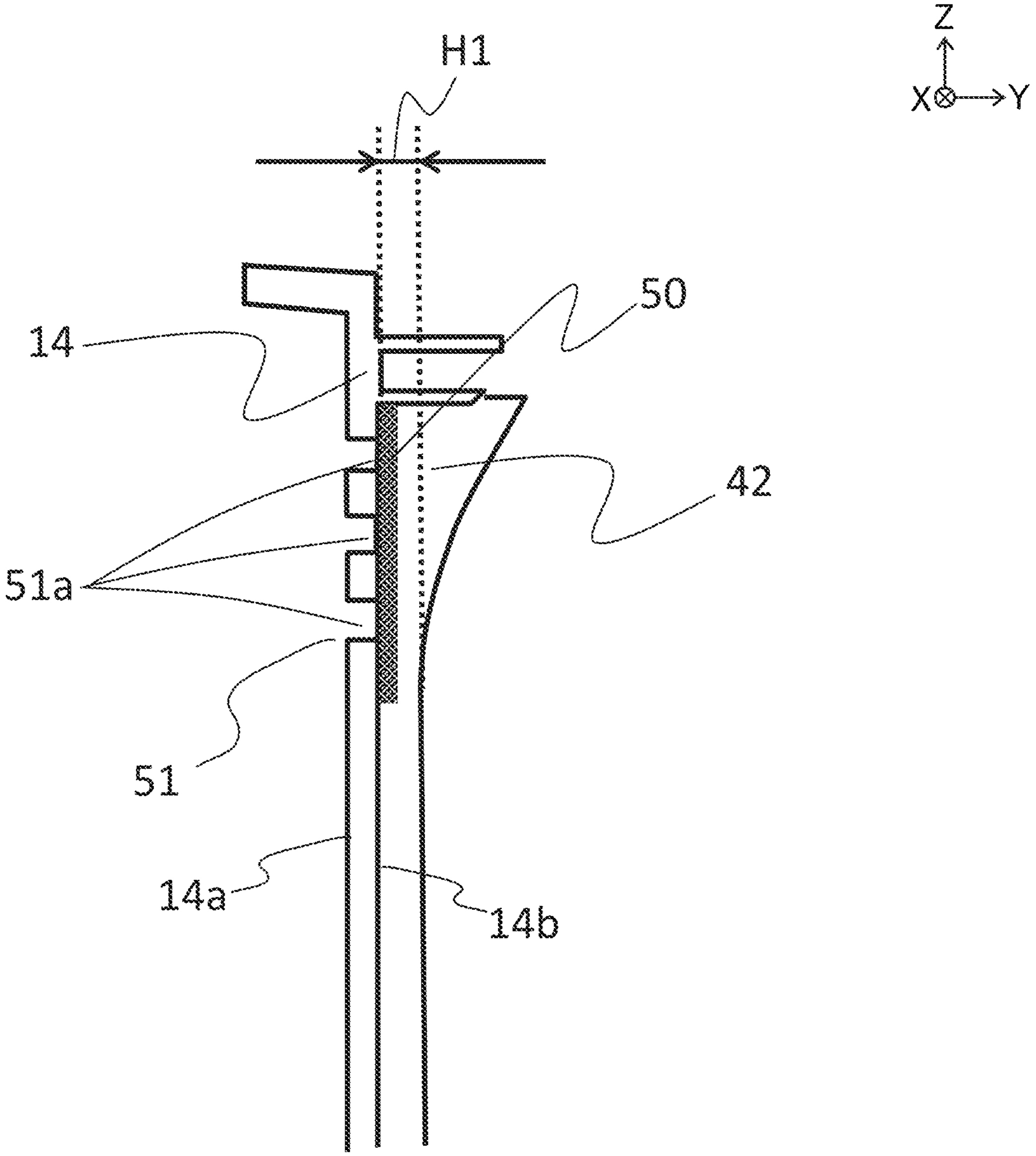
FIG. 5 is a diagram illustrating a ventilating portion and a filter according to Example 1.

The ventilating portion 51 serving as an opening portion provided in the vicinity of the fixing portion 9 of the image forming apparatus 100 will be described. FIG. 5 is a schematic diagram illustrating the ventilating portion 51, and illustrates a cross-section of the back door 14 orthogonal to the X-axis direction in which the ventilating portion 51 is provided. FIG. 6 is a perspective view of the back door 14. To be noted, FIG. 5 illustrates a cross-section taken along a dot line L in FIG. 6. In addition, as will be described later, since filters 50 covering the ventilating portion 51 is provided, the position of each of the vent holes 51*a* of the ventilating portion 51 is indicated by a dot line in FIG. 6.

As illustrated in FIG. 5, the ventilating portion 51 includes at least one vent hole 51*a* serving as an opening through which the outside and the inside of the image forming apparatus 100 communicate. More specifically, the outside of the image forming apparatus 100 communicates with the conveyance path CP (particularly the duplex conveyance path CP2 in the present example) that is a space inside the image forming apparatus 100 through the vent hole 51*a*. The ventilating portion 51 of the present example includes a plurality of vent holes 51*a*.

The vent hole 51*a* is opened toward the outside of the image forming apparatus 100 in the outer surface 14*a* that is a surface facing in a direction (−Y direction) opposite to the discharge direction Dc of the back door 14. In other words, the housing 101 includes the outer surface 14*a* serving as a second exterior surface facing in a direction opposite to the discharge direction Dc of the recording material P and provided with an opening portion (ventilating portion 51) through which the outside of the housing 101 and the conveyance path CP that the recording material P passes through in the housing 101 communicate with each other.

In the image forming apparatus 100, heat is generated in the fixing portion 9 that is of a thermal fixation system. When heat is accumulated in the image forming apparatus 100, there is a possibility that, for example, the temperature of the toner is raised and thus the nature of the toner changes, or aging of parts of the image forming apparatus 100 is accelerated. The ventilating portion 51 suppresses these problems by discharging the heat generated in the fixing portion 9 to the outside of the image forming apparatus 100.

In addition, in the fixing portion 9, water vapor is generated from the recording material P heated when passing through the fixing nip Nf. When water vapor is accumulated in the image forming apparatus 100, there is a possibility that, for example, water condensation occurs in the conveyance path CP, thus a water droplet attaches to the recording material P to cause an image defect or accelerate aging (rust of metal members, etc.) of parts of the image forming apparatus 100. The water vapor generated in the fixing portion 9 is discharged to the outside of the image forming apparatus 100 through the ventilating portion 51, and thus these problems are suppressed. In the Z-axis direction, the ventilating portion 51 is positioned above the photosensitive drum 1.

Heat and water vapor tend to move upward. Therefore, at least part of the ventilating portion 51 is positioned above an upper end position of the fixing nip Nf in the Z-axis direction (FIG. 1A). In addition, at least part of the discharge port 16*s* is positioned above the upper end position of the fixing nip Nf in the Z-axis direction (FIG. 1A). In other words, at least part of the discharge port 16*s* and at least part of the opening portion (ventilating portion 51) are positioned above the upper end position of the nip portion (fixing nip Nf) in the vertical direction.

The ventilating portion 51 of the present example is disposed at an upper end portion of the outer surface 14*a* of the back door 14 constituting the exterior surface (second exterior surface) on the rear side of the image forming apparatus 100. In the present example, the lower end position of the ventilating portion 51 is positioned above the upper end position of the fixing nip Nf in the Z-axis direction. In addition, in the present example, the lower end position of the discharge port 16*s* is positioned above the upper end position of the fixing nip Nf in the Z-axis direction. To be noted, the ventilating portion 51 can be also provided in a top surface of the housing 101.

A range in which the ventilating portion 51 is provided in the X-axis direction (width direction) will be hereinafter referred to as an installation range of the ventilating portion 51. In the case where the ventilating portion 51 includes the plurality of vent holes 51*a* (plurality of openings) provided at different positions in the X-axis direction as in the present example, the installation range of the ventilating portion 51 can be defined as follows. That is, a range in the X-axis direction from a vent hole 51*a*1 (first opening) that is the farthest on one side (+X side) in the X-axis direction among the plurality of vent holes 51*a* to a vent hole 51*a*2 (second opening) that is the farthest on the other side (−X side) in the X-axis direction is defined as the installation range of the ventilating portion 51 is defined as the installation range of the ventilating portion 51. As illustrated in FIG. 6, in the X-axis direction, the installation range of the ventilating portion 51 overlaps with the position of a dot line L. In other words, the dot line L is positioned between one end (position of the vent hole 51*a*1) and the other end (position of the vent hole 51*a*2) of the installation range of the ventilating portion 51 in the X-axis direction. To be noted, the position of the dot line L in the X-axis direction coincides with the position of the center of the conveyance path CP in the X-axis direction and the position of the center of the passage region of the recording material P in the X-axis direction.

In the fixing portion 9, heat for fixing the toner image is mainly generated in the passage region of the recording material P in the X-axis direction (width direction). In addition, since water vapor is generated from the recording material P by heating the recording material P in the fixing nip Nf, water vapor is generated in the passage region of the recording material P in the X-axis direction (width direction). Here, among recording materials P on which the image forming operation can be performed by the image forming apparatus 100, a recoding material P having the largest size in the X-axis direction (width direction) will be referred to as a recording material P of the maximum size. Therefore, the installation range of the ventilating portion 51 preferably overlaps with the passage region of the recording material P of the maximum size in the X-axis direction (width direction). In the present example, the installation range of the ventilating portion 51 overlaps with the passage region of the recording material P of the LTR size that is of the maximum sheet-passing width of the image forming apparatus 100. As a result of this, heat and water vapor generated in the fixing portion 9 can be efficiently discharged to the outside of the image forming apparatus 100.

In the X-axis direction (width direction), the length of the installation range of the ventilating portion 51 (length from one end to the other of the installation range of the ventilating portion 51) is preferably 50% or more, and more preferably 700% or more of the length of the conveyance path CP. In addition, in the X-axis direction, the length of the installation range of the ventilating portion 51 is preferably 50% or more, and more preferably 70% or more of the length of the recording material P of the maximum size. In addition, in the X-axis direction, it is preferable that the installation range of the ventilating portion 51 includes a range of the maximum width (effective printing region) on which the image forming portion 10 can form an image. In the present example, in the X-axis direction (width direction), the length of the installation range of the ventilating portion 51 is 90% or more of the recording material P of the maximum size. For the reason described above, in the fixing portion 9, mainly heat and water vapor are generated within the passage region of the recording material P. Therefore, as a result of the ventilating portion 51 being provided in a range of a predetermined proportion or more with respect to the recording material P of the maximum size, the heat and water vapor generated in the fixing portion 9 can be efficiently discharged to the outside of the image forming apparatus 100.

Here, among recording materials P on which the image forming apparatus 100 can perform the image forming operation, a recording material P having the smallest size in the X-axis direction (width direction) will be referred to a recording material P of the minimum size. The installation range of the ventilating portion 51 preferably at least include the passage region of the recording material P of the minimum size. That is, in the X-axis direction (width direction), the length of the installation range of the ventilating portion 51 is larger than the length of the recording material P of the minimum size. This is because regardless of the size of the recording material P, at least part of the recording material P on which an image is formed by the image forming apparatus 100 always passes through the passage region of the recording material P of the minimum size, and therefore water vapor is likely to be generated in the passage region of the recording material P of the minimum size.

In the case where the breathability of the ventilating portion 51 is higher, the amount of heat and water vapor that can be discharged through the ventilating portion 51 is larger, and therefore the problem caused by the accumulation of heat and water vapor can be suppressed more reliably. However, if the breathability of the ventilating portion 51 is too high, the speed of wind passing through the conveyance path CP and then the ventilating portion 51 from the discharge port 16s in the case where a wind blows in from the front side (+Y side) of the image forming apparatus 100 becomes high, and dust becomes more likely to enter. Therefore, the breathability of the ventilating portion 51 may be set in consideration of the balance between the amount of heat and water vapor that can be discharged from the ventilating portion 51 and suppression of the entrance of dust through the discharge port 16s. Specifically, the number of the vent holes 51a of the ventilating portion 51, the opening area of each individual vent hole 51a, the total opening area of all the vent holes 51a included in the ventilating portion 51, and the like may be set in consideration of the balance described above.

As illustrated in FIG. 6, in the present example, each vent hole 51a has a circular shape, and the diameter thereof is, for example, 3.5 mm. To be noted, the shape and size of the vent hole 51a can be changed.

The ventilating portion 51 of the present example is disposed such that three rows of vent holes 51a in each of which nineteen vent holes 51a are arranged in the X-axis direction (width direction) are arranged in the Z-axis direction. That is, the ventilating portion 51 includes fifty-seven vent holes 51a in total. The width of the range in which the ventilating portion 51 is provided in the X-axis direction (width direction) is 209 mm, which is larger than the width (206 mm) of the effective printing region for the recording material P of the maximum size (LTR size).

In addition, the vent holes 51a are disposed in a region between the plurality of rib shapes 42a of the duplex rib 42 included in the back door 14 in the X-axis direction (width direction). The vent holes 51a penetrate from the outer surface 14a to the inner surface 14b of the back door 14 (FIG. 5).

Filters

The filters 50 included in the image forming apparatus 100 of the present example will be described. As illustrated in FIGS. 5 and 6, the image forming apparatus 100 includes the filters 50 disposed to cover the ventilating portion 51. More specifically, at least one filter 50 covering each of the vent holes 51a of the ventilating portion 51 is attached to the inner surface 14b of the back door 14. By providing the filters 50 covering the ventilating portion 51, as will be described later, entrance of dust through the vent holes 51a and entrance of dust through the discharge port 16s can be suppressed.

To be noted, in the present disclosure, foreign matter that can enter the inside of the image forming apparatus 100 by being blown by an airflow flowing from the outside to the inside of the image forming apparatus 100 will be collectively referred to as "dust". Therefore, the "dust" may be particles (for example, particles derived from plastics or wood) other than sand particles, or may contain a plurality of kinds of particles.

In the back door 14 of the present example, a plurality of vent holes 51a are respectively disposed in a plurality of regions formed between the plurality of rib shapes 42a of the duplex rib 42. In the description below, a plurality of vent holes 51a disposed in one of the regions between rib shapes 42a adjacent in the X-axis direction will be referred to as a group of vent holes 51a. In the present example, one group of vent holes 51a is disposed in each of nine regions between the plurality of rib shapes 42a. In addition, the nine regions between the plurality of rib shapes 42a are each provided with one filter 50. The filter 50 disposed in each region covers all the vent holes 51a of the group in the corresponding region. The image forming apparatus 100 of the present example includes nine filters 50 in total.

The filter 50 is formed from a material having breathability, moisture permeability, and high resistance to heat and moisture. As the material of the filter 50, (1) a sponge material such as polyurethane foam, acrylic foam, or melamine foam, or (2) an unwoven fabric formed from fiber such as cotton, polyethersulfone (PES), polyethylene terephthalate (PET), or glass can be used. In addition, as the material of the filter 50, (3) filter paper (paper filter), or (4) metal filter formed from stainless steel or the like can be used. Since the performance desired for the filter 50 changes in accordance with various factors such as the positional relationship between the fixing portion 9 and the ventilating portion 51, the adjusted temperature of the heater 113, the shape of the ventilating portion 51, the expected use environment, and the like, and therefore the material, thickness, and the like of the filter 50 can be appropriately changed.

In the present example, a filter obtained by compressing a sheet material of moltopren (registered trademark) SM-55 that is a urethane foam manufactured by INOAC CORPORATION to ½ in the thickness direction is used as the filter 50.

The thickness of the filter 50 of the present example is set such that the filter 50 does not come into contact with the recording material P conveyed in the duplex conveyance path CP2. That is, as illustrated in FIG. 5, the thickness of the filter 50 is smaller than the protruding amount of the rib shapes 42a of the duplex rib 42 with respect to the inner surface 14b of the back door 14 at each position in the range in which the filter 50 is provided in the Z-axis direction. In other words, the thickness of the filter 50 is smaller than a minimum value H1 of the protruding height of the duplex rib 42 with respect to the inner surface 14b of the back door 14. The minimum value H1 of the protruding amount of the rib shapes 42a is, for example, 3.5 mm, and the thickness of the filter 50 is 1 mm.

When the filter 50 comes into contact with the recording material P conveyed in the duplex conveyance path CP2, there is a possibility that skew or jam of the recording material P occurs, or the recording material P is contaminated by water droplet or foreign matter attached to the filter 50. By setting the thickness of the filter 50 to be smaller than the protruding height of the duplex rib 42, the possibility of occurrence of such a problem can be lowered.

For example, the filter 50 is stuck to the inner surface 14b of the back door 14 with a double-sided tape or an adhesive. In the case where the filter 50 is stuck to the inner surface 14b with a double-sided tape, it is preferable that holes defined in the double-sided tape overlap with the ventilating portion 51 so as to suppress blockage of the ventilating portion 51 by the double-sided tape. To be noted, as illustrated in FIG. 6, a center filter 50 among the nine filters 50 covers more vent holes 51a than the other eight filters 50, and is wider in the X-axis direction than the other eight filters 50. Therefore, for the center filter 50, attachment of the center filter 50 at a wrong position (miss-assembly) can be reduced by setting the length of the center filter 50 in the Z-axis direction to be larger than that of the other eight filters 50. That is, in the case where a plurality of filters 50 are provided and the length in a predetermined direction of part of the filters 50 is different from that of the other filters 50, miss-assembly can be reduced by making the length of the part of the filters 50 in a direction orthogonal to the predetermined direction different from that of the other filters 50. As described above, the plurality of filters 50 may include a filter 50 having a first shape and a filter 50 having a second shape different from the first shape.

Airflow in Image Forming Apparatus

The airflow in the case where air outside the image forming apparatus 100 (hereinafter referred to as outside air) flows in to the inside of the image forming apparatus 100 will be described. Since the inside of the image forming apparatus 100 is a space that is not completely sealed, the outside air can flow thereinto due to an influence of wind or the like.

The flow of air flowing inside the image forming apparatus 100 will be described with reference to FIGS. 7A, 7B, 8A, and 8B, and Table 1. The arrows in the diagrams indicate directions of main airflows. The thickness of the arrows indicates the speed of the flow (wind speed), and a thicker arrow indicates a higher speed.

Figure 7A:
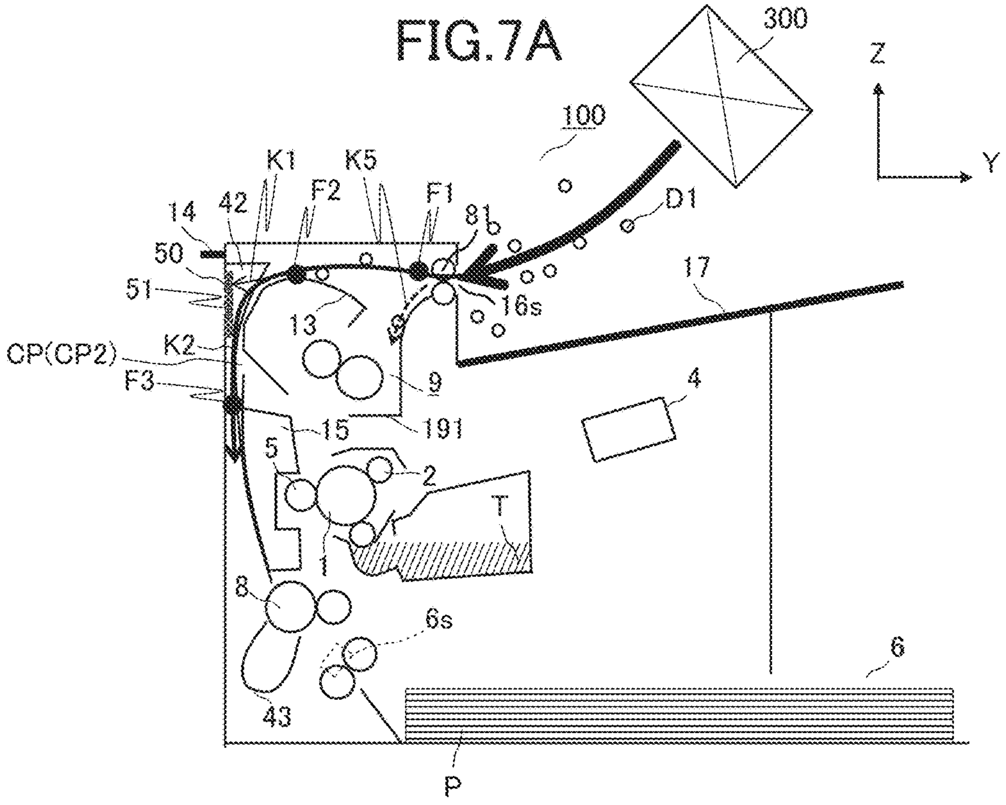
FIGS. 7A and 7B are diagrams illustrating an airflow in the image forming apparatus according to Example 1.
Figure 7B:
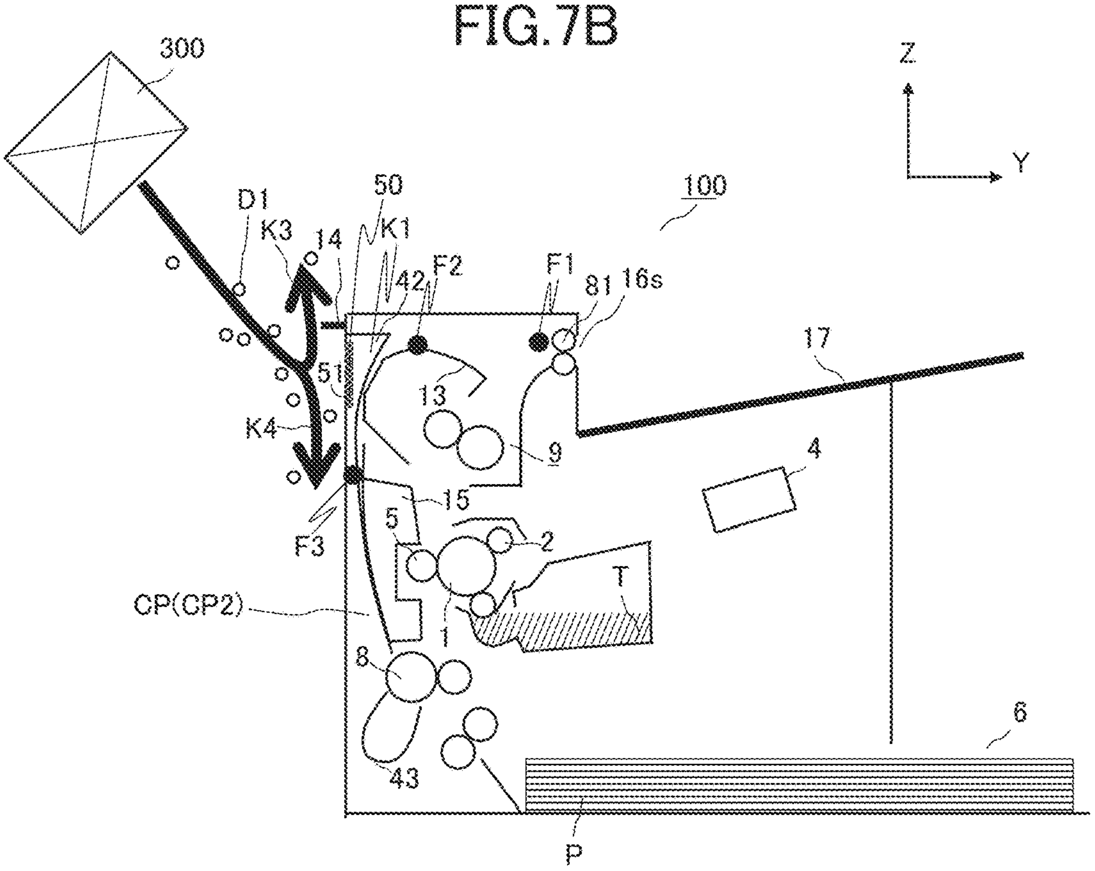
Figure 8A:
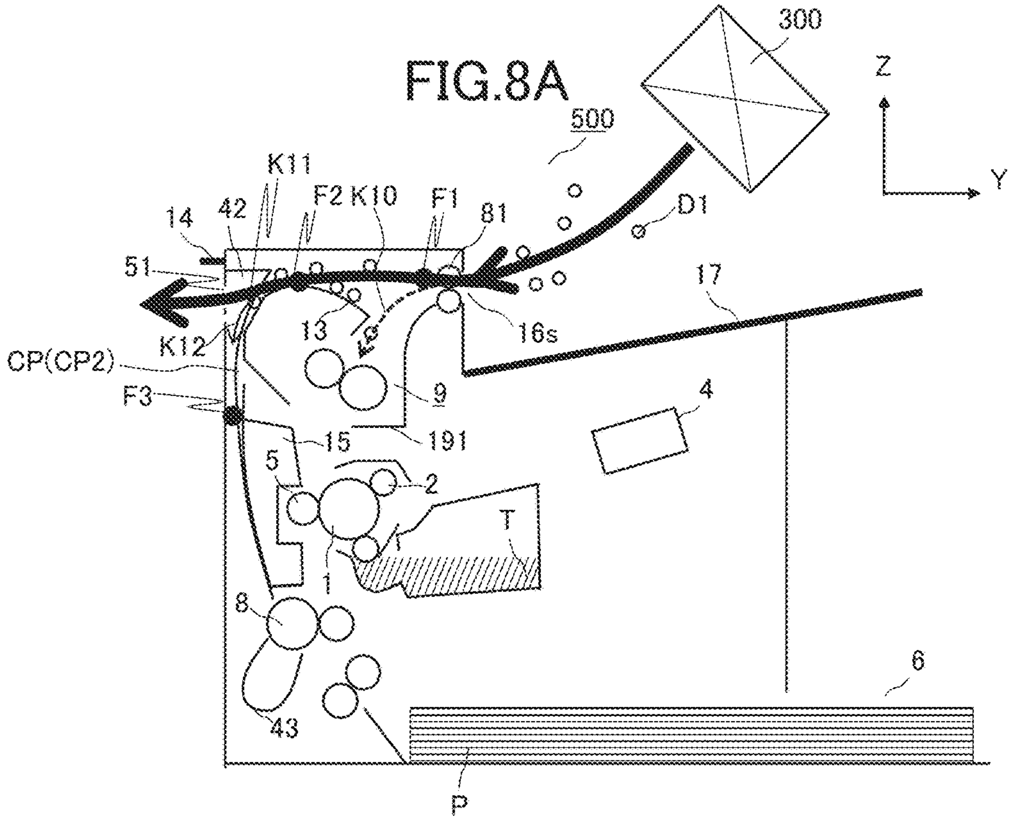
FIGS. 8A and 8B are diagrams illustrating an airflow in the image forming apparatus according to Comparative Example 1.
Figure 8B:
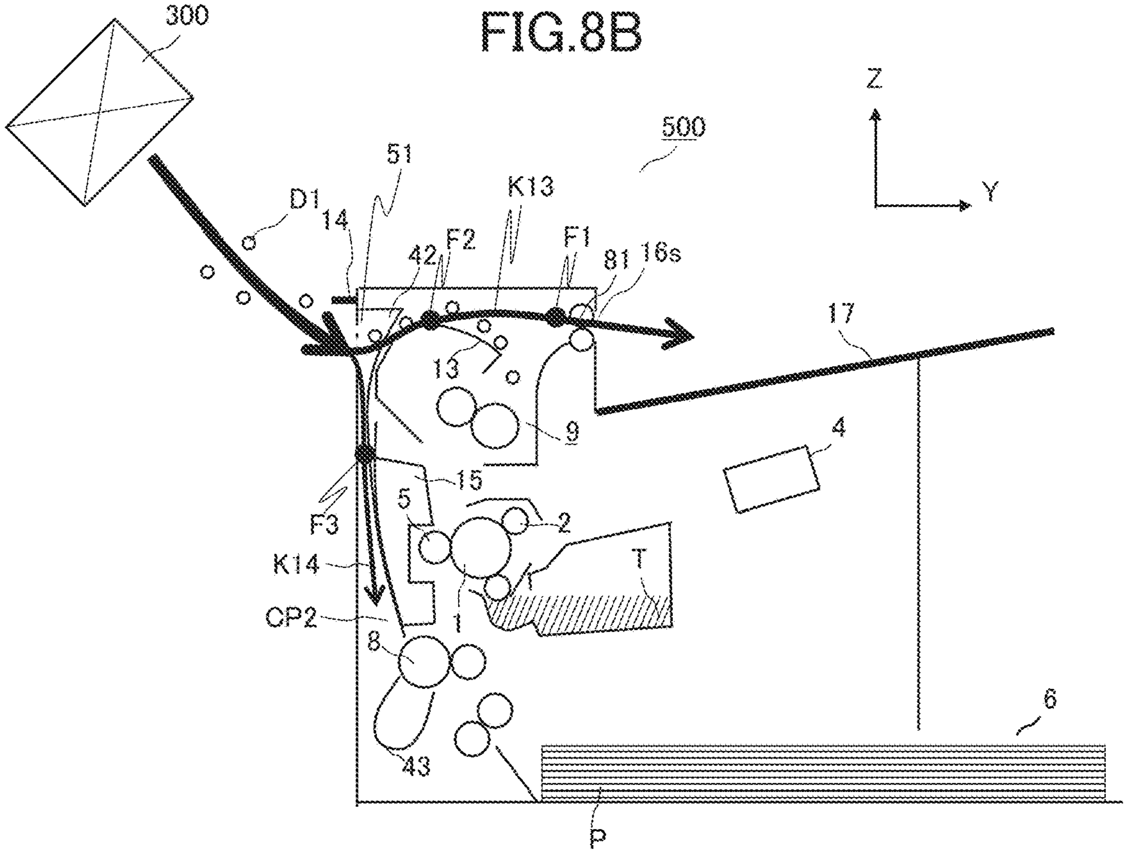

FIGS. 7A and 7B are each a diagram for describing the flow of air in the image forming apparatus 100 of the present example in which the filters 50 are provided on the ventilating portion 51. FIGS. 8A and 8B are each a diagram for describing the flow of air in an image forming apparatus 500 of Comparative Example 1 in which the filters 50 are not provided on the ventilating portion 51. The image forming apparatus 500 of Comparative Example 1 has the same configuration as the image forming apparatus 100 of Example 1 except that the filters 50 are not provided on the ventilating portion 51.

FIGS. 7A and 8A each illustrate a flow of air in the case where wind is blown from the front side (+Y side) of the image forming apparatus 100 by using an air blower 300. FIGS. 7B and 8B each illustrate a flow of air in the case where wind is blown from the rear side (−Y side) of the image forming apparatus 100 by using the air blower 300.

Table 1 illustrates results of measurement of wind speed at measurement positions (F1 to F3) in the image forming apparatus 100 in the case where the wind was blown from the front side or the rear side. SPCON-MAMA WM-SC manufactured by ONISHI ELECTRIC INDUSTRY CO., LTD. was used as the air blower 300. In the case of blowing wind from the front side, the air blower 300 was disposed such that wind of a wind speed of 1 m/s was blown on the discharge port 16*s*. In the case of blowing wind from the rear side, the air blower 300 was disposed such that wind of a wind speed of 1 m/s was blown on the ventilating portion 51. To be noted, even in the case where the air blower 300 is disposed such that wind of a wind speed of 1 m/s is blown on the discharge port 16*s*, the wind speed of the wind blowing into the image forming apparatus 100 through the discharge port 16*s* is not necessarily 1 m/s, and is normally lower than 1 m/s.

The wind speed in the image forming apparatus 100 was measured by using a micro wind speed meter manufactured by Tohnic. Since this measurement device is capable of measuring the wind speed in a range of 0.1 m/s or higher, a case where the wind speed is lower than the detection lower limit (0.1 m/s) of the measurement device is described as "<0.1" (m/s) in Table 1.

A probe of the wind speed meter was disposed in each of three measurement positions (F1 to F3) in the image forming apparatus 100 illustrated in each of FIGS. 7A, 7B, 8A, and 8B. The first measurement position F1 is in the vicinity of the discharge port 16*s*. The second measurement position F2 is a position that is in the vicinity of the ventilating portion 51 and, in the recording material conveyance direction, upstream of a portion of the duplex conveyance path CP2 that is the closest to the ventilating portion 51. The third measurement position F3 is a position that is in the vicinity of the ventilating portion 51 and, in the recording material conveyance direction, downstream of the portion of the duplex conveyance path CP2 that is the closest to the ventilating portion 51. Specifically, the probe at the second measurement position F2 was disposed on the upper surface of the duplex guide 13, and the probe at the third measurement position F3 was disposed between the rib shapes 42*a* of the duplex rib 42 at a position below the ventilating portion 51.

TABLE 1

| | Wind speed when wind is blown from front side at 1 m/s (m/s) | | | Wind speed when wind is blown from rear side at 1 m/s (m/s) | | |
|---|---|---|---|---|---|---|
| | F1 position | F2 position | F3 position | F1 position | F2 position | F3 position |
| Comparative Example 1 | 0.41 | 0.27 | <0.1 | 0.12 | 0.19 | 0.11 |
| Example 1 | 0.24 | 0.15 | 0.10 | <0.1 | <0.1 | <0.1 |

First, a case where wind is blown on the image forming apparatus 500 of Comparative Example 1 from the front side (+Y side) will be described with reference to FIG. 8A. In this case, the outside air flows into the image forming apparatus 500 through the discharge port 16*s*, and air of an amount corresponding to the amount of outside air having flowed in is discharged to the outside of the image forming apparatus 500 through the ventilating portion 51 and the inlet port 6*s*. The air having flowed into the image forming apparatus 500 through the discharge port 16*s* mainly passes through a space on the upper side of the duplex guide 13 and passes to the outside of the image forming apparatus 500 through the ventilating portion 51 (path K11).

In Comparative Example 1, the path reaching the ventilating portion 51 through the discharge port 16*s* and the space on the upper side of the duplex guide 13 in the image forming apparatus 500 is a space similar to an air duct that does not have many steep curves or narrow portions. When air flows into the image forming apparatus 500 through the discharge port 16*s*, the air in the conveyance path CP is pushed out toward the ventilating portion 51, and passes to the outside of the image forming apparatus 500 through the ventilating portion 51. Therefore, an airflow is generated at the first measurement position F1 and the second measurement position F2 positioned on the path described above. As shown in Table 1, in the case where wind of a wind speed of 1 m/s was blown from the front side in Comparative Example 1, the wind speed at the first measurement position F1 was 0.41 m/s, and the wind speed at the second measurement position F2 was 0.27 m/s.

The reason why the wind speed at the second measurement position F2 above the duplex guide 13 is lower than the wind speed at the first measurement position F1 in the vicinity of the discharge port 16*s* is because the space or members present between the first measurement position F1 and the second measurement position F2 generate a resistance force against the airflow. That is, part of the air passing the first measurement position F1 flows back in the main conveyance path CP1 to the space around the fixing portion 9. In addition, the conveyance guides and rib shapes present between the first measurement position F1 and the second measurement position F2 interrupt the airflow and thus generate the resistance force.

In addition, in Comparative Example 1, the wind speed at the third measurement position F3 was below the detection lower limit. Part of the air having passed the second measurement position F2 is discharged to the outside of the housing 101 (outside of the image forming apparatus 500) through the inlet port 6*s* for receiving the recording material P from the feeding portion 6. However, the path from the second measurement position F2 to the inlet port 6*s* is longer than the path from the second measurement position F2 to the ventilating portion 51. In addition, since the duplex rib 42 and the U-shaped guide 43 are present on the path from the second measurement position F2 to the inlet port 6*s*, the space that the air can pass through is narrow and the resistance force against the airflow is large in the path from the second measurement position F2 to the inlet port 6*s*. Therefore, it can be considered that, in Comparative Example 1, most of the air having passed the second measurement position F2 was discharged through the ventilating portion 51, and only a very small amount of air passed through a path K12 to the inlet port 6*s*.

Next, a case where air is blown on the image forming apparatus 500 of Comparative Example 1 from the rear side (−Y side) will be described with reference to FIG. 8B. In this case, the outside air flows into the image forming apparatus 500 through the ventilating portion 51, and air of an amount corresponding to the amount of outside air having flowed in is discharged to the outside of the image forming apparatus 500 through the discharge port 16*s* and the inlet port 6*s*.

For the reason described above, air more easily flows in the path from the ventilating portion 51 to the discharge port 16*s* than in the path from the ventilating portion 51 to the inlet port 6*s*. Therefore, the wind speed at the second measurement position F2 is higher than the wind speed at the third measurement position F3. As shown in Table 1, in the case where wind of a wind speed of 1 m/s was blown from the rear side, the wind speed at the second measurement position F2 was 0.19 m/s, and the wind speed at the third measurement position F3 was 0.11 m/s. To be noted, in the path from the ventilating portion 51 to the discharge port 16*s*, the wind speed was 0.12 m/s at the first measurement position F1 positioned downstream of the second measurement position F2.

Next, the airflow in the case of blowing wind on the image forming apparatus 100 of Example 1 from the front side (+Y side) will be described in comparison with Comparative Example 1 with reference to FIG. 7A.

In this case, similarly to Comparative Example 1, the outside air flows into the image forming apparatus 100 through the discharge port 16*s*, and air of an amount corresponding to the amount of outside air having flowed in is discharged to the outside of the image forming apparatus 100 through the ventilating portion 51 and the inlet port 6*s*

To be noted, in the present example, since the filters 50 are provided on the ventilating portion 51, the airflow is less likely to passe through the ventilating portion 51 than in Comparative Example 1. Therefore, as compared with Comparative Example 1, the airflow (path K1) from the discharge port 16*s* to the ventilating portion 51 through the space on the upper side of the duplex guide 13 is less than the airflow (path K11 of FIG. 8A) corresponding to this in Comparative Example 1.

Since the airflow is less likely to pass through the ventilating portion 51 in the present example, the ratio of the air flowing in a path K2 to the inlet port 6*s* without flowing toward the ventilating portion 51 becomes higher in the air having flowed in through the discharge port 16*s* and passed the second measurement position F2. However, as described above, in the path from the ventilating portion 51 to the inlet port 6*s*, since the duplex rib 42 and the U-shaped guide 43 generate reaction force, the air is less likely to move.

In the case where wind is blown from the front side, the wind speed at the first measurement position F1 in the vicinity of the discharge port 16*s* can be regarded as the wind speed of the wind blowing into the conveyance path CP through the discharge port 16*s*. As shown in Table 1, the wind speed (0.24 m/s) at the first measurement position F1 in the case where wind was blown from the front side in Example 1 was lower than the wind speed (0.41 m/s) at the first measurement position F1 in the case where wind was blown from the front side in Comparative Example 1. That is, the wind speed of the wind blowing into the conveyance path through the discharge port 16*s* in the case where wind of a predetermined wind speed (for example, 1 m/s) is blown from the outside of the image forming apparatus 100 of Example 1 toward the discharge port 16*s* is lower than the wind speed of the wind blowing into the conveyance path through the discharge port 16*s* in the case where wind of the predetermined wind speed is blown from the outside of the image forming apparatus 100 of Example 1 toward the discharge port 16*s* in a state (Comparative Example 1) in which the filters 50 are removed from the image forming apparatus 100 of Example 1.

As described above, in the case where wind is blown on the image forming apparatus 100 of Example 1 from the front side (+Y side), the air in the image forming apparatus 100 overall is less likely to move than in Comparative Example 1. In other words, in Example 1, as a result of the filters 50 being provided on the ventilating portion 51 in Example 1, the air pressure in the image forming apparatus 100 when wind is blown from the front side is higher than in Comparative Example 1 not provided with the filters 50. As a result of this, the outside air is less likely to flow into the image forming apparatus 100, and thus entrance of dust particles is reduced.

As shown in Table 1, in the case where wind of a wind speed of 1 m/s was blown on the image forming apparatus 100 of the present example, the wind speed at the first measurement position F1 was 0.24 m/s, and the wind speed at the second measurement position F2 was 0.15 m/s. These values were respectively lower than the wind speed at the first measurement position F1 and the wind speed at the second measurement position F2 in the case where the wind of the wind speed of 1 m/s was blown from the front side in Comparative Example 1.

In contrast, in the case where the wind of the wind speed of 1 m/s was blown on the image forming apparatus 100 of the present example from the front side, the wind speed at the third measurement position F3 was 0.10 m/s. This value was higher than the wind speed at the third measurement position F3 in the case where the wind of the wind speed of 1 m/s was blown from the front side in Comparative Example 1. This is because whereas almost all the air having passed the second measurement position F2 is discharged through the ventilating portion 51 in Comparative Example 1, in the present example, since the air is less likely to passed through the ventilating portion 51, the proportion of the air flowing toward the inlet port 6$s$ in the air having passed the second measurement position F2 is higher.

Next, the airflow in the case where wind is blown on the image forming apparatus 100 of Example 1 from the rear side (−Y side) will be described in comparison with Comparative Example 1 with reference to FIG. 7B.

In this case, similarly to Comparative Example 1, the outside air flows into the image forming apparatus 100 through the ventilating portion 51, and air of an amount corresponding to the amount of outside air having flowed in is discharged to the outside of the image forming apparatus 100 through the discharge port 16$s$ and the inlet port 6$s$.

To be noted, in the present example, since the filters 50 are provided on the ventilating portion 51, the airflow is less likely to pass through the ventilating portion 51 than in Comparative Example 1. Therefore, the amount of air entering the inside of the image forming apparatus 100 through the ventilating portion 51 is smaller than in Comparative Example 1. The air that does not enter the inside of the image forming apparatus 100 through the ventilating portion 51 hits the outer surface 14$a$ of the back door 14 and is then spread (arrows K3 and K4). As a result of this, as shown in Table 1, the wind speed was below the detection lower limit in each of the first measurement position F1, the second measurement position F2, and the third measurement position F3.

Here, as an external environment in which the image forming apparatus 100 is actually disposed, a case where a wind from an air conditioner or an outdoor wind is blowing and the wind includes a dust is considered.

The dust included in the outside air also moves in the image forming apparatus 100 along the flow of air in the image forming apparatus 100 generated by the blow-in of the outside air. Therefore, there is a possibility that dust accumulates in the path in which the air flows. When the airflow is stronger, that is, when the wind speed is higher, the dust is more likely to move by being blown by the wind. In addition, the likelihood of movement of the dust also depends on the size of the dust particles, and there is a tendency that the dust is more likely to move by being blown by the wind when the particles are smaller.

There is a case where an airflow flowing through a space through which the discharge port 16$s$ and the ventilating portion 51 communicate with each other is generated by air conditioning equipment or air blowing equipment in a room in which the image forming apparatus 100 is installed. In the case where the image forming apparatus 100 is used in an environment in which a large amount of dust is present in the air and the flow of air flowing through the space through which the discharge port 16$s$ and the ventilating portion 51 communicate with each other is strong, the dust can enter the image forming apparatus 100 together with the outside air. Further, when the photosensitive drum 1 and the fixing film 112 of the fixing portion 9 are damaged by the dust having entered the image forming apparatus 100 and breakage of the member or an image defect occurs, these parts need to be replaced.

As described above, in the present example, as a result of providing the filters 50 on the ventilating portion 51, the outside air is less likely to enter the inside of the image forming apparatus 100 through the discharge port 16$s$ and the ventilating portion 51. Therefore, entrance of the dust with the outside air into the image forming apparatus 100 can be suppressed.

An experiment conducted for inspecting the effect of providing the filters 50 such as suppression of entrance of dust will be described below.

Size and Entrance Likelihood of Dust Particles

Figure 9A:
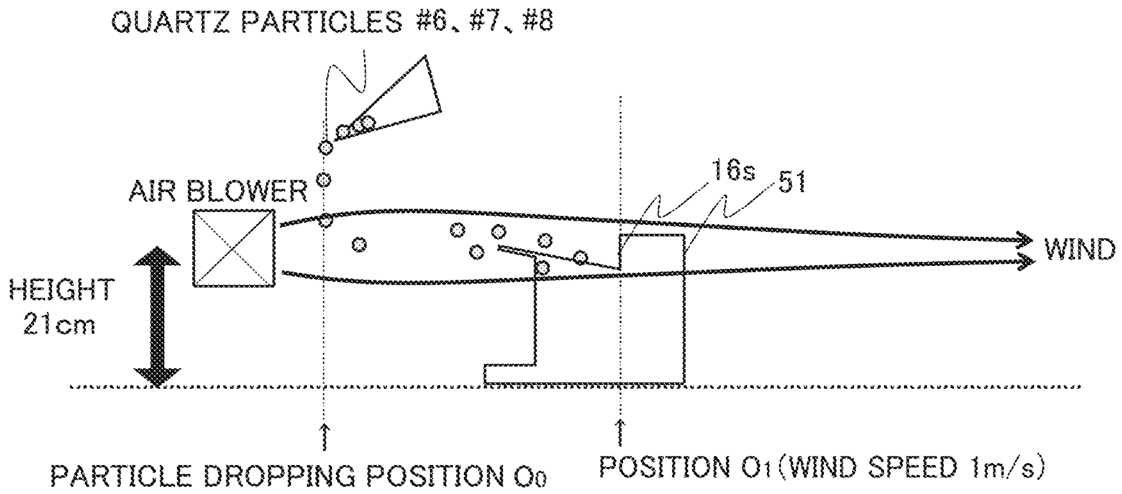
FIGS. 9A and 9B are explanatory diagrams of an experiment of allowing dust particles into the image forming apparatus.
Figure 9B:
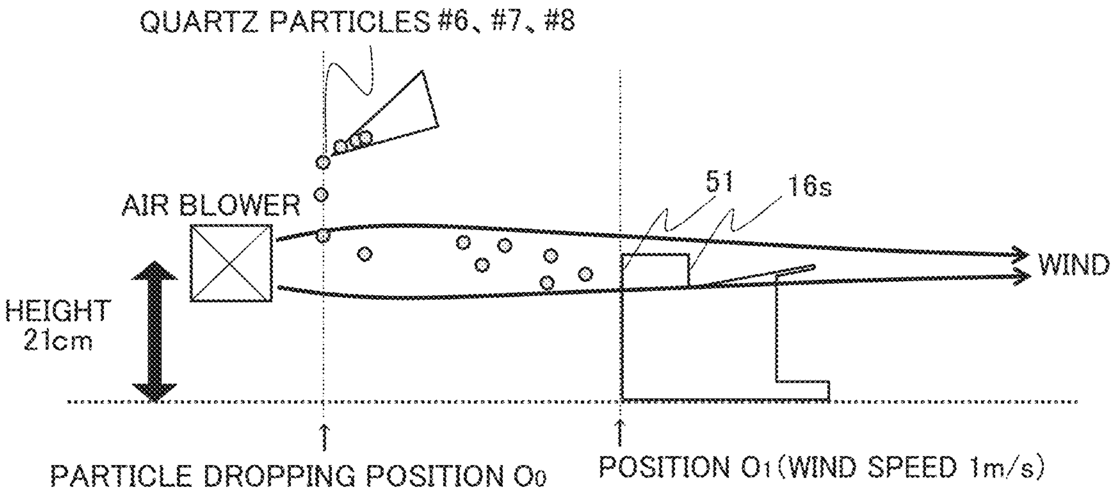

First, the inventors conducted an experiment to check how much dust particles of different sizes could enter the image forming apparatus 100 in conditions illustrated in FIGS. 9A and 9B. An air blower was installed at a height of 21 cm from the floor surface on which the image forming apparatus 100 was installed, which was the height of the discharge port 16$s$ of the present example, and wind was blown toward the image forming apparatus 100. Dust particles were dropped onto the airflow from the air blower from above. The dust particles moved to a position downstream of a dropping position $O_0$ in the direction of the wind by being blown by the wind. SPCON-MAMA WM-SC manufactured by ONISHI ELECTRIC INDUSTRY CO., LTD. was used as the air blower. In the case of blowing wind on the image forming apparatus 100 from the front side (+Y side) as illustrated in FIG. 9A, the air blower was disposed such that wind of 1 m/s was blown on the discharge port 16$s$, that is, the wind speed at a position $O_1$ of the discharge port 16$s$ was 1 m/s. In the case of blowing wind on the image forming apparatus 100 from the rear side (−Y side) as illustrated in FIG. 9B, the air blower was disposed such that wind of 1 m/s was blown on the ventilating portion 51, that is, the wind speed at a position $O_1$ of the ventilating portion 51 was 1 m/s.

In the experiment, crystal powder (hereinafter referred to as quartz particles) manufactured by NAKAGAWA GOFUN ENOGU CO., LTD. was used as an example of the dust particles. The fineness levels (grades indicating the fineness of the particles) of the quartz particles were #8, #7, and #6. As a result of observation using an optical microscope for the quartz particles of each fineness level, the quartz particles of #8 had a particle diameter of 80 μm to 100 μm, the quartz particles of #7 had a particle diameter of 100 μm to 150 μm, and the quartz particles of #6 had a particle diameter of 150 μm to 200 μm. The amount of blown quartz particles was set to 0.2 g. In addition, the experiment was performed for both of the case where the wind was blown on the image forming apparatus 100 from the front side and the case where the wind was blown on the image forming apparatus 100 from the rear side.

In the case where the quartz particles of each fineness level were blown by the wind toward the image forming apparatus 100, the number of quartz particles attached to the fixing portion 9 and the duplex guide 13 in the image forming apparatus 100 was counted. Table 2 shows the results thereof.

TABLE 2

| Fineness level of quartz particles | Number of particles in case of blowing wind of 1 m/s from front side | | | | | | Number of particles in case of blowing wind of 1 m/s from rear side | | | | | |
|---|---|---|---|---|---|---|---|---|---|---|---|---|
| | Fixing portion | | | Duplex guide | | | Fixing portion | | | Duplex guide | | |
| | #8 | #7 | #6 | #8 | #7 | #6 | #8 | #7 | #6 | #8 | #7 | #6 |
| Comparative Example 1 | 3000 | 1000 | 500 | 6500 | 3000 | 1300 | 750 | 250 | 80 | 1700 | 800 | 350 |
| Example 1 | 2000 | 400 | 120 | 5000 | 1300 | 400 | 0 | 0 | 0 | 0 | 0 | 0 |

In both of the case where the wind was blown from the front side and the case where the wind was blown from the rear side in Example 1, the quartz particles were less likely to attach to the fixing portion 9 and the duplex guide 13 when the particle diameter of the quartz particles was larger. That is, when the particle diameter of the quartz particles is larger, the quartz particles are less likely to enter the inside of the image forming apparatus 100 by being blown by the wind.

In the case where a similar experiment was performed by using the image forming apparatus 500 of Comparative Example 1, the number of quartz particles entering the inside of the image forming apparatus 100 increased as compared with Example 1 for each fineness level of the quartz particles regardless of the direction of the wind.

For example, in the case where wind of 1 m/s was blown on the image forming apparatus 500 of Comparative Example 1 from the front side, the wind speed at the first measurement position F1 in the vicinity of the discharge port 16*s* was 0.41 m/s and the wind speed at the second measurement position F2 was 0.27 m/s as described above. The quartz particles move into the image forming apparatus 500 through the discharge port 16*s* by being blown by the wind configured in this manner, and attach to the fixing portion 9 and the duplex guide 13. Since the airflow (path K11 of FIG. 8A) from the discharge port 16*s* to the ventilating portion 51 is strong, most of the quartz particles having entered the image forming apparatus 500 accumulate on the duplex guide 13. To be noted, some quartz particles drop by the gravity in the middle of the path from the discharge port 16*s* to the ventilating portion 51, and move toward the fixing portion 9 (path K10).

From the results of Table 2, it can be seen that, according to Example 1, the dust particles entering the image forming apparatus 100 can be reduced as compared with Comparative Example 1.

As described above, the duplex guide 13 (second guide portion) is positioned between the discharge port 16*s* and the ventilating portion 51 in the Y-axis direction. Therefore, for example, in the case where the dust particles have entered from the outside of the image forming apparatus 100 by being blown by wind blowing from the discharge port 16*s* toward the ventilating portion 51, there is a possibility that part of the dust particles is accumulated on the duplex guide 13. In addition, since the duplex guide 13 is curved in a convex shape convex upward, there is a case where, for example, when opening or closing the back door 14, the dust particles accumulated on the duplex guide 13 drop from the duplex guide 13 along the curved surface. According to Example 1, since the entrance of dust particles through the discharge port 16*s* or the ventilating portion 51 can be reduced, such a problem is less likely to occur.

In the present example, the fixing film 112 is positioned between the discharge port 16*s* and the ventilating portion 51 in the Y-axis direction. In other words, when viewed in the width direction (X-axis direction) orthogonal to both the vertical direction and the discharge direction Dc, the fixing film 112 (film) is disposed between the discharge port 16*s* and the ventilating portion 51 (opening portion) in a direction (Y-axis direction) orthogonal to the vertical direction. In this arrangement, it can be considered that the dust particles having entered the inside of the image forming apparatus 100 through the discharge port 16*s* or the ventilating portion 51 attach to the fixing film 112 and accelerate tear of the fixing film 112. According to Example 1, since entrance of the dust particles through the discharge port 16*s* or the ventilating portion 51 can be reduced, such a problem is less likely to occur.

When the photosensitive drum 1 is damaged, there is a case where an image defect (referred to as a black dot image) of a black dot shape occurs at a position corresponding to the damage of the photosensitive drum 1 in the image formed on the recording material P In the present example, the photosensitive drum 1 is positioned between the discharge port 16*s* and the ventilating portion 51 in the Y-axis direction. In other words, the photosensitive drum 1 is disposed between the discharge port 16*s* and the ventilating portion 51 (opening portion) in a direction (Y-axis direction) orthogonal to the vertical direction as viewed in the width direction (X-axis direction) orthogonal to both the vertical direction and the discharge direction Dc. In this arrangement, a case where the dust particles having entered the inside of the image forming apparatus 100 through the discharge port 16*s* or the ventilating portion 51 attach to the photosensitive drum 1 and thus an image defect such as a black dot image occurs can be considered. According to Example 1, since the entrance of the dust particles through the discharge port 16*s* or the ventilating portion 51 can be reduced, such a problem is less likely to occur.

Tear of Fixing Film

The particles having dropped onto the fixing portion 9 can damage the fixing film 112, and a larger particle is more likely to damage the fixing film 112. When particles larger than 100 μm repeatedly reach the fixing portion 9, the damage to the fixing film 112 is accumulated, and there is a possibility that the fixing film 112 tears before the accumulated sheet-passing number of the image forming apparatus 100 reaches the lifetime sheet number. That is, the entrance of the dust particles can accelerate the tear of the fixing film 112.

Whether or not the tear of the fixing film 112 was accelerated was evaluated by the following experiment. Each time 2000 sheets were passed through the image forming apparatus 100 or 500, quartz particles (fineness level: #6) was scattered in front of the discharge port 16*s* while blowing wind by an air blower from the front side of the image forming apparatus 100 or 500, and thus the quartz particles were intentionally allowed into the image forming apparatus 100 or 500. As the recording material P, OCE RED LABEL 80 gsm A4 Paper was used. The air blower was disposed such that wind of 1 m/s was blown on the discharge port 16*s*. The amount of the quartz particles to be scattered was set to 0.5 g. As the air blower, SPCON-MAMA WM-SC manufactured by ONISHI ELECTRIC INDUSTRY CO., LTD. was used. The results are shown in Table 3.

TABLE 3

| | Sheet count when film tore |
|---|---|
| Comparative Example 1 | 40,000 |
| Example 1 | No tear occurred |

As shown in Table 3, in Comparative Example 1, the tear of the fixing film 112 occurred when the accumulated sheet-passing number reached 40,000. In contrast, in Example 1, the tear of the fixing film 112 did not occur even when the accumulated sheet-passing number reached 50,000, which was the lifetime sheet number of the image forming apparatus 100.

As described above, as compared with Comparative Example 1, the wind blowing into the image forming apparatus 100 in the case of blowing wind on the image forming apparatus 100 of the present example from the front side (+Y side) is weak (Table 1). Therefore, even in the case where the quartz particles are scattered to be blown by the wind, the number of quartz particles entering the inside of the image forming apparatus 100 is smaller than in Comparative Example 1 (Table 2). Particularly, since the particle is less likely to be moved by the wind when the particle is larger, quartz particles of larger size that are more likely to damage the fixing film 112 are less likely to enter the inside of the image forming apparatus 100. As a result, it can be considered that, in Example 1, the number of quartz particles reaching the fixing portion 9 was smaller than in Comparative Example 1, and thus the tear of the fixing film 112 did not occur.

To be noted, as indicated by an arrow K5 in FIG. 7A, in Example 1, it was confirmed that most of the quartz particles dropped onto the frame 191 that was more on the front side than the fixing portion 9. It can be considered that this is because in Example 1, the wind passing through the path from the discharge port 16*s* to the ventilating portion 51 was weak, and therefore the quartz particles dropped in an earlier stage. In contrast, in Comparative Example 1 (FIG. 8A), since the wind passing through the path from the discharge port 16*s* to the ventilating portion 51 was strong, the quartz particles were moved farther, and thus the number of quartz particles dropping onto the fixing portion 9 (path K10) increased.

As described above, particles larger than 100 μm are less likely to reach the fixing portion 9 in the image forming apparatus 100 of Example 1 than in Comparative Example 1. Therefore, the possibility of a particle larger than 100 μm damaging the fixing film 112 is lower. It can be considered that, as a result of this, the fixing film 112 did not tear in Example 1 even when the accumulated sheet-passing number reached the lifetime sheet number of the image forming apparatus 100.

To be noted, there is a case where the wind speed of the air blown on the image forming apparatus 100 is higher than 1 m/s and a case where the wind speed is lower than 1 m/s. In the case where the wind speed is higher than 1 m/s, more and larger dust is more likely to be moved by the wind. However, since the filters 50 are provided on the ventilating portion 51 in the present example, dust is less likely to be blown into the image forming apparatus 100 than in Comparative Example 1 regardless of the wind speed, and the tear of the fixing film 112 and the like are less likely to occur.

To be noted, although the fixing film 112 has been mentioned as an example of a member damaged by the dust particles having entered the inside of the image forming apparatus 100 herein, damage to members of the image forming apparatus 100 other than the fixing film 112 is also reduced as a result of suppressing entrance of the dust particles. For example, a situation in which, as a result of the dust particles attaching to the elastic layer (rubber layer) on the outer peripheral portion of the rollers that convey the recording material P, the wear of the rollers is accelerated and the lifetime of the rollers become shorter than expected, can be suppressed.

Condensation Suppression

How the function of the ventilating portion 51 discharging the heat and water vapor generated in the fixing portion 9 to the outside of the image forming apparatus 100 is maintained even in the case where the filters 50 are provided on the ventilating portion 51 will be described.

As a test for evaluating the water droplet resistance of the image forming apparatus 100, sheets left to stand for 48 hours in an environment of a room temperature of 32.5° C. and a humidity of 80% were set in the feeding portion 6, duplex printing was performed on ten of the sheets, and whether a water droplet mark could be observed on the image was checked. To be noted, this test was started after the internal temperature of the image forming apparatus 100 became substantially equal to the room temperature after the elapse of sufficient time since the previous image forming operation was finished. This is because condensation is more likely to occur after the internal temperature returned to the room temperature than in a state in which the inside of the image forming apparatus 100 is hot. The sheets used for the test was CS-680 manufactured by Canon. A halftone image of an image coverage of 25% was formed on the entirety of the effective printing region of each surface of each sheet.

In the process of the duplex printing, when water droplets are accumulated in somewhere in the duplex conveyance path CP2, a sheet passing through the duplex conveyance path CP2 comes into contact with the droplet and gets wet. Then, when transferring an image from the photosensitive drum 1 onto the second surface of the sheet, moisture adsorbs onto a surface region of the photosensitive drum 1 having come into contact with the wet part of the sheet. The surface region of the photosensitive drum 1 onto which moisture has adsorbed is more strongly electrified by the charging portion than the region therearound. In the surface region electrified strongly by the charging portion, the density of the toner image formed through the steps of exposure and development is lower than in the region therearound. As a result, in the halftone image transferred onto the sheet, an image defect (referred to as a water droplet mark or a white dot image) in which a white spot appears in a position in the image corresponding to the surface region of the photosensitive drum 1 having come into contact with the wet part of the sheet occurs.

Figure 10:
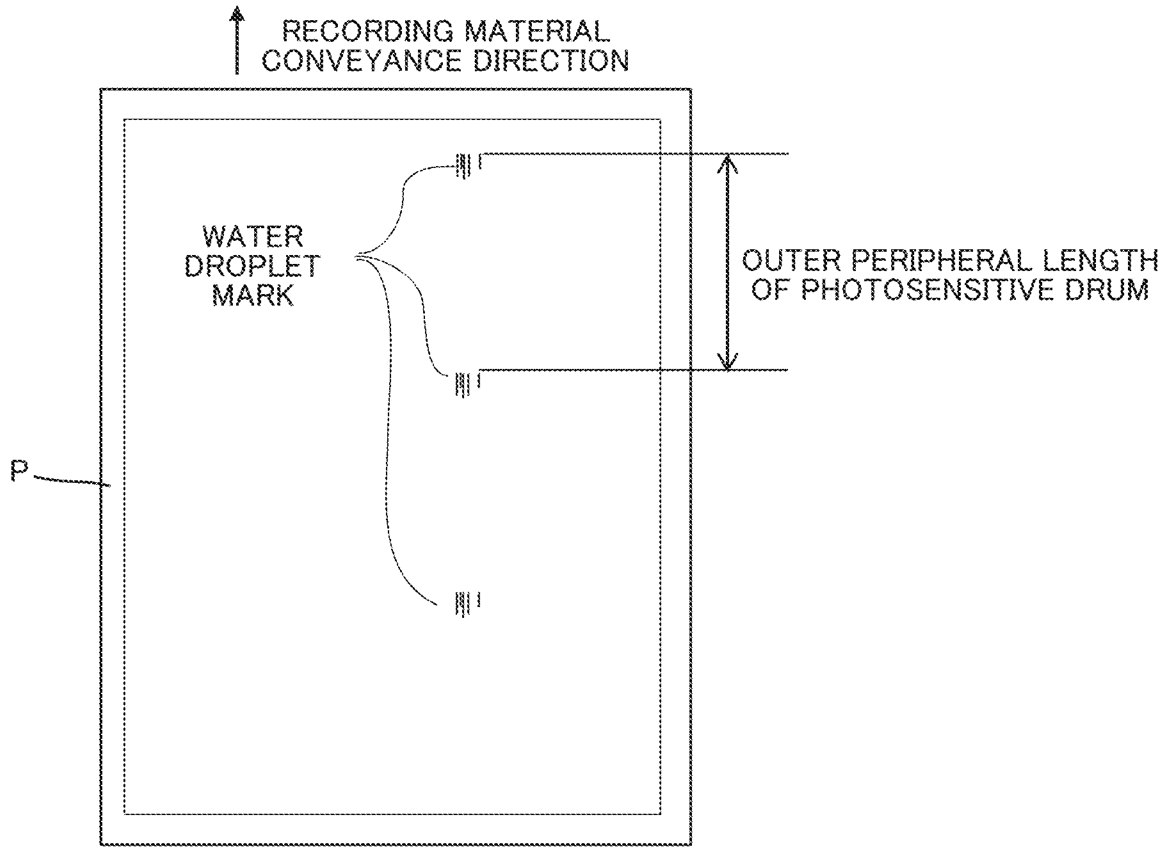
FIG. 10 is a diagram illustrating water droplet marks.

FIG. 10 illustrates an example of the water droplet mark. The water droplet mark is an image defect periodically appearing at an interval corresponding to the outer peripheral length of the photosensitive drum 1.

If the water vapor generated in the fixing portion 9 is efficiently discharged to the outside of the image forming apparatus 100, the water droplet mark is less likely to occur. In the present example, although a minor water droplet mark was observed on the second surface of two sheets among the ten sheets, no water droplet mark was observed on the other sheets. Considering the fact that the test was performed in a tough condition in which water condensation is likely to occur as described above, the above results show that a water droplet resistance sufficient for practical use was achieved.

As described above, according to the present example, even in the case where the filters 50 are provided on the ventilating portion 51, the function of the ventilating portion 51 of discharging the heat and water vapor generated in the fixing portion 9 to the outside of the image forming apparatus 100 can be maintained. That is, by providing the filters 50 on the ventilating portion 51, the entrance of dust into the image forming apparatus 100 through the discharge port 16*s* and the ventilating portion 51 can be suppressed while maintaining the function of the ventilating portion 51 of discharging the heat and water vapor to the outside of the image forming apparatus 100.

Image Defect Caused by Dust

When dust enters the inside of the image forming apparatus, an image defect can be caused by attachment of dust particles to the photosensitive drum 1. This will be described.

Figure 11:
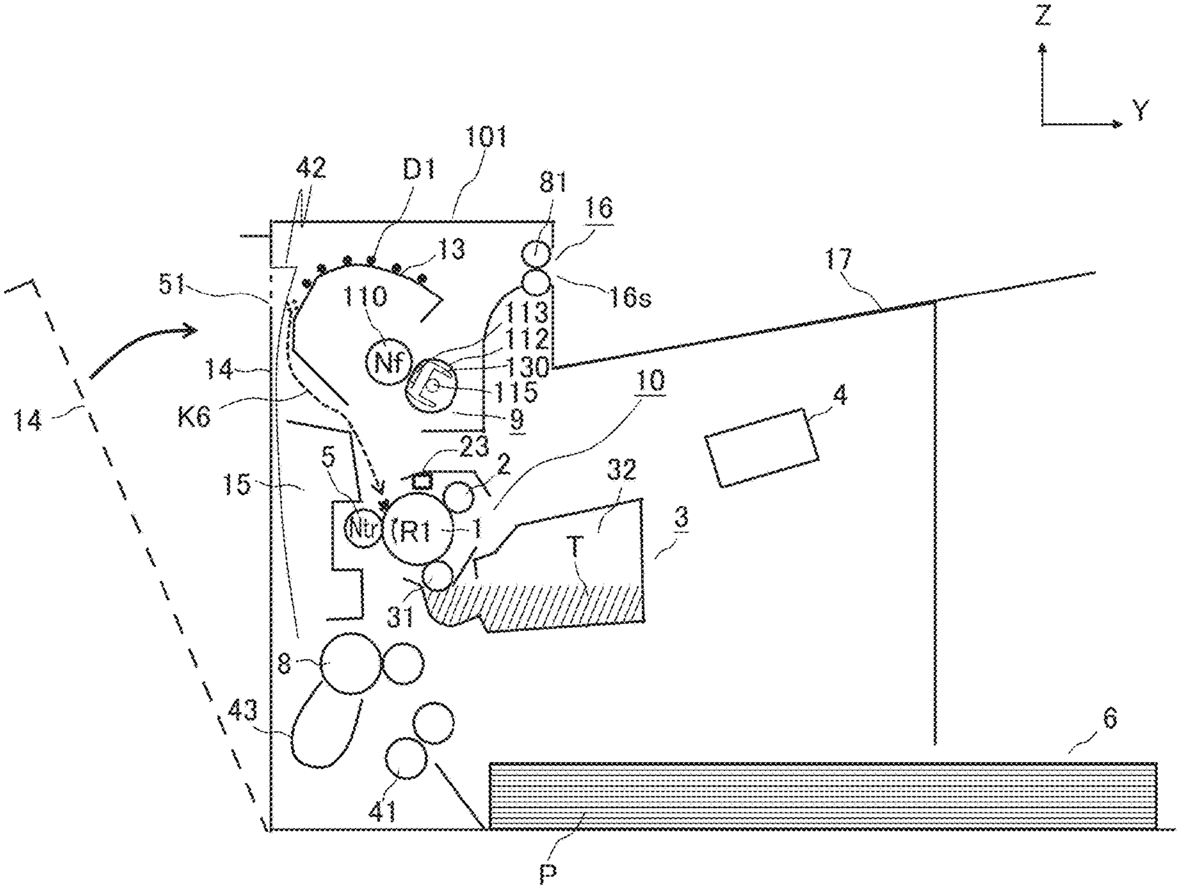
FIG. 11 is an explanatory diagram of drop of dust particles when opening and closing aback door.

As shown in Table 2, in the case where the outside air including dust particles are blown on the image forming apparatus 500 of Comparative Example 1, dust particles are also accumulated on the duplex guide 13. As illustrated in FIG. 11, in the image forming apparatus 500 of Comparative Example 1, the photosensitive drum 1 and the duplex guide 13 are disposed at positions between the ventilating portion 51 and the discharge port 16*s* in the front-rear direction (Y-axis direction) of the image forming apparatus 500. Therefore, when the back door 14 is opened or closed in a state in which the dust particles D1 are accumulated on the duplex guide 13, the dust particles D1 can drop onto the photosensitive drum 1 from the duplex guide 13 as illustrated in FIG. 11 (arrow K6) mainly due to the vibration of the housing 101 occurring when closing the back door 14.

In addition, the vibration of the housing 101 also occurs when opening or closing the transfer guide unit 15. Since the transfer guide unit 15 of the present example is urged by a spring member toward the closed position, the vibration of the housing 101 generated when closing the transfer guide unit 15 can be strong. That is, due to the vibration of the housing 101 generated when closing the transfer guide unit 15, the dust particles D1 can drop onto the photosensitive drum 1 from the duplex guide 13 (arrow K6).

Image defects caused by the dust particles entering the inside of the image forming apparatus were evaluated by the following test. As the test paper, OCE RED LABEL 80 gsm A4 Paper was used. Each time 2,000 sheets of the test paper were passed through, 0.5 g of quartz particles (crystal powder #6 described above) were scattered while blowing wind by an air blower to intentionally allow the quartz particles into the image forming apparatus. The air blower was provided such that wind of 1 m/s was blown on the discharge port 16*s* or the ventilating portion 51 from the front side or the rear side of the image forming apparatus when blowing wind. In addition, in accordance with the direction in which the wind was blown, the quartz particles were scattered in front of the discharge port 16*s* or the ventilating portion 51. The direction of the wind when allowing entrance of the quartz particles was alternately switched between the front side and the rear side each time 2,000 sheets were passed through. SPCON-MAMA WM-SC manufactured by ONISHI ELECTRIC INDUSTRY CO., LTD. was used as the air blower. In addition, each time 1,000 sheets were passed through, the back door 14 and the transfer guide unit 15 were opened and closed to apply vibration to the image forming apparatus.

Figure 12:
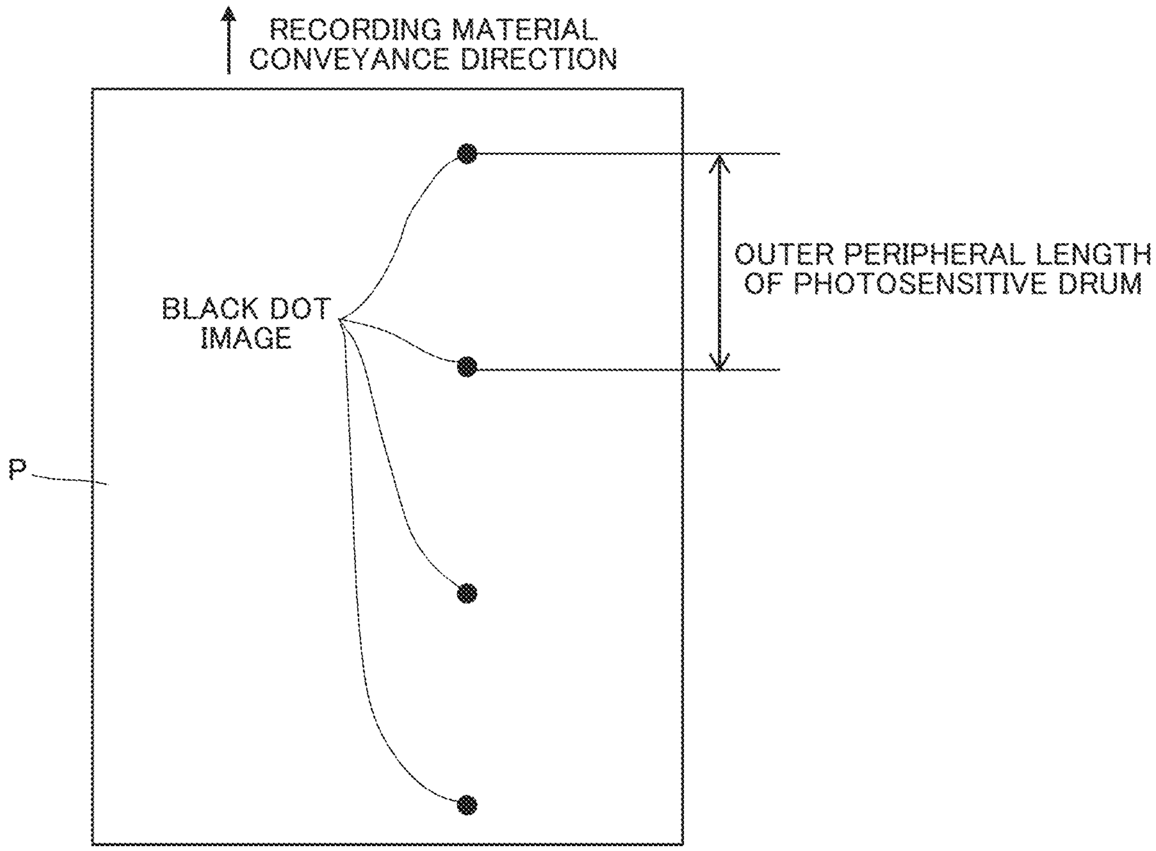
FIG. 12 is a diagram illustrating black dot images originating from dust particles.

When the photosensitive drum 1 is damaged by the quartz particles dropping from the duplex guide 13, a black dot image occurs as illustrated in FIG. 12. For each scratch on the photosensitive drum 1, a black dot image repeatedly appears in the conveyance direction of the recording material P at a pitch corresponding to the outer peripheral length of the photosensitive drum 1. One row of black dot images appearing periodically as described above will be defined as one streak of black dot image. The test results are shown in Table 4.

TABLE 4

| | Number of black dot image streaks Accumulated sheet-passing number | | | | |
|---|---|---|---|---|---|
| | 10,000 | 20,000 | 30,000 | 40,000 | 50,000 |
| Comparative Example 1 | 1 | 2 | 2 | 4 | 6 |
| Example 1 | 0 | 0 | 1 | 2 | 2 |

As shown in Table 4, in Comparative Example 1, one streak of black dot images appeared when the accumulated sheet-passing number reached 10,000. In addition, when the accumulated sheet-passing number reached 50,000, which was the lifetime sheet number of the image forming apparatus 500, six streaks of black dot images appeared.

In contrast, in Example 1, no black dot image appeared even when the accumulated sheet-passing number reached 20,000. In addition, although one streak of black dot images appeared when the accumulated sheet-passing number reached 30,000, the number of streaks of black dot images was only two even when the accumulated sheet-passing number reached 50,000, which was the lifetime sheet number of the image forming apparatus 100.

In the case of the image forming apparatus 100 of Example 1, as a result of the filters 50 being provided on the ventilating portion 51, the outside air is less likely to blow into the image forming apparatus 100 (particularly into the conveyance path CP) than in Comparative Example 1 (Table 1). As a result, the dust particles are not likely to accumulate on the duplex guide 13 in both cases of the wind blowing on the image forming apparatus 100 of Example 1 from the front side and the rear side (Table 2). Particularly, in the present example, dust particles larger than 100 μm are not likely to accumulate on the duplex guide 13. It can be considered that, because of this, even when vibration of the housing 101 occurred as a result of, for example, closing the back door 14 after jam removal, the dust particles were not likely to attach to the surface of the photosensitive drum 1, and therefore an image defect caused by the dust particles was not likely to occur.

To be noted, the wind speed of the wind blowing on the image forming apparatus can be higher or lower than 1 m/s. In the case where the wind speed is higher than 1 m/s, more and larger dust is more likely to be moved by the wind. However, in the present example, since the filters 50 are provided on the ventilating portion 51, the dust is less likely to be blown into the image forming apparatus 100 and thus an image defect caused by the dust particles is less likely to occur than in Comparative Example 1, regardless of the wind speed.

As described above, according to the present example, an image forming apparatus capable of suppressing entrance of dust can be provided.

In the present example, by providing the filters 50 on the ventilating portion 51 of the housing 101, the wind speed of the wind blowing into the image forming apparatus 100 through the discharge port 16s can be reduced while maintaining the function of the ventilating portion 51 of discharging the heat and water vapor. Therefore, entrance of the dust particles into the image forming apparatus 100 by being blown by the wind blowing into the image forming apparatus 100 through the discharge port 16s can be reduced.

According to the present example, by providing the filters 50 on the ventilating portion 51, entrance of the dust particles into the image forming apparatus 100 through the discharge port 16s can be suppressed even though the filters 50 are not provided on the discharge port 16s.

To be noted, as long as the discharge of the recording material P through the discharge port 16s is not interrupted, an additional filter covering part or entirety of the discharge port 16s may be provided in addition to the filters 50. Also in this case, the merit of the present example obtained by providing the filters 50 on the ventilating portion 51 can be maintained.

Example 2

Figure 13:
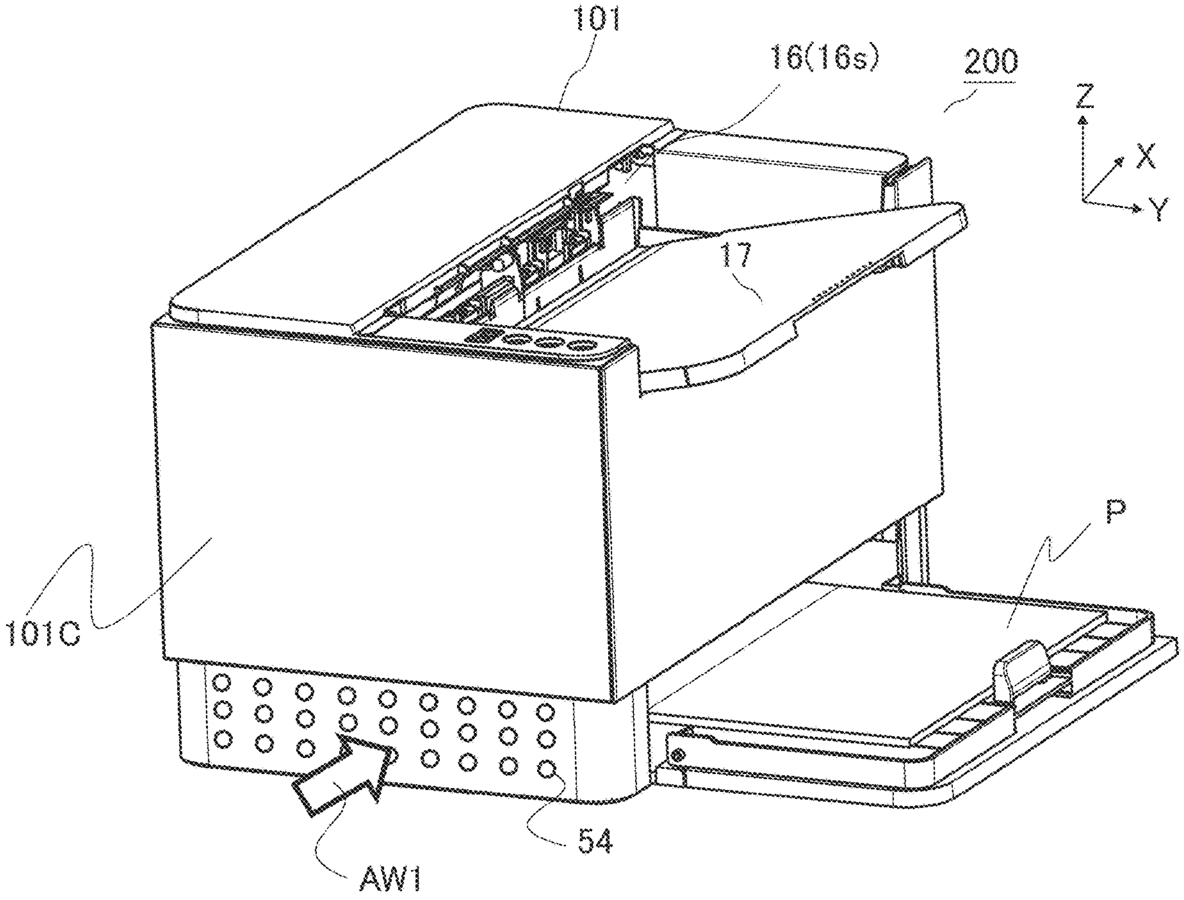
FIG. 13 is a perspective view of an image forming apparatus according to Example 2.
Figure 14:
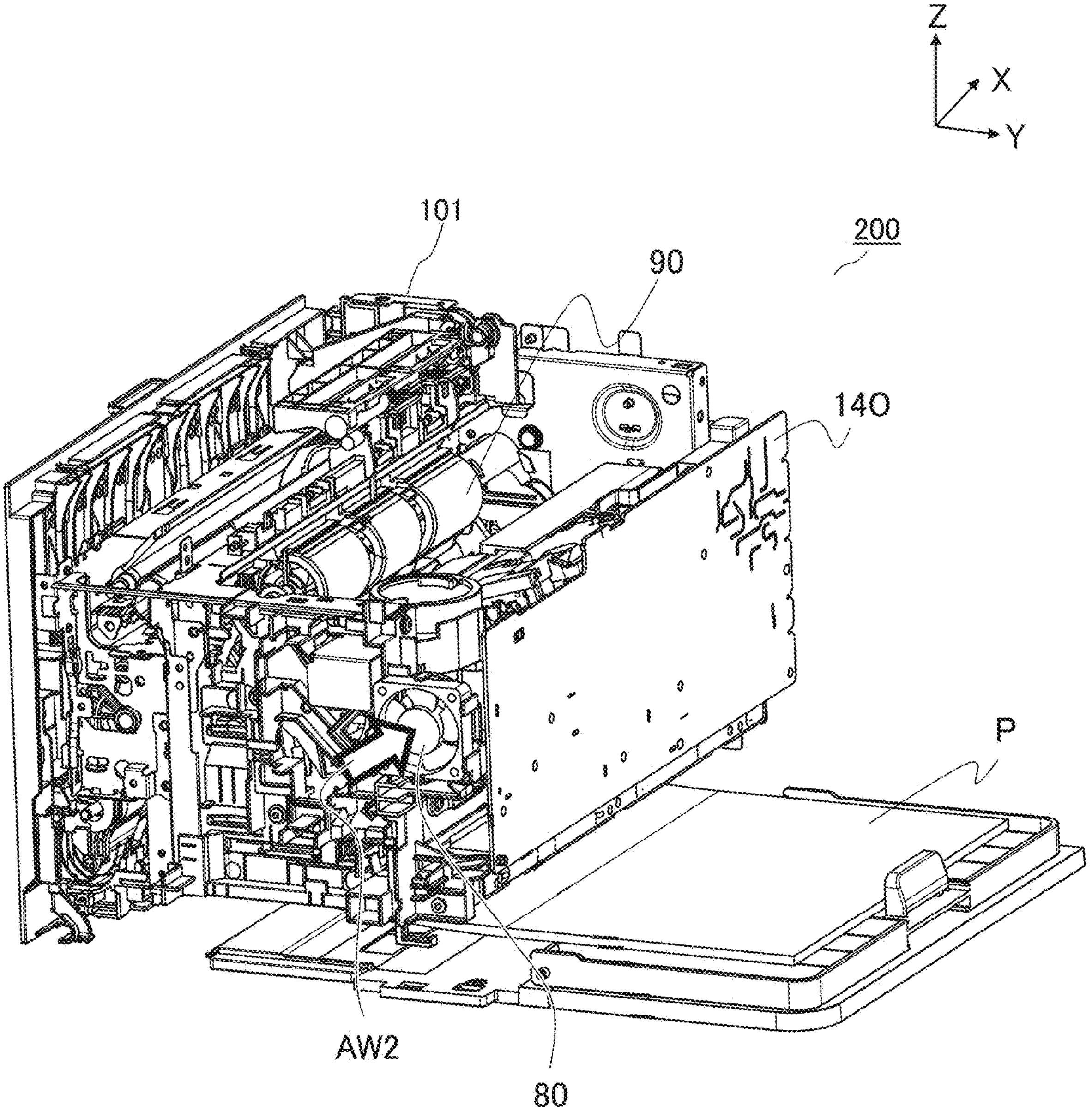
FIG. 14 is a diagram illustrating a state in which an exterior member of the image forming apparatus according to Example 2 is omitted.

Next, Example 2 will be described. FIG. 13 is a perspective view of an image forming apparatus 200 according to Example 2, and FIG. 14 is a perspective view illustrating a state in which the exterior member of the image forming apparatus 200 is omitted from FIG. 13. The image forming apparatus 200 according to Example 2 includes an air intake fan 80 and an air discharge fan 90 as air blowing portions (air intake portion and air discharge portion) for cooling various units in the image forming apparatus 200.

The image forming apparatus 200 according to Example 2 has basically the same configuration as the image forming apparatus 100 according to Example 1 except that the image forming apparatus 200 includes the air intake fan 80, the air discharge fan 90, and an element for forming a path for an airflow generated by these. It is assumed that elements denoted by the same reference signs as in Example 1 have basically the same configurations and functions as those described in Example 1 unless otherwise described, and parts different from Example 1 will be mainly described.

As illustrated in FIG. 14, the housing 101 of the image forming apparatus 200 includes the air intake fan 80 and the air discharge fan 90.

The air intake fan 80 is disposed at aside surface portion on the left side (−X side) of the housing 101. In a state in which an exterior member is attached to the housing 101, the air intake fan 80 is covered by a side surface cover 101C serving as an exterior member constituting an exterior surface of the left side of the housing 101 (FIG. 13). An air intake port 54 that is a hole extending to the inside of the housing 101 is provided in the side surface cover 101C. The air intake port 54 is an opening of the housing 101 provided at a position different from the discharge port 16s and the ventilating portion 51 (opening portion).

The air intake fan 80 takes in air from the outside of the image forming apparatus 200 through the air intake port 54 of the side surface cover 101C (arrow AW1). The wind from the air intake fan 80 cools an electric board 140 (FIG. 14) disposed inside the image forming apparatus 200. The electric board 140 including a high-voltage power source portion and a low-voltage power source portion easily heats up, and it is preferable to suppress temperature rise inside the image forming apparatus 200 by cooling the electric board 140 by blowing air. To be noted, the high-voltage power source portion of the electric board 140 is, for example, the charging power source, the developing power source, and the transfer power source described above. In addition, the low-voltage power source portion of the electric board 140 is, for example, a power source unit that supplies power to the CPU of a controller that controls the operation of the image forming apparatus 200, a motor serving as a drive source included in the image forming apparatus 200, and the like.

Even if dust particles are included in wind taken in by the air intake fan 80, in the caser where the possibility of causing an image defect or breakage of a member is sufficiently low, the air intake port 54 of the side surface cover 101C does not need to be provided with a filter. To be noted, to further suppress entrance of the dust particles, a filter covering the air intake port 54 may be attached to the side surface cover 101C.

Figure 16A:
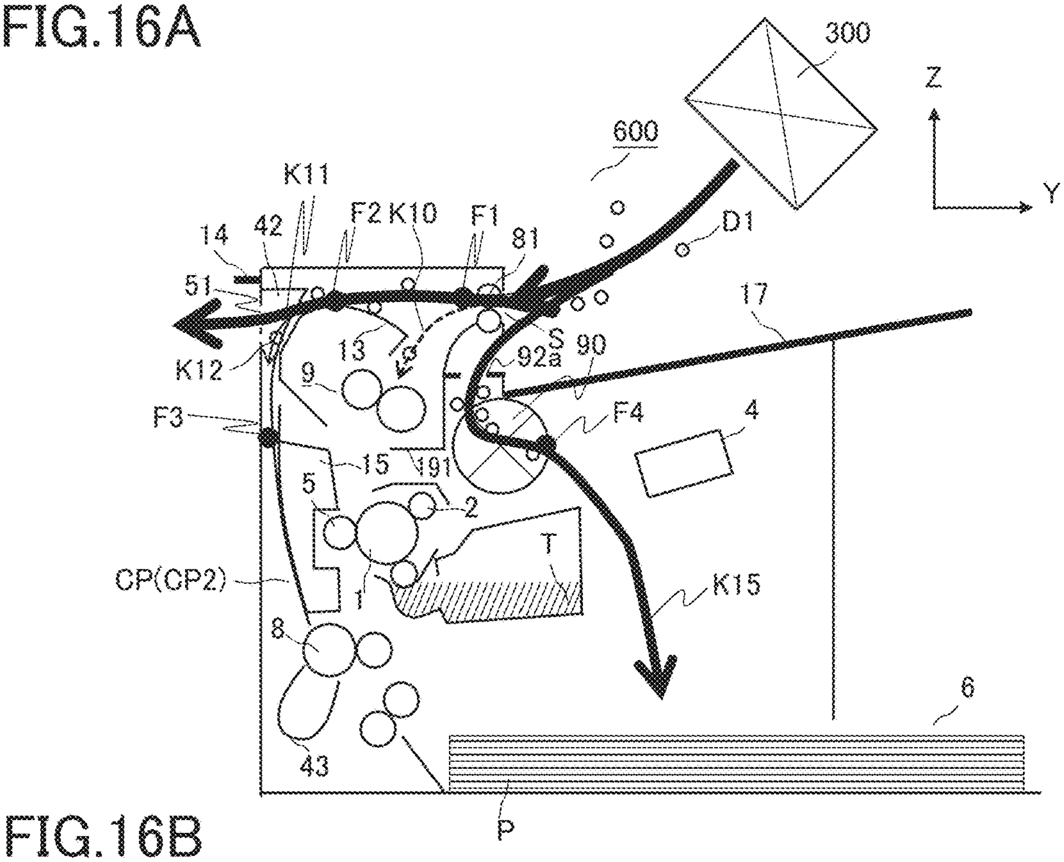
FIGS. 16A and 16B are diagrams illustrating an airflow in an image forming apparatus according to Comparative Example 2.

The air discharge fan 90 is disposed inside the housing 101. The air discharge fan 90 is disposed at a position above the image forming portion 10 and below the discharge tray 17 (FIG. 16A).

Figure 15A:
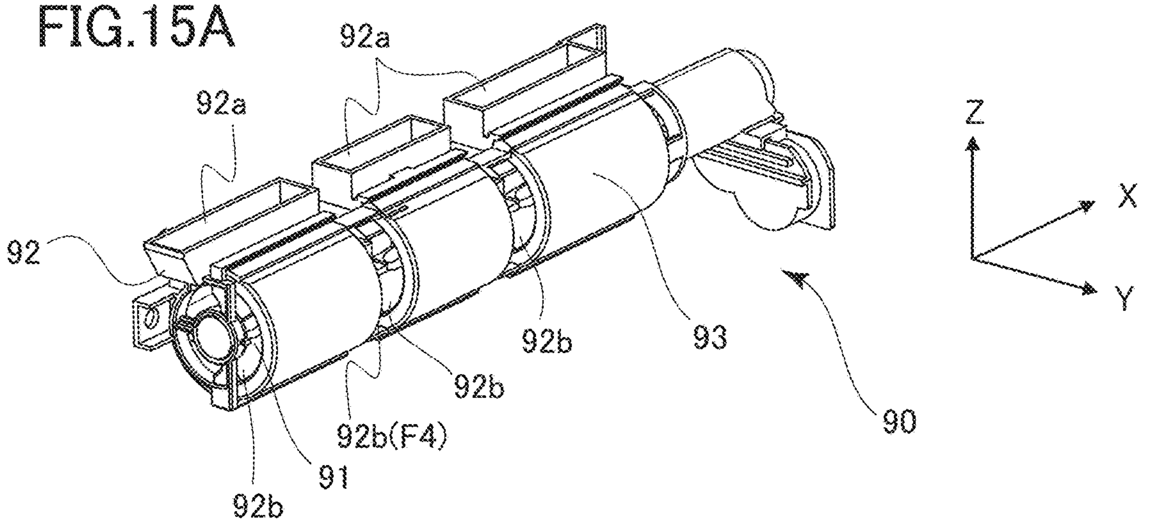
FIGS. 15A to 15C are explanatory diagrams of an air discharge fan according to Example 2.
Figure 15B:
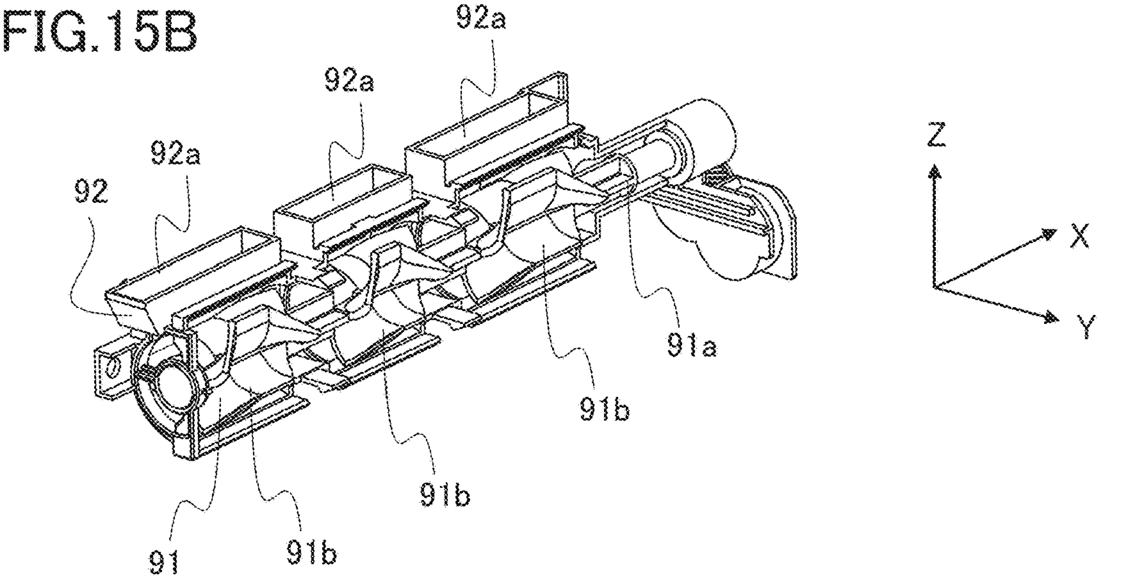
Figure 15C:
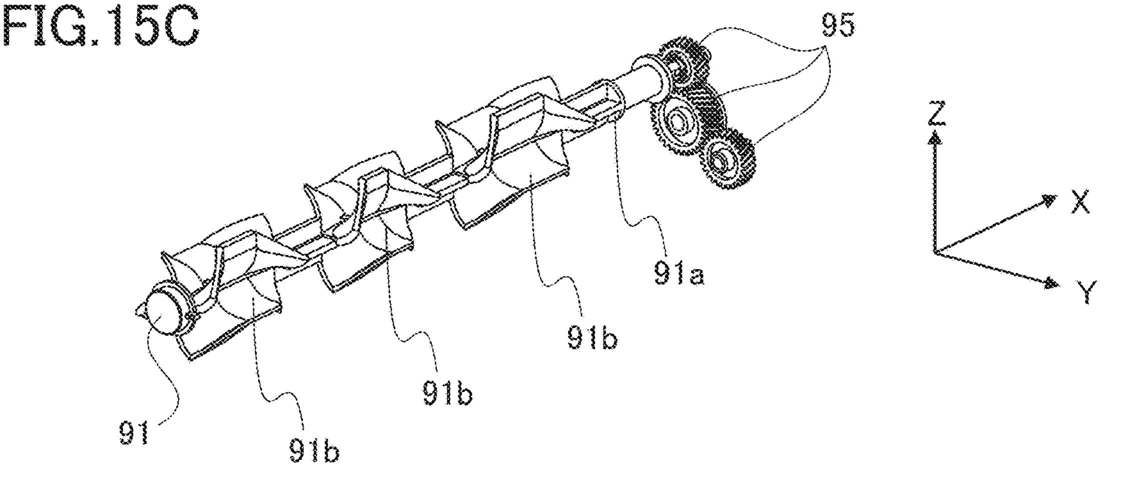

Details of the air discharge fan 90 will be described with reference to FIGS. 15A to 15C. FIG. 15A is a perspective view of the air discharge fan 90. FIG. 15B is a perspective view illustrating a state in which a holder cover 93 is omitted from FIG. 15A. FIG. 15C is a perspective view illustrating a state in which a fan holder 92 is further omitted from FIG. 15A.

The air discharge fan 90 includes a rotary blade 91, a fan holder 92, a holder cover 93, and a gear train 95.

The rotary blade 91 includes a rotation shaft 91a and a plurality of blade portions 91b projecting from the rotation shaft 91a, and rotates about a central axis of the rotation shaft 91a. The air discharge fan 90 of the present example is disposed such that the central axis of the rotation shaft 91a is parallel to the X-axis direction (left-right direction of the image forming apparatus 200). The rotary blade 91 is rotatably supported by the fan holder 92 (FIG. 15B). One gear of the gear train 95 is attached to an end portion of the rotation shaft 91a. The rotary blade 91 rotates by receiving input of a driving force from a drive source via the gear train 95.

The holder cover 93 is supported by the fan holder 92, and defines a path in which air flows together with the fan holder 92. In addition, spaces (chambers) in which the blade portions 91b of the rotary blade 91 are accommodated are defined between the holder cover 93 and the fan holder 92. The rotary blade 91 of the present example includes three blade portions 91b (FIG. 15C) in the axial direction of the rotation shaft 91a. The holder cover 93 and the fan holder 92 define three chambers respectively accommodating three blade portions 91b.

More specifically, the fan holder 92 and the holder cover 93 define approximately cylindrical chambers extending in the axial direction of the rotation shaft 91a. A duct opening 92b provided for the rotary blade 91 to introduce air in the image forming apparatus 200 into the chamber is provided in an end surface in the axial direction of each chamber. In addition, a duct opening (air discharge port 92a) for discharging air ejected from each chamber by the rotary blade 91 to the outside of the image forming apparatus 200 is provided in the fan holder 92. In the present example, the air discharge port 92a opens upward (+Z side). The air discharge port 92a is an opening of the housing 101 provided at a position different from the discharge port 16*s*, the ventilating portion 51 (opening portion), and the air intake port 54.

In the present example, the outside air is introduced into the image forming apparatus 200 by the air intake fan 80, and the air is discharged from the inside to the outside of the image forming apparatus 200 by the air discharge fan 90. That is, the air intake fan 80 and the air discharge fan 90 function as air blowing portions that generate an airflow entering the inside of the housing 101 from the outside through the air intake port 54 and flowing out from the inside to the outside of the housing 101 through the air discharge port 92*a*. To be noted, an airflow flowing in a similar path can be also generated by just one of the air intake fan 80 and the air discharge fan 90. In other words, the air intake port 54 and the air discharge port 92*a* define a path through which air flows into the image forming apparatus from the outside and which is different from a path (path including the conveyance path CP) through which air flows into the image forming apparatus from the outside through the discharge port 16*s* or the ventilating portion 51.

To be noted, the air intake fan 80 and the air discharge fan 90 basically operate while the image forming apparatus 200 is active, and the airflow generated by the air intake fan 80 and the air discharge fan 90 is not generated while the image forming apparatus 200 is not active. The period in which the image forming apparatus 200 is active includes a period in which the image forming apparatus 200 performs the image forming operation, and a period in which the image forming apparatus 200 stands by in a state (standby state) in which the image forming operation can be immediately started when a command to perform the image forming operation is received by the image forming apparatus 200. The period in which the image forming apparatus 200 is not active includes a period in which the main power of the image forming apparatus 200 is off, and a period in which the image forming apparatus 200 stands by in a state (sleep state) in which the image forming operation cannot be started immediately when the image forming apparatus 200 receives the command to perform the image forming operation even when the main power is on.

Airflow in Image Forming Apparatus

Figure 16B:
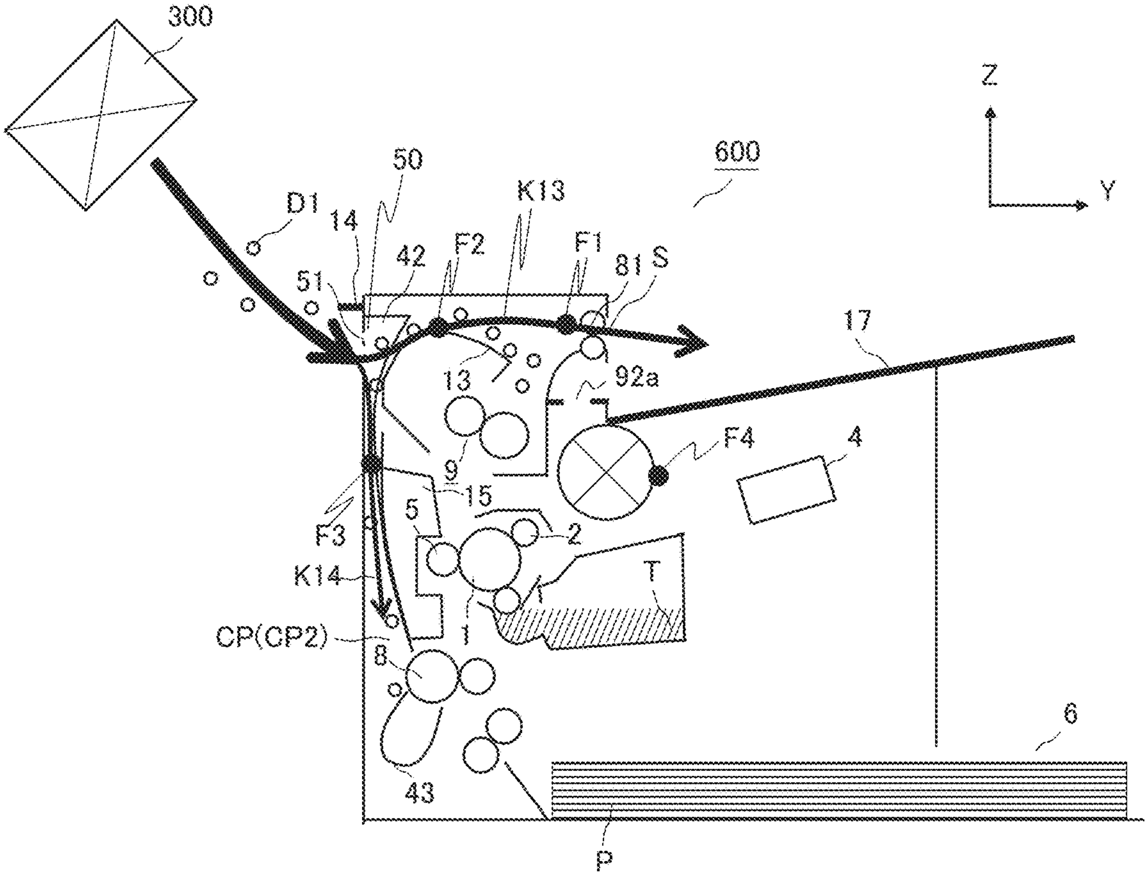
Figure 17A:
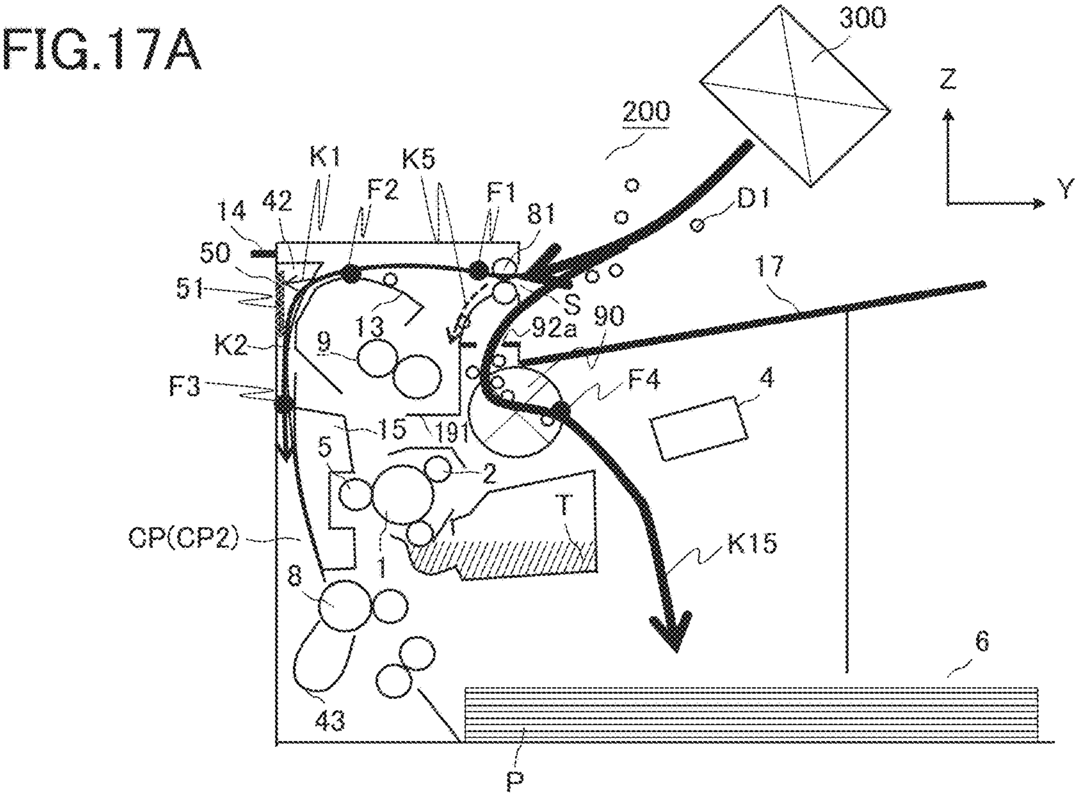
FIGS. 17A and 17B are diagrams illustrating an airflow in the image forming apparatus according to Example 2.
Figure 17B:
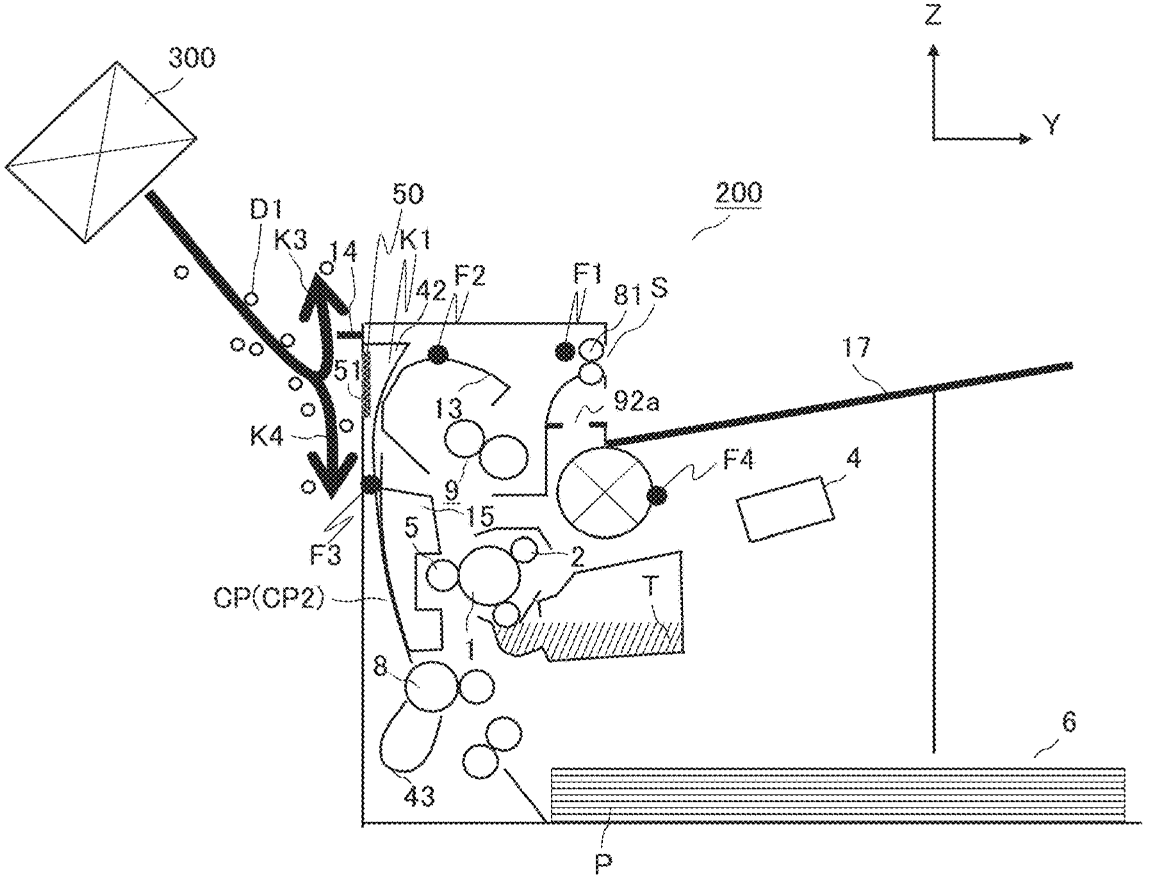

The phenomenon in which the outside air flows into the image forming apparatus in the non-active state will be described with reference to FIGS. 16A, 16B, 17A, and 17B. FIG. 16A is a schematic diagram illustrating a state in which wind is blown on an image forming apparatus 600 of Comparative Example 2 in the non-active state from the front side (+Y side). FIG. 16B is a schematic diagram illustrating a state in which wind is blown on the image forming apparatus 600 of Comparative Example 2 in the non-active state from the rear side (−Y side). FIG. 17A is a schematic diagram illustrating a state in which wind is blown on the image forming apparatus 200 of Example 2 in the non-active state from the front side (+Y side). FIG. 17B is a schematic diagram illustrating a state in which wind is blown on the image forming apparatus 200 of Example 2 in the non-active state from the rear side (−Y side). To be noted, the image forming apparatus 600 according to Comparative Example 2 has the same configuration as the image forming apparatus 200 according to Example 2 except that the filters 50 are not provided on the ventilating portion 51.

The image forming apparatuses 200 and 600 have the air intake port 54 (FIG. 13) of the side surface cover 101C and the air discharge port 92*a* of the air discharge fan 90. Therefore, as illustrated in FIGS. 16A and 17A, when wind is blown on the image forming apparatuses 200 and 600 from the front side (+Y side), the outside air also blows into the image forming apparatuses 200 and 600 through the air discharge port 92*a* of the air discharge fan 90. That is, in addition to the air flow (path K11) entering the inside of the image forming apparatus 200 through the discharge port 16*s* similarly to Example 1, an airflow (path K15) entering the inside of the image forming apparatus 200 through the air discharge port 92*a* of the air discharge fan 90 is generated.

Table 5 illustrates a result of measuring the speed of airflow, that is, the wind speed at each measurement position (F1 to F4) in the image forming apparatus in the case where the wind was blown on the image forming apparatuses 200 and 600 from the front side or the rear side. The measurement was performed at the same measurement conditions as in Example 1 described with reference to Table 1. SPCON-MAMA WM-SC manufactured by ONISHI ELECTRIC INDUSTRY CO., LTD. was used as the air blower 300. In the case of blowing wind from the front side, the air blower 300 was disposed such that wind of a wind speed of 1 m/s was blown on the discharge port 16*s*. In the case of blowing wind from the rear side, the air blower 300 was disposed such that wind of a wind speed of 1 m/s was blown on the ventilating portion 51. The wind speed in the image forming apparatus was measured by using a micro wind speed meter manufactured by Tohnic. Since this measurement device is capable of measuring the wind speed in a range of 0.1 m/s or more, a case where the wind speed is lower than the detection lower limit (0.1 m/s) of the measurement device is described as "<0.1" (m/s) in Table 5.

A probe of the wind speed meter was disposed in each of four measurement positions (F1 to F4) in the image forming apparatuses 200 and 600 illustrated in FIGS. 16A, 16B, 17A, and 17B. The first measurement position F1, the second measurement position F2, and the third measurement position F3 are the same as in Example 1, and therefore description thereof will be omitted. The fourth measurement position F4 is between duct openings 92*b* on the air intake side of the air discharge fan 90 (between chambers adjacent in the axial direction of the rotary blade 91, see FIG. 15C).

TABLE 5

| | Wind speed when wind is blown from front side at 1 m/s (m/s) | | | | Wind speed when wind is blown from rear side at 1 m/s (m/s) | | | |
|---|---|---|---|---|---|---|---|---|
| | F1 position | F2 position | F3 position | F4 position | F1 position | F2 position | F3 position | F4 position |
| Comparative Example 1 | 0.41 | 0.27 | <0.1 | — | 0.12 | 0.19 | 0.11 | — |
| Example 1 | 0.24 | 0.15 | 0.10 | — | <0.1 | <0.1 | <0.1 | — |
| Comparative Example 2 | 0.53 | 0.29 | <0.1 | 0.38 | <0.1 | 0.24 | 0.11 | <0.1 |
| Example 2 | 0.34 | 0.17 | 0.10 | 0.45 | <0.1 | <0.1 | <0.1 | <0.1 |

As shown in Table 5, in the case where wind of 1 m/s was blown on the image forming apparatus 600 of Comparative Example 2 from the front side, the wind speed at the first measurement position F1 was 0.53 m/s, and the wind speed at the second measurement position F2 was 0.29 m/s. That is, in the case where wind of 1 m/s was blown on the image forming apparatus 600 of Comparative Example 2 from the front side, the wind speed in the vicinity of the discharge port 16*s* and in the vicinity of the uppermost part of the duplex guide 13 was higher than in the case of blowing wind of 1 m/s on the image forming apparatus 500 of Comparative Example 1 from the front side. This is because, part of the air flowing into the image forming apparatus 600 through the discharge port 16*s* is also discharged through the air intake port 54 of the side surface cover 101C in addition to the ventilating portion 51 and the inlet port 6*s*, and therefore the air is more likely to flow in through the discharge port 16*s*.

In addition, in the case where wind of 1 m/s was blown on the image forming apparatus 600 of Comparative Example 2 from the front side, the wind speed at the fourth measurement position F4 was 0.38 m/s. That is, when the wind hit the image forming apparatus 600 from the front side, part of the air flowed into the image forming apparatus 600 through the air discharge port 92*a* of the air discharge fan 90 (path K15 of FIG. 16A). The air flowing into the image forming apparatus 600 through the air discharge port 92*a* of the air discharge fan 90 is discharged to the outside of the image forming apparatus 600 through the air intake port 54 of the side surface cover 101C.

In contrast, in the case where wind of 1 m/s was blown on the image forming apparatus 200 of Example 2 from the front side, the wind speed at the first measurement position F1 was 0.34 m/s, and the wind speed at the second measurement position F2 was 0.17 m/s. That is, in Example 2, the airflow generated in the conveyance path CP in the image forming apparatus 200 in the case of blowing wind on the image forming apparatus 200 from the front side was weaker than in Comparative Example 2. This is because the filters 50 were provided on the ventilating portion 51 that served in Comparative Example 2 as a main discharge path of the wind blowing into the conveyance path CP through the discharge port 16*s*, and thus it was less easy for the air to pass through the ventilating portion 51.

That is, in the case where wind is blown on the image forming apparatus 200 of Example 2 from the front side (+Y side), air in the conveyance path CP is less likely to move than in Comparative Example 2. In other words, in Example 2, as a result of providing the filters 50 in the ventilating portion 51, the air pressure in the image forming apparatus 200 (particularly in the space in the conveyance path CP) when wind is blown from the front side is higher than in Comparative Example 2 in which the filters 50 are not provided. As a result of this, the outside air is less likely to flow into the image forming apparatus 200.

In addition, in the case where wind of 1 m/s was blown on the image forming apparatus 200 of Example 2 from the front side, the wind speed at the fourth measurement position F4 was 0.45 m/s. That is, when the wind hit the image forming apparatus 200 from the front side, part of the air flowed into the image forming apparatus 200 through the air discharge port 92*a* of the air discharge fan 90 (path K15 of FIG. 17A). In addition, the measurement position at which the wind speed was highest in the case of blowing wind of 1 m/s on the image forming apparatus 200 of Example 2 from the front side was the fourth measurement position F4.

The air flowing into the image forming apparatus 200 through the air discharge port 92*a* of the air discharge fan 90 is discharged to the outside of the image forming apparatus 200 through the air intake port 54 of the side surface cover 101C. To be noted, the photosensitive drum 1 and the fixing film 112 are not present on the path K15. Therefore, the possibility of occurrence of an image defect or damage to a member is low even if the air flowing into the image forming apparatus 200 through the air discharge port 92*a* of the air discharge fan 90 includes dust particles.

In the case where wind of 1 m/s was blown on the image forming apparatus 600 of Comparative Example 2 from the rear side, the wind speed at the second measurement position F2 was 0.24 m/s, and the wind speed at the third measurement position F3 was 0.11 m/s. In contrast, in the case where wind of 1 m/s was blown on the image forming apparatus 200 of Example 2 from the rear side, the wind speed at the second measurement position F2 and the wind speed at the third measurement position F3 were both below the detection lower limit. This is because whereas the filters 50 were not provided on the ventilating portion 51 and thus the outside air flowed in through the ventilating portion 51 in Comparative Example 2, in Example 2, the filters 50 were provided on the ventilating portion 51 and thus the outside air was less likely to flow in through the ventilating portion 51.

Size and Likelihood of Entrance of Dust Particles

An experiment was conducted to check how many dust particles of different sizes could enter the inside of the image forming apparatus 200 in the configurations of Example 2 and Comparative Example 2. The experimental conditions were the same as in Example 1 and Comparative Example 1 described with reference to FIGS. 9A and 9B. Table 6 shows the experimental results.

TABLE 6

| | Number of particles in case of blowing wind of 1 m/s from front side | | | | | | Number of particles in case of blowing wind of 1 m/s from rear side | | | | | |
|---|---|---|---|---|---|---|---|---|---|---|---|---|
| Fineness level of | Fixing portion | | | Duplex guide | | | Fixing portion | | | Duplex guide | | |
| quartz particles | #8 | #7 | #6 | #8 | #7 | #6 | #8 | #7 | #6 | #8 | #7 | #6 |
| Comparative Example 1 | 3000 | 1000 | 500 | 6500 | 3000 | 1300 | 750 | 250 | 80 | 1700 | 800 | 350 |
| Example 1 | 2000 | 400 | 120 | 5000 | 1300 | 400 | 0 | 0 | 0 | 0 | 0 | 0 |
| Comparative Example 2 | 2500 | 800 | 450 | 4500 | 2000 | 1000 | 750 | 250 | 80 | 2500 | 1100 | 500 |
| Example 2 | 1800 | 300 | 80 | 3000 | 1000 | 300 | 0 | 0 | 0 | 0 | 0 | 0 |

Comparative Example 2 had an overall tendency that the number of particles accumulated on the fixing portion 9 and the duplex guide 13 in the case of blowing wind on the image forming apparatus from the front side was smaller than in Comparative Example 1. As illustrated in FIG. 16A, this is an effect the configuration in which the path through which air flows into the image forming apparatus 600 branches into two in Comparative Example 2. That is, in Comparative Example 2, the path through which the air flowing into the image forming apparatus 600 flows branches into a path K10 extending from the discharge port 16*s* to the ventilating portion 51 and a path K15 extending from the air discharge port 92*a* of the air discharge fan 90 to the air intake port 54 of the side surface cover 101C. Therefore, in the case where quartz particles are scattered to be blown by the wind blown on the image forming apparatus 600 from the front side, part of the quartz particles are blown by the wind blowing in the path K15, and enters the inside of the image forming apparatus 600. The amount of quartz particles entering the inside of the image forming apparatus 600 by being blown by the wind blowing in the path K10 extending through the conveyance path CP is reduced by this amount.

In Example 2, the number of particles accumulated on the fixing portion 9 and the duplex guide 13 in the case of blowing wind on the image forming apparatus from the front side was even smaller than in Comparative Example 2. This is because as a result of the filters 50 being provided on the ventilating portion 51, the air was less likely to pass through the ventilating portion 51, and the wind speed in the path K10 extending from the discharge port 16*s* to the ventilating portion 51 was lowered (Table 5).

In addition, in Example 2, the number of particles accumulated on the fixing portion 9 and the duplex guide 13 in the case of blowing wind on the image forming apparatus from the front side was smaller than in Example 1. As illustrated in FIG. 17A, this is an effect of the configuration in which the path through which air flows into the image forming apparatus 200 branches into two in Example 2. That is, in Example 2, the path through which the air flowing into the image forming apparatus 200 flows branches into a path K1 extending from the discharge port 16*s* to the ventilating portion 51 and the path K15 extending from the air discharge port 92*a* of the air discharge fan 90 to the air intake port 54 of the side surface cover 101C. In addition, in the case of blowing wind on the image forming apparatus 200 of Example 2 from the front side, the wind speed in the path K15 (see F4 of Table 5) is higher than the wind speed in the path K1 (see F1 and F2 of Table 5). Therefore, in the case where quartz particles are scattered to be blown by the wind blown on the image forming apparatus 200 of Example 2 from the front side, most of the quartz particles are blown by the wind blowing in the path K15, and enter the inside of the image forming apparatus 200. The amount of quartz particles entering the inside of the image forming apparatus 200 by being blown by the wind blowing in the path K1 extending through the conveyance path CP is reduced by this amount.

To be noted, in Example 2, particles accumulated on the fixing portion 9 and the duplex guide 13 were not observed in the case of blowing wind on the image forming apparatus from the rear side. This is because the filters 50 suppressed entrance of the quartz particles through the ventilating portion 51 into the image forming apparatus.

Tear of Fixing Film

For Examples 1 and 2 and Comparative Examples 1 and 2, regarding whether or not the tear of the fixing film 112 was accelerated, an experiment was conducted in the same conditions as those of Example 1 described with reference to Table 3. The results are shown in Table 7.

TABLE 7

| | Sheet count when film tore |
|---|---|
| Comparative Example 1 | 40,000 |
| Example 1 | No tear occurred |
| Comparative Example 2 | 45,000 |
| Example 2 | No tear occurred |

As shown in Table 7, in Comparative Example 2, the tear of the fixing film 112 occurred when the accumulated sheet-passing number reached 45,000. In contrast, in Example 2, the tear of the fixing film 112 did not occur even when the accumulated sheet-passing number reached 50,000, which was the lifetime sheet number of the image forming apparatus 200.

It can be considered that, in Comparative Example 2, since the number of quartz particles accumulated on the fixing portion 9 in the case of blowing wind on the image forming apparatus from the front side was smaller than in Comparative Example 1, the tear of the fixing film 112 was less likely to occur than in Comparative Example 1. However, in the configuration of Comparative Example 2, a certain amount of quartz particles were accumulated on the fixing portion 9, and as a result, the tear of the fixing film 112 occurred before the lifetime sheet number was reached. In contrast, it can be considered that, in Example 2, since the number of quartz particles accumulated on the fixing portion 9 was even smaller than in Comparative Example 2 (Table 6), the tear of the fixing film 112 did not occur.

Image Defect Caused by Dust

Regarding an image defect caused by dust particles entering the inside of the image forming apparatus, a test was performed in the same conditions as in Example 1 and Comparative Example 1 described with reference to Table 4. The results are shown in Table 8.

TABLE 8

| | Number of black dot image streaks Accumulated sheet-passing number | | | | |
|---|---|---|---|---|---|
| | 10,000 | 20,000 | 30,000 | 40,000 | 50,000 |
| Comparative Example 1 | 1 | 2 | 2 | 4 | 6 |
| Example 1 | 0 | 0 | 1 | 2 | 2 |
| Comparative Example 2 | 0 | 1 | 2 | 2 | 3 |
| Example 2 | 0 | 0 | 0 | 1 | 1 |

As shown in Table 8, in Comparative Example 2, one streak of black dot images appeared when the accumulated sheet-passing number reached 20,000. In addition, when the accumulated sheet-passing number reached 50,000, which was the lifetime sheet number of the image forming apparatus 600, three streaks of black dot image appeared.

In contrast, in Example 2, no black dot image appeared even when the accumulated sheet-passing number reached 30,000. In addition, although one streak of black dot images appeared when the accumulated sheet-passing number reached 40,000, the number of streaks of black dot images was only one even when the accumulated sheet-passing number reached 50,000, which was the lifetime sheet number of the image forming apparatus 200.

In the case of the image forming apparatus 200 of Example 2, as a result of the filters 50 being provided on the ventilating portion 51, the outside air is less likely to flow into the image forming apparatus 200 (particularly into the conveyance path CP) than in Comparative Example 2 (Table 5). As a result, the dust particles are not likely to accumulate on the duplex guide 13 in both cases of the wind blowing on the image forming apparatus 200 from the front side and the rear side (Table 6). Particularly, in Example 2, dust particles larger than 100 μm are not likely to accumulate on the duplex guide 13. It can be considered that, because of this, even when vibration of the housing 101 occurred as a result of, for example, closing the back door 14 after jam removal, the dust particles were not likely to attach to the surface of the photosensitive drum 1, and therefore an image defect caused by the dust particles was not likely to occur.

That is, also in the configuration of Example 2 in which the air intake port 54 and the air discharge port 92*a* are provided in the housing 101, the occurrence of an image defect caused by dust particles can be suppressed by providing the filters 50 on the ventilating portion 51.

In addition, in Example 2, the frequency of occurrence of a black dot image was lower than in Example 1. This is because in Example 2, the path in which the air flowing into the image forming apparatus 200 flows in Example 2 branches into the path K1 extending from the discharge port 16*s* to the ventilating portion 51 and the path K15 extending from the air discharge port 92*a* of the air discharge fan 90 to the air intake port 54 of the side surface cover 101C. In addition, this is because in the case of blowing wind on the image forming apparatus 200 of example 2 from the front side, the wind speed in the path K15 (see F4 of Table 5) is higher than the wind speed in the path K1 (see F1 and F2 of Table 5). For these reasons, even if the wind blown on the image forming apparatus 200 from the front side includes dust particles, the number of dust particles entering the inside of the image forming apparatus 200 by being blown by the wind blowing in the path K1 is smaller than in Example 1. It can be considered that the frequency of occurrence of black dot images was even lower in Example 2 than in Example 1 as a result of this.

As described above, according to the present example, an image forming apparatus capable of suppressing entrance of dust can be provided.

In the present example, by providing the filters 50 on the ventilating portion 51 of the housing 101, the wind speed of the wind blowing into the image forming apparatus 200 through the discharge port 16*s* can be reduced while maintaining the function of the ventilating portion 51 of discharging the heat and water vapor. Therefore, entrance of the dust particles into the image forming apparatus 200 by being blown by the wind blowing into the image forming apparatus 200 through the discharge port 16*s* can be reduced, and thus occurrence of an image defect or damage to a member caused by the dust particles can be reduced.

According to the present example, by providing the filters 50 on the ventilating portion 51, the entrance of dust particles into the image forming apparatus 200 through the discharge port 16*s* can be reduced even though the discharge port 16*s* is not provided with the filters 50.

In addition, according to the present example, there area plurality of paths through which wind blows into the image forming apparatus 200 in the case where the wind is blown on the image forming apparatus 200 from the front side. Therefore, in combination with providing the filters 50 on the ventilating portion 51, accumulation of dust particles on the fixing portion 9 and the duplex guide 13 can be further suppressed, and thus occurrence of tear of the fixing film 112 and an image defect can be suppressed.

OTHER EMBODIMENTS

Figure 18:
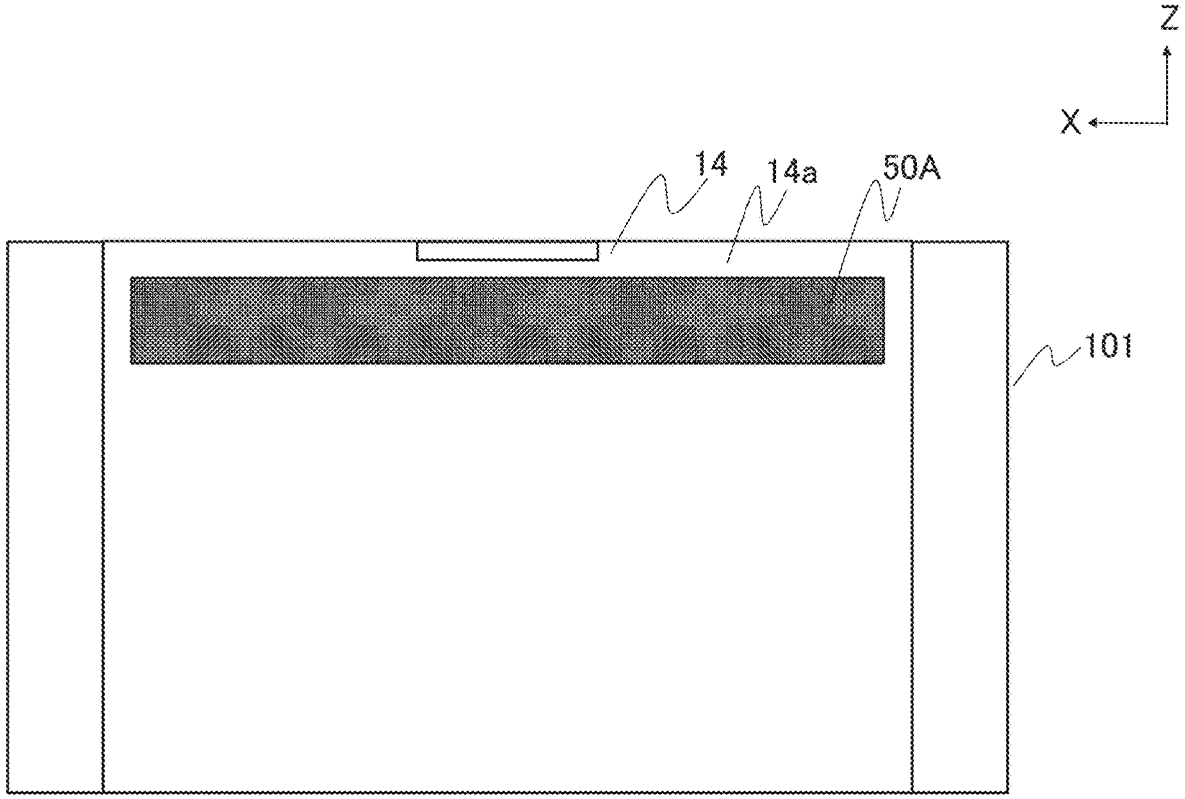
FIG. 18 is a diagram illustrating a modification example.

In Examples 1 and 2, the filters 50 are provided on the inner surface 14*b* of the back door 14, that is, on a surface more on the inside than the outer surface of the housing 101 (FIGS. 5 and 6). The configuration is not limited to this, and as illustrated in FIG. 18, a filter 50A may be provided on the outer surface 14*a* of the back door 14, that is, on the outer surface of the housing 101. According to this configuration, even in the case where the filter 50A is thick, contact between the filter 50A and the recording material P conveyed in the conveyance path CP in the housing 101 can be avoided, and thus the freedom of selection of the filter 50A is improved. In addition, one filter 50A long in the X-axis direction (width direction) can be used instead of the configuration in which the plurality of filters 50 are disposed between the plurality of rib shapes 42*a* to avoid the duplex rib 42 as in Example 1, and therefore the filter 50A can be attached more easily.

Figure 19:
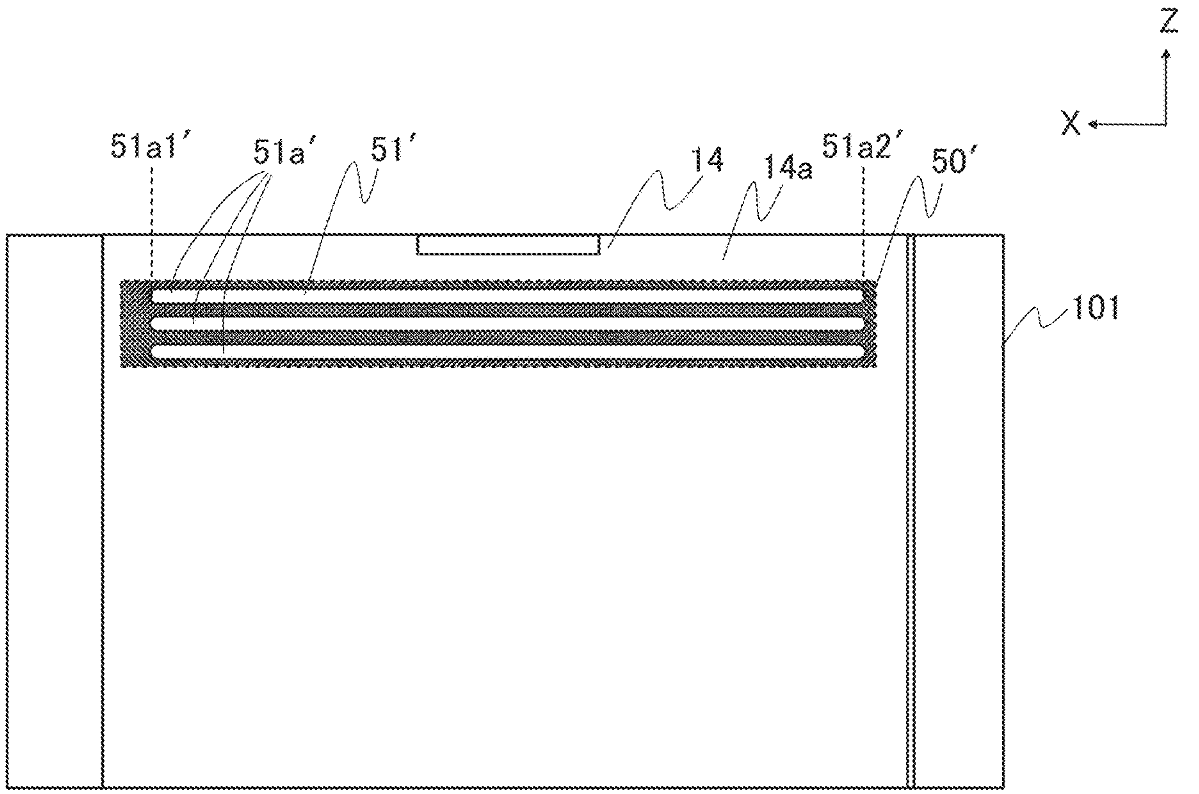
FIG. 19 is a diagram illustrating a modification example.

In Examples 1 and 2, a configuration in which a plurality of vent holes 51*a* independent from each other are arranged in the X-axis direction (width direction) as the ventilating portion 51 has been described as an example. The configuration is not limited to this, and as illustrated in FIG. 19, the ventilating portion 51' may include a vent hole 51*a*' extending in the X-axis direction (width direction). In this case, the installation range of a ventilating portion 51' in the X-axis direction (width direction) is set to a range (opening range of the vent hole 51*a*') from one end 51*a*1' to the other end 51*a*2' of the vent hole 51*a*' in the X-axis direction (width direction). The installation range of the ventilating portion 51' is preferably a range overlapping with a passage region of the recording material P of the maximum size on which the image forming apparatus can form an image. In addition, the installation range of the ventilating portion 51' is preferably a range including the effective printing region of the recording material P of the maximum size.

In addition, as illustrated in FIG. 19, in the case of the configuration in which the ventilating portion 51' includes the vent hole 51*a*' extending in the X-axis direction (width direction), for example, a filter 50' may be one filter covering the entirety of the vent hole 51*a*' in the longitudinal direction.

In each example described above, the image forming portion 10 that is an electrophotographic unit of a direct transfer system that forms a monochromatic image (black-and-white image) has been described as an example of the image forming portion. The configuration is not limited to this, and the image forming portion may be an electrophotographic unit that forms a color image by using toners of a plurality of colors. In addition, the image forming portion may be an electrophotographic unit of an intermediate transfer system in which the toner image formed on the photosensitive drum 1 is transferred onto an intermediate transfer member such as an intermediate transfer belt through primary transfer, and then the toner image is transferred from the intermediate transfer member onto the recording material P through secondary transfer. To be noted, in the case of the intermediate transfer system, the intermediate transfer member, and a transfer device (primary transfer roller, secondary transfer roller, and the like) that performs the primary transfer and the secondary transfer correspond to a transfer unit.

In each example described above, the fixing portion 9 of a film heating system in which a tubular film (fixing film 112) is used as a heating member (fixing member) that heats the toner image has been described as an example of a fixing portion. The configuration is not limited to this, and the fixing portion may have a configuration of a heating roller system in which a cylindrical roller (fixing roller) having stiffness is used as the heating member (fixing member). In addition, the heating portion that heats the heating member (fixing member) is not limited to a ceramic heater, and may be, for example, a halogen lamp that emits radiant heat, or a coil unit that generates an alternating magnetic field for generating Joule's heat by inducing a current in a conductive layer of the heating member (fixing member).

In each example described above, the space inside the housing 101 communicating with the ventilating portion 51 has a function as a conveyance path for the recording material P. However, in the case of applying the technique of the present disclosure to an image forming apparatus, the space inside the housing 101 communicating with the ventilating portion 51 does not necessarily have to have the function as a conveyance path.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-149816, filed on Sep. 15, 2023, which is hereby incorporated by reference herein in its entirety.

What is claimed is:

1. An image forming apparatus comprising:

an image forming portion configured to form a toner image on a recording material;

a fixing portion configured to form a nip portion to nip the recording material, and configured to fix the toner image to the recording material by heating the toner image while conveying the recording material;

a housing which accommodates the image forming portion and the fixing portion and in which a conveyance path that the recording material passes through is formed; and a discharge portion configured to discharge the recording material in a discharge direction intersecting with a vertical direction to an outside of the housing, wherein the housing includes a first exterior surface and a second exterior surface, the first exterior surface facing in the discharge direction and being provided with a discharge port that the recording material discharged by the discharge portion passes through, the second exterior surface facing in a direction opposite to the discharge direction and being provided with an opening portion through which the outside of the housing and an inside of the housing communicate with each other, wherein at least part of the discharge port and at least part of the opening portion are positioned above an upper end position of the nip portion in the vertical direction, wherein the image forming apparatus further comprises a filter disposed to cover the opening portion, wherein in a width direction orthogonal to both the vertical direction and the discharge direction, a center of the conveyance path is positioned between one end and an other end of a range where the opening portion is provided, wherein the housing includes an exterior member having the second exterior surface and an inner surface provided on an opposite side to the second exterior surface, and an opposing portion opposing the inner surface of the exterior member with a gap therebetween, wherein a space continuous with the gap and the outside of the housing communicate with each other through the opening portion, wherein the exterior member has a rib protruding in a direction from the inner surface toward the opposing portion and extending in a direction intersecting with the width direction, wherein the filter is attached to the inner surface at a position different from the rib in the width direction, and wherein in a range where the filter is provided in the vertical direction, a thickness of the filter is smaller than a protruding amount of the rib with respect to the inner surface.

2. The image forming apparatus according to claim 1, wherein the opening portion includes a plurality of openings disposed at different positions in the width direction, and wherein the range where the opening portion is provided in the width direction is a range from a first opening to a second opening, the first opening being an opening closest to the one end in the width direction among the plurality of openings, the second opening being an opening closest to the other end in the width direction among the plurality of openings.

3. The image forming apparatus according to claim 1, wherein the opening portion includes an opening extending in the width direction, and wherein the range where the opening portion is provided in the width direction is a range from one end of the opening to an other end of the opening in the width direction.

4. The image forming apparatus according to claim 1, wherein a length of the range where the opening portion is provided in the width direction from the one end to the other end is 50% or more of a length in the width direction of a recording material of a maximum size whose length in the width direction is largest among recording materials on which the image forming apparatus is capable of forming an image.

5. The image forming apparatus according to claim 1, wherein the exterior member is movable to a closed position where a body opening provided in the housing is closed and an open position where the body opening is opened.

6. The image forming apparatus according to claim 1, wherein the gap is a conveyance path that the recording material passes through.

7. The image forming apparatus according to claim 1, wherein the fixing portion includes a tubular film configured to come into contact with the recording material at the nip portion and a heating portion configured to heat the film, and wherein as viewed in the width direction, the film is disposed between the discharge port and the opening portion in a direction orthogonal to the vertical direction.

8. The image forming apparatus according to claim 1, wherein the image forming portion includes a photosensitive drum and a transfer unit configured to transfer a toner image formed on the photosensitive drum onto the recording material, and wherein as viewed in the width direction, the photosensitive drum is disposed between the discharge port and the opening portion in a direction orthogonal to the vertical direction.

9. The image forming apparatus according to claim 1, wherein the housing further includes:

an air intake port provided at a position different from the discharge port and the opening portion;

an air discharge port provided at a position different from the discharge port, the opening portion, and the air intake port; and an air blowing portion configured to generate an airflow flowing from the outside to the inside of the housing through the air intake port and from the inside to the outside of the housing through the air discharge port.

10. An image forming apparatus comprising:

an image forming portion configured to form a toner image on a recording material;

a fixing portion configured to form a nip portion in which the recording material is nipped and heat the toner image at the nip portion while conveying the recording material so as to fix the toner image to the recording material;

a housing which accommodates the image forming portion and the fixing portion and in which a conveyance path that the recording material passes through is formed; and a discharge portion configured to discharge the recording material in a discharge direction intersecting with a vertical direction to an outside of the housing, wherein the housing includes a first exterior surface and a second exterior surface, the first exterior surface facing in the discharge direction and being provided with a discharge port that the recording material discharged by the discharge portion passes through, the second exterior surface facing in a direction opposite to the discharge direction and being provided with an opening portion through which the outside of the housing and the conveyance path in the housing communicate with each other, wherein at least part of the discharge port and at least part of the opening portion are positioned above an upper end position of the nip portion in the vertical direction, wherein the image forming apparatus further comprises a filter disposed to cover the opening portion, wherein the housing includes an exterior member having the second exterior surface and an inner surface provided on an opposite side to the second exterior surface, and a first guide portion opposing the inner surface of the exterior member and defining part of the conveyance path together with the exterior member, wherein the exterior member has a rib protruding in a direction from the inner surface toward the first guide portion and extending in a recording material conveyance direction in the conveyance path, wherein the filter is attached to the inner surface at a position different from the rib in a width direction orthogonal to both the vertical direction and the discharge direction, and wherein in a range where the filter is provided in the vertical direction, a thickness of the filter is smaller than a protruding amount of the rib with respect to the inner surface.

11. The image forming apparatus according to claim 10, wherein in a width direction orthogonal to both the vertical direction and the discharge direction, the opening portion is provided in a range overlapping with a passage region of a recording material of a maximum size whose length in the width direction is largest among recording materials on which the image forming apparatus is capable of forming an image.

12. The image forming apparatus according to claim 11, wherein the opening portion includes a plurality of openings disposed at different positions in the width direction, and wherein the range where the opening portion is provided is a range from a first opening to a second opening, the first opening being an opening closest to one end of the opening portion in the width direction among the plurality of openings, the second opening being an opening closest to an other end of the opening portion in the width direction among the plurality of openings.

13. The image forming apparatus according to claim 11, wherein the opening portion includes an opening extending in the width direction, and wherein the range where the opening portion is provided in the width direction is a range from one end of the opening in the width direction to an other end of the opening in the width direction.

14. The image forming apparatus according to claim 11, wherein a length of the range where the opening portion is provided from one end to an other end thereof in the width direction is 50% or more of a length in the width direction of the recording material of the maximum size.

15. The image forming apparatus according to claim 10, wherein the exterior member is movable to a closed position where a body opening provided in the housing is closed and an open position where the body opening is opened, and wherein in a state in which the exterior member is at the open position, the recording material is allowed to be removed from the part of the conveyance path through the body opening.

16. The image forming apparatus according to claim 10, wherein the conveyance path includes a first conveyance path that the recording material passes through in a case of forming an image on the recording material by the image forming portion, and a second conveyance path which is branched from the first conveyance path and through which the recording material, on a first surface of which a toner image has been formed by the image forming portion, is conveyed again toward the image forming portion in a case of forming an image on a second surface of the recording material opposite to the first surface, wherein the housing includes a second guide portion defining the second conveyance path and curved to have a convex shape that is convex upward as viewed in a width direction orthogonal to both the vertical direction and the discharge direction, and wherein as viewed in the width direction, the second guide portion is disposed between the discharge port and the opening portion in a direction orthogonal to the vertical direction.

* * * * *